(12) United States Patent
Lutz et al.

(10) Patent No.: US 9,733,899 B2
(45) Date of Patent: Aug. 15, 2017

(54) LANE POSITION INFORMATION FOR PROCESSING OF VECTOR

(71) Applicant: ARM LIMITED, Cambridge (GB)

(72) Inventors: David Raymond Lutz, Austin, TX (US); Neil Burgess, Cardiff (GB); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 69 days.

(21) Appl. No.: 14/939,371

(22) Filed: Nov. 12, 2015

(65) Prior Publication Data

US 2017/0139676 A1    May 18, 2017

(51) Int. Cl.
*G06F 7/483* (2006.01)
*G06F 7/499* (2006.01)
*G06F 7/02* (2006.01)

(52) U.S. Cl.
CPC ................ *G06F 7/483* (2013.01); *G06F 7/02* (2013.01); *G06F 7/499* (2013.01); *G06F 2207/483* (2013.01)

(58) Field of Classification Search
CPC .......... G06F 7/483; G06F 7/499; G06F 7/509; G06F 7/5095
See application file for complete search history.

(56) References Cited

U.S. PATENT DOCUMENTS

| | | | |
|---|---|---|---|
| 4,622,650 A | 11/1986 | Kulisch | |
| 4,866,653 A | 9/1989 | Kulisch et al. | |
| 5,880,984 A * | 3/1999 | Burchfiel | G06F 7/483 708/497 |
| 6,202,077 B1 * | 3/2001 | Smith | G06F 7/5443 708/491 |
| 6,865,590 B2 | 3/2005 | Park | |
| 8,271,572 B2 | 9/2012 | Fam | |
| 8,473,719 B2 * | 6/2013 | Gee | G06F 9/30014 712/210 |
| 2002/0103840 A1 | 8/2002 | Park et al. | |
| 2003/0163504 A1 | 8/2003 | Knowles | |
| 2006/0277243 A1 | 12/2006 | Basso | |
| 2007/0220076 A1 | 9/2007 | Hinds | |

(Continued)

OTHER PUBLICATIONS

Notice of Allowance mailed Mar. 10, 2017 in co-pending U.S. Appl. No. 14/939,469, 20 pages.

(Continued)

*Primary Examiner* — Chuong D Ngo
(74) *Attorney, Agent, or Firm* — Nixon & Vanderhye P.C.

(57) ABSTRACT

Processing circuitry performs a plurality of lanes of processing on respective data elements of at least one operand vector to generate corresponding result data elements of a result vector. The processing circuitry identifies lane position information for each lane of processing, the lane position information for a given lane identifying a relative position of the corresponding result data element to be generated by the given lane within a corresponding result data value spanning one or more result data elements of the result vector. The processing circuitry is configured to perform each lane of processing in dependence on the lane position information identified for that lane. This enables generation of results which are wider or narrower than the vector size supported in hardware.

18 Claims, 30 Drawing Sheets

(56) References Cited

U.S. PATENT DOCUMENTS

2011/0264719 A1  10/2011  Mortensen

OTHER PUBLICATIONS

Y. Harata, Y. Nakamura, H. Nagase, M. Takigawa, N. Takagi, "A High-Speed Multiplier Using a Redundant Binary Adder Tree", IEEE J. Solid-State Circuits, vol. 22, No. 1, pp. 28-34, Feb. 1987.
Notice of Allowance mailed Apr. 3, 2017 in co-pending U.S. Appl. No. 14/939,175, 15 pages.
W. Miranker, "Systolic Super Summation with Reduced Hardware", Mathematical Sciences Department, IBM T.J. Watson Research Center, Apr. 1992, 11 pages.
J. McCalpin, "Is "Ordered Summation" a Hard Problem to Speed Up?", posted Feb. 15, 2012, 4 pages.
J. Monteiro et al., "A1CSA: An Energy-Efficient Fast Adder Architecture for Cell-Based VLSI Design", $18^{th}$ IEEE Int. Conf. on Electronics, Circuits and Systems, Dec. 11-14, 2011, pp. 442-445.
R. Srinivasasmanoj et al., "High Speed VLSI Implementation of 256-Bit Parallel Prefix Adders", International Journal of Wireless Communications and Networking Technologies, vol. 1, No. 1, Aug.-Sep. 2012, pp. 4-9.
T. Granlund et al., The GNU Multiple Precision Arithmetic Library, 6.0.0 edition, Mar. 25, 2014, 147 pages.
R. Neal, "Fast Exact Summation Using Small and Large Superaccumulators", Dept. of Statistical Sciences and Dept. of Computer Sciences, University of Toronto, May 20, 2015, 22 pages.
D. Defour et al., "Software Carry-Save: A Case Study for Instruction—Level Parallelism", Jan. 2003, 9 pages.
U.S. Appl. No. 14/939,175, filed Nov. 12, 2015, Inventor: Burgess et al.
U.S. Appl. No. 14/939,301, filed Nov. 12, 2015, Inventor: Burgess et al.
U.S. Appl. No. 14/939,469, filed Nov. 12, 2015, Inventor: Lutz et al.
International Search Report and Written Opinion of the International Searching Authority issued Aug. 24, 2016 in PCT/GB2016/051502, 11 pages.
International Search Report and Written Opinion of the International Searching Authority issued Aug. 24, 2016 in PCT/GB2016/051504, 10 pages.
D. Defour et al, "Software Carry-Save for Fast Multiple-Precision Algorithms" Feb. 2002, 12 pages.
S. Collange et al, "Full-Speed Deterministic Bit-Accurate Parallel Floating-Point Summation on Multi- and Many-Core Architectures" submitted Feb. 28, 2014, last revised Jan. 10, 2015, 12 pages.
G. Bewick et al, "Binary Multiplication Using Partially Redundant Multiples" Technical Report No. CSL-TR-92-528, Jun. 1992, 25 pages.
N. Takagi et al, "High-Speed VLSI Multiplication Algorithm with a Redundant Binary Addition Tree" *IEEE Transactions on Computers*, vol. C-34, No. 9, Sep. 1985, pp. 789-796.
Office Action dated Apr. 14, 2017 in co-pending U.S. Appl. No. 14/939,301, 13 pages.

* cited by examiner

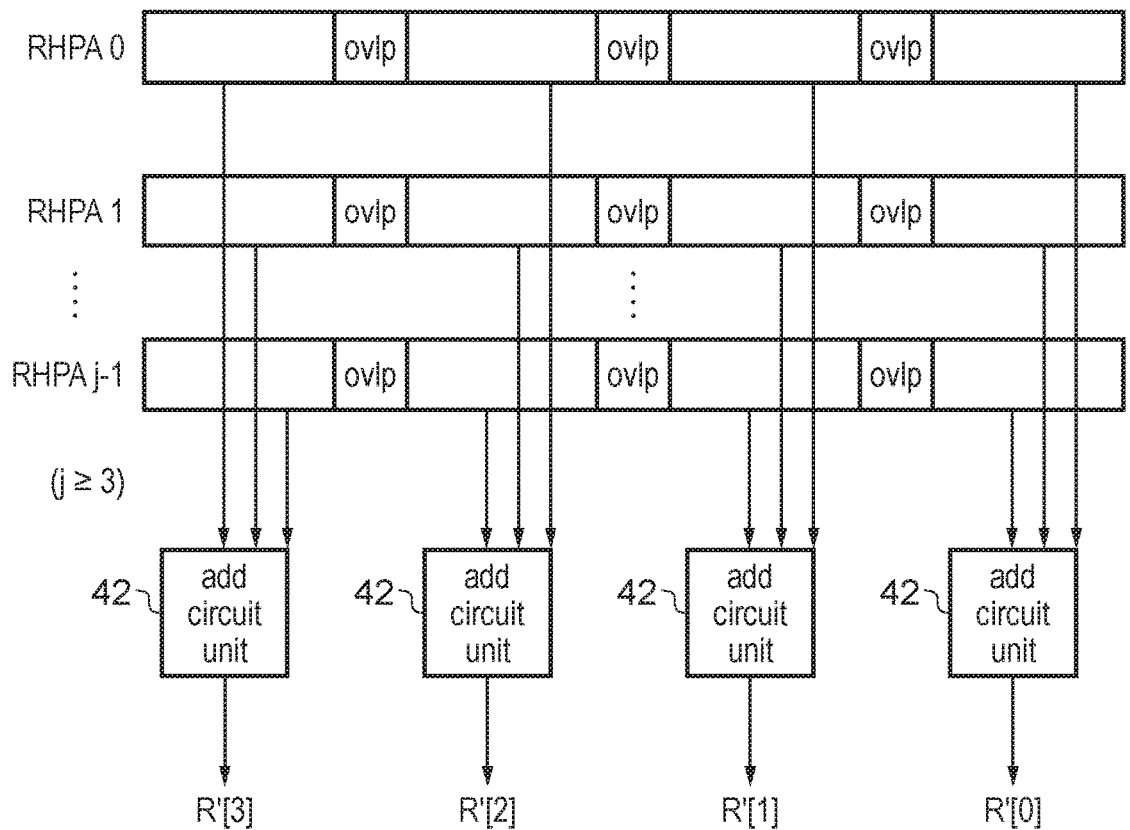
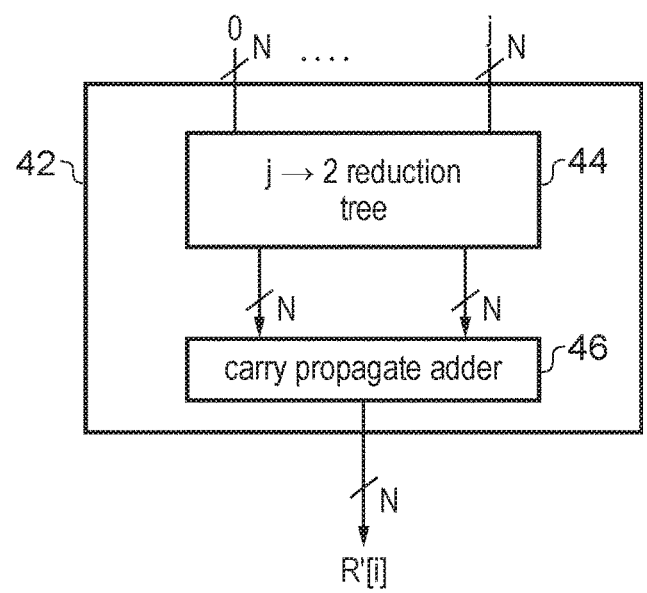
FIG. 7

| Cycle | MUL1 | MUL2 | MUL3 | ACC |
|---|---|---|---|---|
| 0 | a0*bo(0) | | | |
| 1 | a1*bo(64) | a0*bo(0) | | |
| 2 | a2*bo(128) | a1*bo(64) | a0*bo(0) | |
| 3 | a3*bo(192) | a2*bo(128) | a1*bo(64) | Acc + a0*b0(0) |
| 4 | a0*b1(64) | a3*bo(192) | a2*bo(128) | Acc + a1*bo(64) |
| 5 | a1*b1(128) | a0*b1(64) | a3*bo(192) | Acc + a2*bo(128) |
| 6 | a2*b1(192) | a1*b1(128) | a0*b1(64) | Acc + a3*bo(192) |
| 7 | a3*b1(256) | a2*b1(192) | a1*b1(128) | Acc + a0*b1(64) |
| 8 | a0*b2(128) | a3*b1(256) | a2*b1(192) | Acc + a1*b1(128) |
| 9 | a1*b2(192) | a0*b2(128) | a3*b1(256) | Acc + a2*b1(192) |
| 10 | a2*b2(256) | a1*b2(192) | a0*b2(128) | Acc + a3*b1(256) |
| 11 | a3*b2(320) | a2*b2(256) | a1*b2(192) | Acc + a0*b2(128) |
| 12 | a0*b3(192) | a3*b2(320) | a2*b2(256) | Acc + a1*b2(192) |
| 13 | a1*b3(256) | a0*b3(192) | a3*b2(320) | Acc + a2*b2(256) |
| 14 | a2*b3(320) | a1*b3(256) | a0*b3(192) | Acc + a3*b2(320) |
| 15 | a3*b3(384) | a2*b3(320) | a1*b3(256) | Acc + a0*b3(192) |
| 16 | | a3*b3(384) | a2*b3(320) | Acc + a1*b3(256) |
| 17 | | | a3*b3(384) | Acc + a2*b3(320) |
| 18 | | | | Acc + a3*b3(384) |

| Cycle | MUL1 | MUL2 | MUL3 | ACC | OVLP PROP |
|---|---|---|---|---|---|
| 0 | a0*b0(0) | | | | |
| 1 | a1*b0(64) | a0*b0(0) | | | |
| 2 | a0*b1(64) | a1*b0(64) | a0*b0(0) | | |
| 3 | a0*b2(128) | a0*b1(64) | a1*b0(64) | Acc + a0*b0(0) | |
| 4 | a1*b1(128) | a0*b2(128) | a0*b1(64) | Acc + a1*b0(64) | |
| 5 | a2*b0(128) | a1*b1(128) | a0*b2(128) | Acc + a0*b1(64) | |
| 6 | a0*b3(192) | a2*b0(128) | a1*b1(128) | Acc + a0*b2(128) | NV[1] + V'[0] (top bit of NV[1] has significance 111) |
| 7 | a1*b2(192) | a0*b3(192) | a2*b0(128) | Acc + a1*b1(128) | |
| 8 | a2*b1(192) | a1*b2(192) | a0*b3(192) | Acc + a2*b0(128) | |
| 9 | a3*b0(192) | a2*b1(192) | a1*b2(192) | Acc + a0*b3(192) | NV[2] + V'[1] (top bit of NV[2] has significance 167) |
| 10 | a1*b3(256) | a3*b0(192) | a2*b1(192) | Acc + a1*b2(192) | |
| 11 | a2*b2(256) | a1*b3(256) | a3*b0(192) | Acc + a2*b1(192) | |
| 12 | a3*b1(256) | a2*b2(256) | a1*b3(256) | Acc + a3*b0(192) | NV[3] + V'[2] (top bit of NV[3] has significance 223) |
| 13 | a2*b3(320) | a3*b1(256) | a2*b2(256) | Acc + a1*b3(256) | |
| 14 | a3*b2(320) | a2*b3(320) | a3*b1(256) | Acc + a2*b2(256) | |
| 15 | a3*b3(384) | a3*b2(320) | a2*b3(320) | Acc + a3*b1(256) | NV[4] + V'[3] (top bit of NV[4] has significance 279) |
| 16 | | a3*b3(384) | a3*b2(320) | Acc + a2*b3(320) | |
| 17 | | | a3*b3(384) | Acc + a3*b2(320) | |
| 18 | | | | Acc + a3*b3(384) | NV[5]+V'[4] (top bit of NV[5] has significance 335) |
| 19 | | | | | NV[6]+V'[5] (top bit of NV[6] has significance 391) |
| 20 | | | | | NV[7]+V'[6] (top bit of NV[7] has significance 447) |
| 21 | | | | | NV[8]+V'[7] (top bit of NV[8] has significance 503) |
| 22 | | | | | NV[9]+V'[8] (top bit being populated based on multiply in NV[9] has significance 511) |

FIG. 28

| | Lane 2 | | Lane 1 | | Lane 0 | |
|---|---|---|---|---|---|---|
| | s.ext | non-ovlp bits (+ve) | s.ext | non-ovlp bits (+ve) | s.ext | non-ovlp bits (+ve) |
| | | | | | | |
| | s.ext | non-ovlp bits (+ve) | -1...+1 | non-ovlp bits (+ve) | -1...+1 | non-ovlp bits (+ve) |

FP (converted to non-redundant) restricted-redundant RHPA

FIG. 36

| 0,-1 | non-ovlp bits (+ve) | 0,-1 | non-ovlp bits (+ve) | 0,-1 | non-ovlp bits (+ve) |
|---|---|---|---|---|---|
| | | | | | |
| 0,-1 | non-ovlp bits (+ve) | -1...+1 | non-ovlp bits (+ve) | -1...+1 | non-ovlp bits (+ve) |

FIG. 37

| 0,-1 | non-ovlp bits (+ve) | 0,-1 | non-ovlp bits (+ve) | 0,-1 | non-ovlp bits (+ve) |
|---|---|---|---|---|---|
| | | -1...+1 | | -1...+1 | |
| 0,-1 | non-ovlp bits (+ve) | 0 | non-ovlp bits (+ve) | 0 | non-ovlp bits (+ve) |

FIG. 38

| -1...+1 | non-ovlp bits (+ve) | -1...+1 | non-ovlp bits (+ve) | -1...+1 | non-ovlp bits (+ve) |
|---|---|---|---|---|---|

FIG. 39

LANE POSITION INFORMATION FOR PROCESSING OF VECTOR

BACKGROUND

Technical Field

The present technique relates to the field of data processing.

Technical Background

It is common to use floating-point (FP) representation in data processing systems. A floating-point number includes a significand and an exponent indicating a significance of the bits of the significand. This allows numeric values over a large range to be represented using a finite number of bits. However, a problem with floating-point arithmetic is that calculations are generally non-associative. For example, when adding several floating-point values, each time another value is added to the result of the previous addition, the result is rounded and normalised, which means that the overall result is different depending on the order in which the values are added. This makes it difficult to parallelize floating-point arithmetic, because sums are not reproducible unless completed in the exact same order. To generate a reproducible result, a series of additions or subtractions typically have to be performed sequentially, which can make floating-point arithmetic relatively slow.

SUMMARY

At least some examples provide an apparatus comprising:
processing circuitry to perform a plurality of lanes of processing on respective data elements of at least one operand vector to generate corresponding result data elements of a result vector;
wherein the processing circuitry is configured to identify lane position information for each lane of processing, the lane position information for a given lane identifying a relative position of the corresponding result data element to be generated by the given lane within a corresponding result data value spanning one or more result data elements of the result vector; and
the processing circuitry is configured to perform each lane of processing in dependence on the lane position information identified for that lane.

At least some examples provide a data processing method comprising:
identifying lane position information for each of a plurality of lanes of processing to be performed on respective data elements of at least one operand vector to generate corresponding result data elements of a result vector, the lane position information for a given lane identifying a relative position of the corresponding result data element to be generated by the given lane within a corresponding result data value spanning one or more result data elements of the result vector; and
performing each lane of processing in dependence on the lane position information identified for that lane.

At least some examples provide an apparatus comprising:
means for performing a plurality of lanes of processing on respective data elements of at least one operand vector to generate corresponding result data elements of a result vector;
wherein the means for performing is configured to identify lane position information for each lane of processing, the lane position information for a given lane identifying a relative position of the corresponding result data element to be generated by the given lane within a corresponding result data value spanning one or more result data elements of the result vector; and
the means for performing is configured to perform each lane of processing in dependence on the lane position information identified for that lane.

Further aspects, features and advantages of the present technique will be apparent from the following description of examples, which is to be read in conjunction with the accompanying drawings.

BRIEF DESCRIPTION OF THE DRAWINGS

FIG. 7 shows an example of adding three or more RHPA values in a single operation;

FIG. 27 is a timing diagram showing an example of how the product of the two long integers can be calculated using a series of pipelined partial product accumulating operations;

FIG. 28 is another timing diagram showing an example of how some overlap propagation additions for converting the final multiply result to a non-redundant format can be performed in parallel with some of the additions for accumulating partial products;

FIGS. 36 to 39 provide an explanation for why the operation shown in FIG. 16 produces a result in restricted-redundant form.

DESCRIPTION OF EXAMPLES

Figure 1:
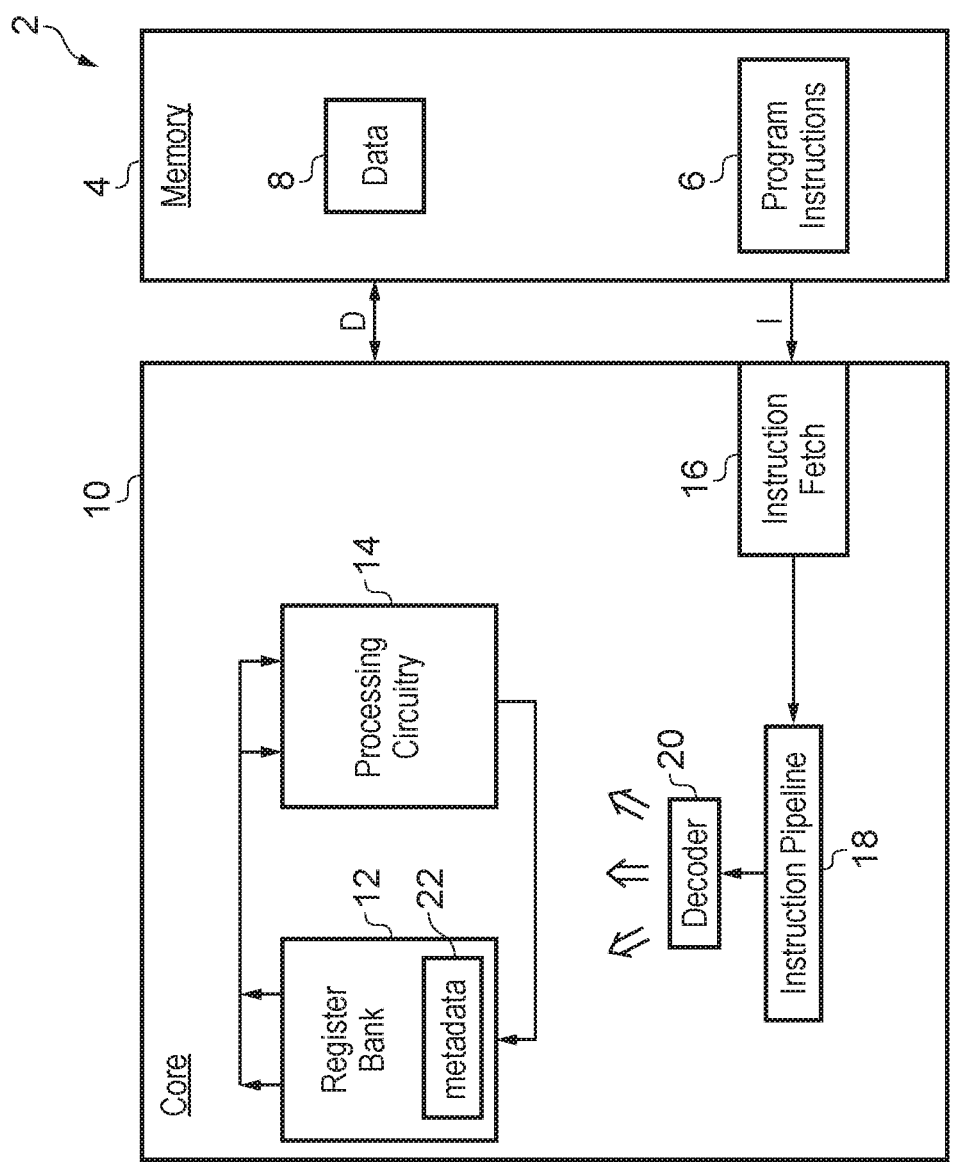
FIG. 1 schematically illustrates a data processing apparatus.

Some specific examples will be described below. It will be appreciated that the present technique is not limited to these examples.

A high-precision anchor (HPA) format is discussed below. More information about the HPA format can be found in the U.S. patent applications 62/074,149, 14/582,974, 14/582,875, 14/582,812, 14/582,836, 14/582,978, 14/606,510, and 14/582,968, the contents of which are entirely incorporated herein by reference.

Floating-Point Numbers

Floating-point (FP) is a useful way of approximating real numbers using a small number of bits. The IEEE 754-2008 FP standard proposes multiple different formats for FP numbers, some of which are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0\times10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers consist of a sign bit, some number of biased exponent bits, and some number of fraction bits. In particular, the DP, SP and HP formats consist of the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign}\times 1.\text{fraction}\times 2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software. Some processors handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001
−1=1001

In two's complement representation, an n-bit integer i is represented by the low order n bits of the binary n+1-bit value $2^n+i$, so a 4-bit two's complement integer would represent plus and minus one as:

+1=0001
−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are:

| mode | definition | |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value
G—(guard) the next most significant bit (i.e. the first bit not included in the truncation)
S—(sticky) the logical OR of all remaining bits that are not part of the truncation Given these three values and the truncated value, we can always compute the correctly rounded value according to the following table:

| mode | change to the truncated value |
|---|---|
| RNE | increment if (L&G)|(G&S) |
| RNA | increment if G |
| RZ | none |
| RP | increment if positive & (G|S) |
| RM | increment if negative & (G|S) |
| RX | set L if G|S |

For example, consider multiplying two 4-bit significands, and then rounding to a 4-bit significand.

sig1=1011 (decimal 11)
sig2=0111 (decimal 7)
multiplying yields
sig1×sig2=1001 101 (decimal 77)
    L Gss The least significant bit of the truncated 4-bit result is labelled L, the next bit G, and S is the logical OR of the remaining bits labelled s (i.e. s=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

Rounding Integer and Fixed-Point Numbers

If we convert an FP number to integer or fixed-point we also round. The concept is basically the same as FP rounding. An FP number that happens to be an integer always rounds to that integer. All other FP numbers lie between two consecutive integers, and rounding dictates which integer is returned. Unfortunately the rounding logic for integers is somewhat harder because of the differences between two's complement and sign-magnitude form. Incrementing a sign-magnitude number always increases the magnitude, so the incremented number is farther away from zero. The same thing happens for positive two's complement numbers, but negative two's complement numbers become closer to zero when incremented. This means that the rounding logic has to change based on whether the integer is positive or negative. It also means we have to be careful in picking the base value (the value which will be incremented or not). For positive integers, that value is just the truncated FP significand, so 1.37 will have a base value of 1, and a result of either 1 or 2. For negative integers, we again truncate the significand and take the one's complement of the result (one's complement is the original number with all bits inverted), −1.37 is truncated to 1 and then inverted, giving a base value of −2. Everything then works out since we want our result to be either −2 or (when incremented) −1.

To further complicate things, our method of conversion requires some computation to find L, G, and S for negative integers. Correct rounding would require us to complete the two's complement process (invert and add 1) and then compute L, G, and S, but adding that 1 is slow compared to just inverting. Ideally we would like to compute the actual L, G, and S from the original shifted input (i.e., from the input before we've done anything about signs. So the floating-point 1.37 or −1.37 would both be right shifted to the integer 1).

Let L0, G0, and S0 be the least significant bit (lsb), guard and sticky before inverting, and let Li, Gi, and Si be lsb, guard and sticky after inverting, and finally let L, G, and S be the lsb, guard and sticky after inverting and adding 1.

If S0 is zero, then the bits contributing to Si are all ones, and hence S (obtained by adding 1 to those Si bits) is also zero. If S0 is nonzero, then Si is not all ones, and hence S is nonzero. So in all cases S0=S.

If G0 is zero, then Gi is 1, and G is also one except for the case when there is a carry-in from the S bits, which only happens when S0 is zero. If G0 is 1, then Gi is zero, and again G is also one except for the case where there is a carry-in from the S bits, which only happens when S0 is zero. So G=G0^ S0.

By very similar logic, L=L0^(G0|S0).

Now that we have L, G, and S for both negative and positive integers, we can come up with our rounding rules:

| mode | change to a positive value | change to a negative value |
| --- | --- | --- |
| RNE | increment if (L&G) | (G&S) | increment if (L&G) | (G&S) |
| RNA | increment if G | increment if (G&S) |
| RZ | none | increment if (G | S) |
| RP | increment if (G | S) | increment if (G | S) |
| RM | none | none |
| RX | set L if G | S | set L if G | S |

Fixed-point numbers round exactly the same way as integers. The rules for unsigned conversions (to integer or fixed-point) are the same as the rules for positive conversions.

Injection Rounding

A faster way to do rounding is to inject a rounding constant as part of the significand addition that is part of almost every FP operation. To see how this works, consider adding numbers in dollars and cents and then rounding to dollars. If we add $1.27

+$2.35

$3.62

We see that the sum $3.62 is closer to $4 than to $3, so either of the round-to-nearest modes should return $4. If we represented the numbers in binary, we could achieve the same result using the L, G, S method from the last section. But suppose we just add fifty cents and then truncate the result?

1.27

+2.35

+0.50   (rounding injection)

4.12

If we just returned the dollar amount ($4) from our sum ($4.12), then we have correctly rounded using RNA rounding mode. If we added $0.99 instead of $0.50, then we would correctly round using RP rounding. RNE is slightly more complicated: we add $0.50, truncate, and then look at the remaining cents. If the cents remaining are nonzero, then the truncated result is correct. If there are zero cents remaining, then we were exactly in between two dollar amounts before the injection, so we pick the even dollar amount. For binary FP this amounts to setting the least significant bit of the dollar amount to zero.

Adding three numbers is only slightly slower than adding two numbers, so we get the rounded result much more quickly by using injection rounding than if we added two significands, examined L, G, and S, and then incremented our result according to the rounding mode.

Implementing Injection Rounding

For FP, the rounding injection is one of three different values, values which depend on the rounding mode and (sometimes) the sign of the result.

Both RNA and RNE require us to inject a 1 at the G position (this is like adding $0.50 in our dollars and cents example).

RP and RM rounding depends on the sign as well as the mode. RP rounds positive results up (increases the magnitude of the significand towards positive infinity), but truncates negative results (picking the significand that is closer to positive infinity). Similarly RM rounds negative results up (increasing the magnitude of the significand toward negative infinity), but truncates positive results (picking the significand that is closer to negative infinity). Thus we split RM and RP into two cases: round up (RU) when the sign matches the rounding direction, and truncation (RZ) when the sign differs from the rounding injection. For RU cases we inject a 1 at the G-bit location and at every location that contributes logically to S (this is like adding $0.99 in our dollars and cents example).

For RZ and RX modes, and for RP and RM modes that reduce to RZ mode, we inject zeros.

For most of the rounding modes, adding the rounding injection and then truncating gives the correctly rounded result. The two exceptions are RNE and RX, which require us to examine G and S after the addition. For RNE, we set L to 0 if G and S are both zero. For RX we set L to 1 if G or S are nonzero.

FP Number are not Real Numbers

It's tempting to think of FP numbers as being just like real numbers, but they are fundamentally different, even for the most basic properties:

They are not associative. For example, in SP we can add 3 numbers and return 1 million or zero, perhaps not what people think of as a rounding error:

$(2^{45}+-2^{45})+2^{20}=2^{20}$ $2^{45}(-2^{45}+2^{20})=0$

They don't obey the distributive laws. Again in SP:

$$3{,}000{,}001 * (4.00001 + 5.00001) = 0x4bcdfe83$$

$$(3{,}000{,}001 * 4.00001) + (3{,}000{,}001 * 5.00001) = 0x4bcdfe82$$

and things get even worse in the presence of overflow:

$$2^{50} * (2^{78} - 2^{77}) = 2^{127}$$

$$(2^{50} * 2^{78}) - (2^{50} * 2^{77}) = \text{infinity}$$

For some implementations, they aren't even commutative unless we are in default NaN mode (a mode that converts all NaNs to a single NaN), because in general nanA+nanB !=nanB+nanA. Numeric adds and multiplies are commutative.

Because of IEEE NaN rules, there are no multiplicative or additive identities. One and zero work as identities for numeric values.

One useful way to think of FP numbers is to consider them to be very long fixed-point numbers in which at most a few (53 for DP) consecutive bits can be nonzero. For example, non-infinite DP numbers can have the first bit of the significand in any of 2046 places, and that first bit is followed by 52 other significand bits, and there is a sign bit, so any finite DP number can be represented as a 2046+52+1=2099-bit fixed point number. Examined this way it becomes very obvious that adding two FP numbers does not, in general, result in another FP number: the result of the addition has to be rounded so that it becomes an FP number.

A known issue with floating-point (FP) arithmetic is that it is non-associative, a fact that makes sums problematic:
- programmers need to worry about wildly different results, even when adding 3 numbers
- programmers use wider formats than they need, in the hope of avoiding the wildly different results
- programmers can't easily parallelize code, because sums aren't reproducible unless computed in the exact same order.

For example, in single precision, $$2^{20} + (-2^{44} + 2^{44}) = 2^{20}$$

but $$(2^{20} + -2^{44}) + 2^{44} = 0$$

Depending upon the order the operations are performed, the result is one million or zero. This is an extreme example because the exponents differ by 24, but we can get different answers if the exponents differ by 1, or even if all of the exponents are the same and we are adding more than 3 things. The C programming language addresses the reproducibility problem by requiring sums to be evaluated left-to-right, in order, but this does nothing for correctness, and makes parallelization impossible.

The problems are especially acute for high-performance computing (HPC), where programs may need to add millions of things. Programmers would like to parallelize these problems, but then the lack of reproducibility makes debugging even harder than it usually is. Different configurations of machines will produce different answers even if the reprogramming for those machines is done perfectly.

HPA Representation

There is disclosed a new datatype that allows fast and correct accumulation of floating-point (FP) numbers in a programmer-selectable range. For the modest ranges that will accommodate most problems, the accumulation is faster than FP addition, and is associative. Associative addition allows the problems to be parallelized while still giving reproducible and correct results, enabling speedups by, for example, a factor of 100 or more as compared to existing hardware. We believe these benefits will be irresistible in the high-performance computing (HPC) space, and compelling for many non-HPC applications.

FIG. 1 schematically illustrates a data processing apparatus 2 for performing data processing operations under control of program instructions. A data processing apparatus 2 comprises a memory 4 storing program instructions 6 and data 8 to be processed. A processor core 10 is coupled to the memory 4 and includes a register bank 12, processing circuitry 14, an instruction fetch unit 16, an instruction pipeline unit 18 and an instruction decoder 20. It will be appreciated that in practice the data processing system 2 may include many additional elements and that the representation of FIG. 1 is simplified to aid understanding. In operation, program instructions 6 are fetched from the memory 4 by the instruction fetch unit 16 and supplied to the instruction pipeline 18. When the program instructions reach the appropriate stage within the instruction pipeline 18 they are decoded by the instruction decoder 20 and generate control signals which serve to control the operation of the register bank 12 and the processing circuitry 14 to perform the processing operation(s) specified by the program instruction decoded. Multiple input operands may be read from the register bank 12 and supplied to the processing circuitry 14 where they are manipulated and then a result value written back into the register bank 12.

The register bank 12 can have a variety of different forms. The operands to be manipulated may, for example, include floating-point operands, fixed point operands, integer operands and HPA or RHPA number operands (as will be described later). The register bank 12 may serve to store a mixture of these types of operands depending upon the configuration of the register bank 12. The operands can have differing levels of precision, as may be predefined by their format, or as may be programmably specified using metadata associated with the registers as will be described later in relation to the HPA number operands.

As shown in FIG. 1, the register bank 12 may include metadata registers 22 for specifying metadata associated with an HPA or RHPA value stored in a corresponding data register of the register bank 12 (examples of the contents of the metadata are given below). In some cases, each data register may have corresponding metadata registers 22, while in other cases two or more data registers may share metadata specified by a single metadata register 22.

Figure 2:
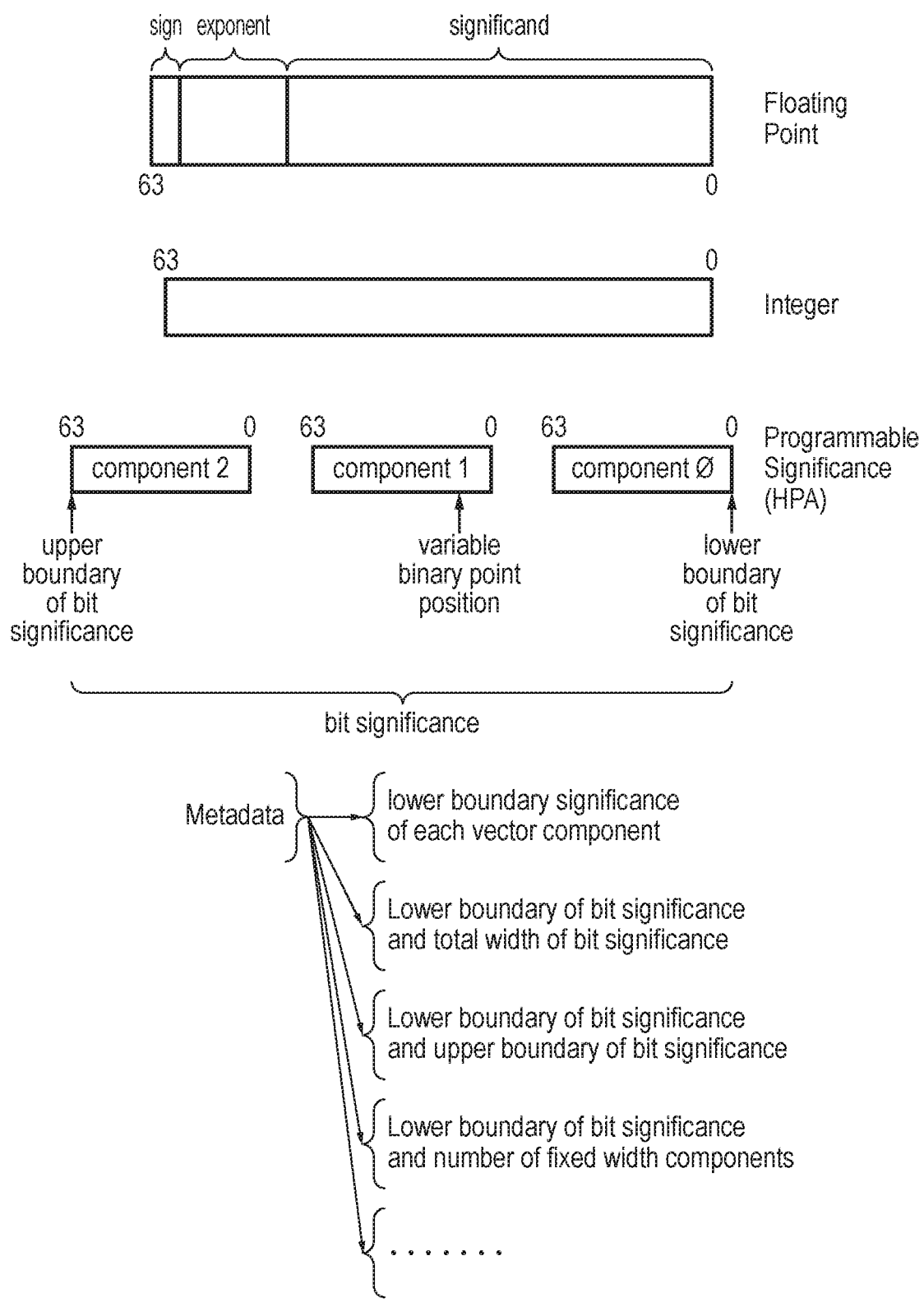
FIG. 2 schematically illustrates different representations of numeric values.

FIG. 2 schematically illustrates a floating-point operand. A floating-point operand is formed of a sign, an exponent and a significand. Floating-point operands can represent values with a wide variety of magnitudes indicated by their exponent values. The precision with which a number can be represented is limited by the size of the significand. Floating-point operations typically are more complex and slower to implement than integer arithmetic.

FIG. 2 also illustrates a 64-bit integer operand. Such an integer operand can represent numbers in the range 0 to $(2^{64}-1)$ for unsigned integers, or $-2^{63}$ to $2^{63}-1$ for signed integers. Integer arithmetic is typically quick and consumes comparatively little energy to perform (compared to floating-point arithmetic), but suffers from the disadvantage that numbers of a comparatively limited range of values may be specified compared to the range of numbers which may be represented by a floating-point value.

FIG. 2 also illustrates an HPA (high-precision anchor) number comprising a vector of multiple components (in this example three) each comprising a 64-bit integer in this example. The HPA number has metadata associated with it. The metadata includes an anchor value indicating a significance of the bits of the components forming part of the HPA number. The anchor value(s) specifies directly, or indirectly, a lower boundary of the bit significance and an upper boundary of the bit significance. The term metadata used below can be considered to correspond to data including the anchor value(s) that specify the bit significance of an HPA number. The different components together specify the bit values which contiguously span this range of bit significance. Depending upon the position of the lower boundary of the bit significance and the upper boundary of the bit significance, the range of bit significance may include the binary point position. It is also possible that the binary point position may lie outside of the range of bit significance specified for a particular HPA value.

The anchor value(s) may be provided so that they are capable of representing a range of bit significance extending from a smallest significance that can be represented by a floating-point value (e.g. a double precision FP value) up to a highest bit significance that can be represented by that floating-point value.

The number of components which form the HPA number can vary between different implementations. The size of the components may be fixed in some embodiments, but in other embodiments may vary. The overall width of the range bit significance may in some embodiments be constrained to change in units of a fixed component size (e.g. with 64-bit components, the range of the bit significance may have a width of, for example, 64, 128, 192, 256, . . . ). It is also possible that the width of the range of bit significance could vary continuously in steps of one bit width.

The anchor value(s) (within the metadata) may be programmable, so that the programmer can set the significance of the corresponding HPA value. The anchor value may specify the bit significance in a variety of different ways. One example is to specify the lower boundary bit significance of each vector component. Thus, each vector component may comprise an integer value representing its portion of the significant bits of the value within the overall range of bit significance together with metadata representing (anchoring) the significance of the lowest bit within that component. Another option is that the anchor value(s) specifies the lower boundary of the bit significance of the whole HPA number together with the total width of the range of bit significance. A further option is that the anchor value(s) may comprise data specifying the lower boundary and the upper boundary of the range of bit significance. Still further variations are also possible, such as anchor value(s) comprising the lower boundary of the range of bit significance together with the number of the components where those components are known to be fixed width components.

Figure 3:
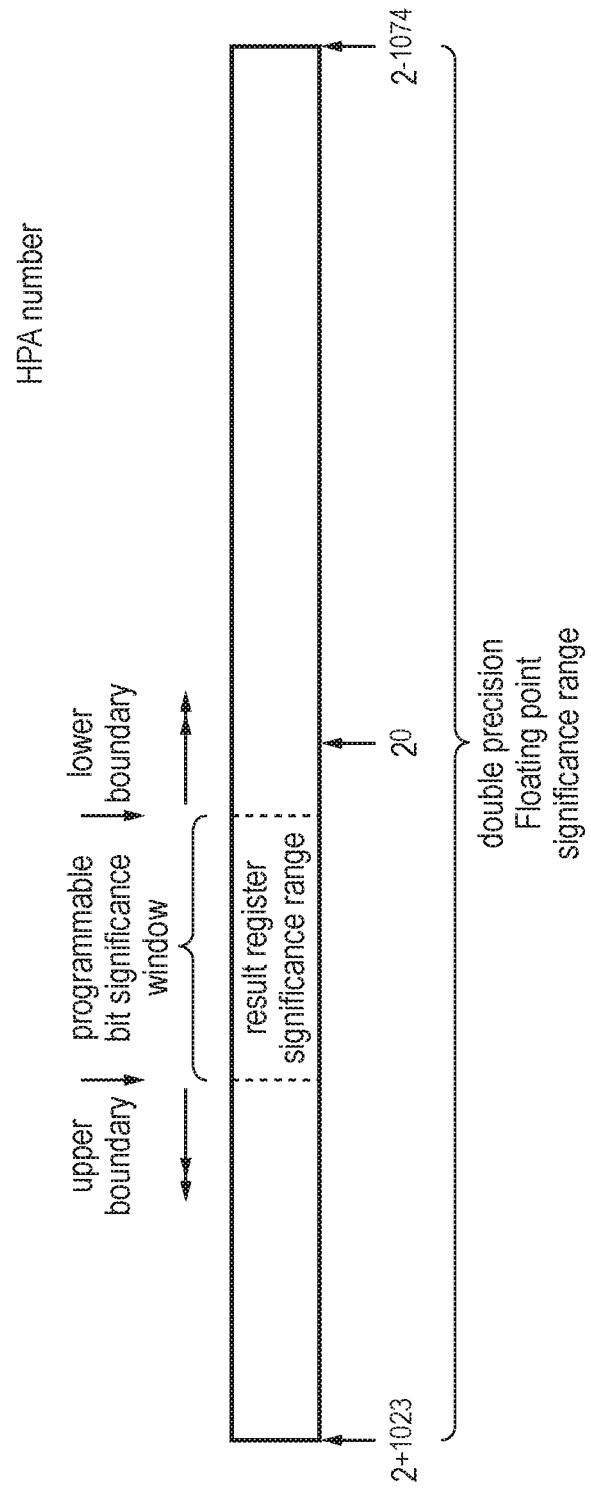
FIG. 3 schematically illustrates an example of a relationship between a double precision floating-point value and a high-precision anchor (HPA) value.

FIG. 3 schematically illustrates a relationship between the range of values representable with a double precision floating-point and the significance range of an HPA number. In the case of a double precision floating-point number, the range of bit values which may be specified extends from approximately $2^{-1074}$ to $2^{+1023}$ (not counting subnormals).

As illustrated, the HPA number has a programmable bit significance range which may be considered as a window of bit significance within the range of bit significance representable using the floating-point value. This programmable bit significance may be specified by a lower boundary and an upper boundary, and depending upon the values of the lower boundary and the upper boundary, may be considered to slide along the range of bit significance provided by the floating-point value. The width of the window, as well as its starting point and ending points, may be specified by appropriate values of the programmable metadata (that includes the anchor value(s)) which specifies the bit significance. Thus the HPA number may have a form selected by the programmer to match the computation to be performed.

The HPA format allows additions of two or more values to be performed fast, exactly and associatively, while still permitting values over a broad range of significance to be represented. Since the HPA value is simply a two's complement number it can be added using an integer adder and there is no need for rounding or normalisation as with floating-point arithmetic, which allows a series of additions to be parallelized because the result will be the same regardless of the order in which the values are added. Nevertheless, by defining metadata specifying a programmable significance of the HPA value, then the full range of significance of an equivalent floating-point value can still be represented, but without needing to provide a very wide adder (e.g. to add two 2's complement numbers across the full range representable by double precision floating-point values would require a 2098-bit adder), and instead the programmable significance enables a smaller adder to focus on a particular window of programmable bit significance within the larger range. In practice, most calculations do not require the entire range of significance available for double precision floating-point. For example, sub-atomic problems might accumulate very small values and astronomic complications might accumulate very large values, but it is not generally useful to add the width of a proton to the distance between galaxies. Even for high-performance computing, most accumulations happen over a limited range.

Typically, the programmer writing a program will know the expected range of values in which useful results are likely to fall (depending on the application). The programmer might determine that all of the data for a particular sum will have a magnitude less than $2^{60}$ and that values with magnitude below $2^{-50}$ will not affect the sum in any meaningful way, and so in this case by adding the data using the HPA format with an overall data width of 128 bits and the anchor value specifying the significance of the least significant bit as −50, the numbers for this particular application can be added associatively in any order.

Hence, by using the anchor value to limit the significant range for which the result is being calculated, a relatively small piece of hardware can be used to calculate the result within the programmably defined window. If an addition results in overflow above the upper significance boundary or underflow below the lower significance boundary of the defined range, then an exception can be raised and this can signal that the programmer has defined the wrong significance boundaries and that the processing should be repeated with different metadata (e.g. a different anchor value or a different overall size of the HPA value) to define a different window of significance for the result.

When adding or subtracting two HPA values, the anchor value is the same for both HPA values and the result also has the same anchor value—this is unlike floating-point arithmetic where the addition or subtraction of two values can lead to a result with a different exponent to either of the inputs due to normalisation of the result. If the inputs are provided with different anchor metadata then they are shifted to align themselves with the required target significance range for the result. If the inputs are provided in a representation other than HPA (e.g. integer or floating-point), then they are converted into HPA values sharing the same anchor value, and added to form a result having the same anchor value. Hence, the metadata for an HPA register can be viewed as defining a target range of significance for the result value to be generated in that register, and bits outside the target range of significance will not be calculated by the hardware regardless of the actual significance of the input values.

RHPA Representation

While the HPA format enables much faster additions compared to floating-point, when the size of an HPA value becomes relatively large then adding two HPA values with integer arithmetic may still be relatively slow. For example, the HPA format may require addition of operands spanning multiple lanes, which may be undesirable in larger vector implementations. For example, addition of two 256-bit or 512-bit values may take some time because each 64-bit lane of addition may be performed sequentially to accommodate carries from one lane being input to the following lane.

Figure 4:
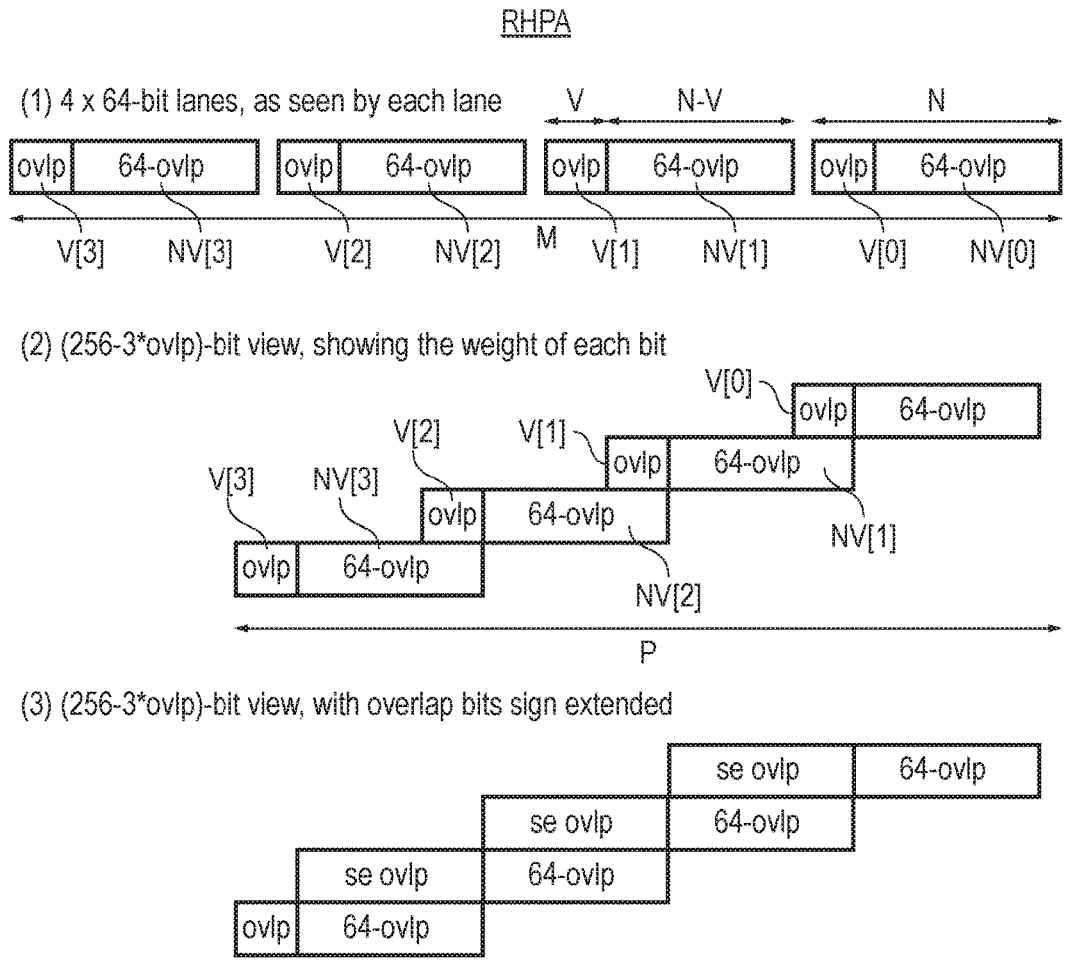
FIG. 4 shows an example of a Redundant HPA (RHPA) value, which represents a numeric value using a redundant representation including a number of N-bit portions with overlapping significance.

The addition can be performed faster by using the Redundant High-Precision Anchor (RHPA) format shown in FIG. 4. As in the HPA format, the RHPA number includes a variable number of components with metadata defining an anchor value which enables the processing circuitry 14 to identify the significance of bits of each component. Again, the anchor value may be programmable. For RHPA, the metadata may identify the significance of each component in any of the ways described above for HPA. However, in the RHPA format, the numeric value is represented using a redundant representation where adjacent lanes of the vector include bits of overlapping significance, which allows constant-time addition regardless of the number of lanes being calculated. The redundancy enables operations such as addition, accumulation and multiplication to be carried out with shorter adders and without propagating carry information between adders. This greatly speeds up processing of data values.

Figure 25:
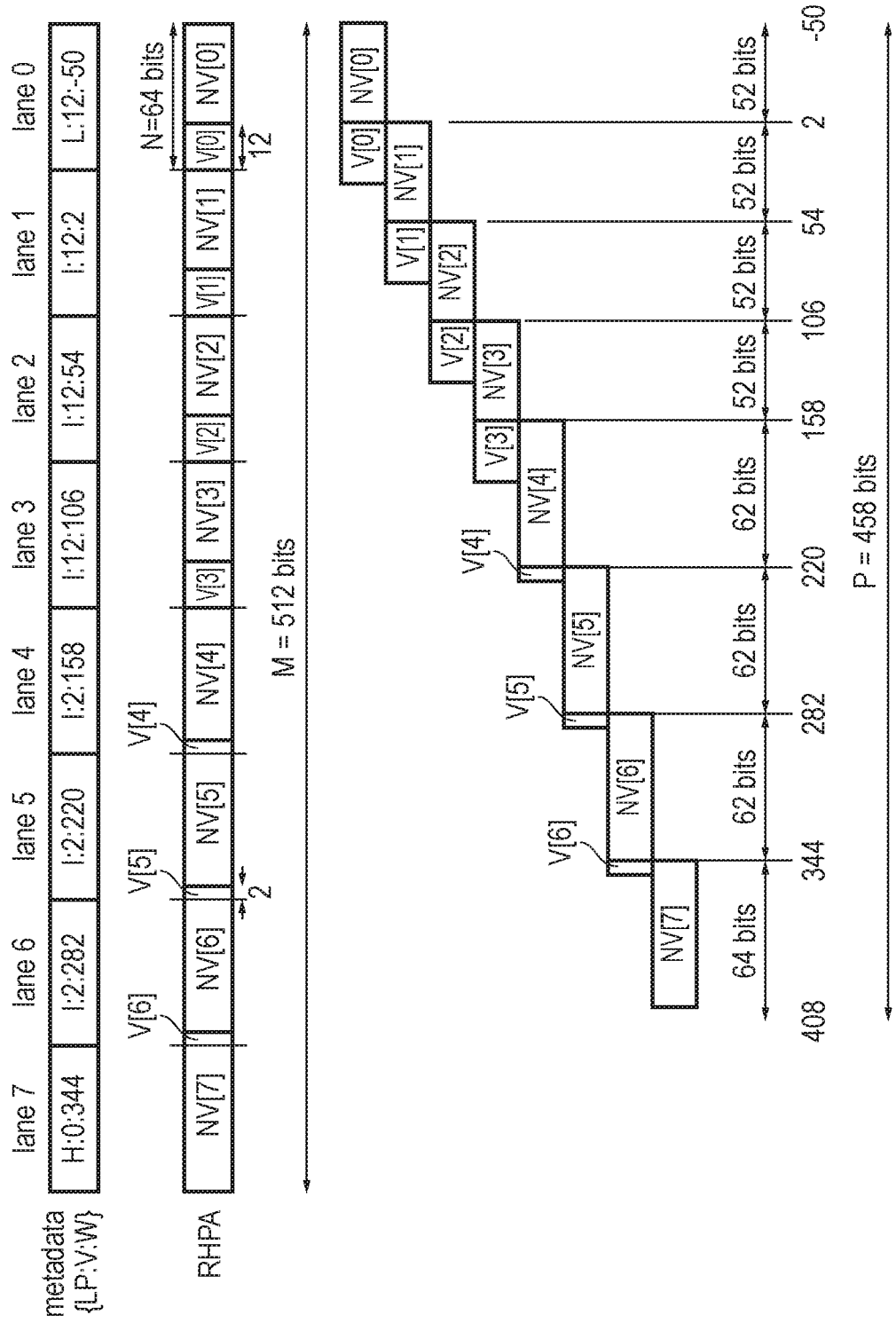
FIG. 25 shows an example where different N-bit portions of an RHPA value have different numbers of overlap bits.

As shown in part (1) of FIG. 4, an M-bit data value using the RHPA representation is divided into respective vector lanes (also referred to as components, elements or portions) each comprising N bits, where N<M. In this example N is 64 bits, but this is just one example and other lane sizes (e.g. 32 or 128 bits) are also possible. Each N-bit portion is divided into a certain number V of overlap bits and N−V non-overlap bits. In this example, the number of overlap bits V is the same for each N-bit portion, but as shown in FIG. 25 below it is also possible to have different N-bit portions with different numbers of overlap bits.

When an integer or floating-point number is converted to RHPA format, some of the non-overlap bits are populated with non-sign information mapped from the original integer or floating-point number, while the overlap bits are populated with sign bits. For lane-based addition and subtraction purposes each lane behaves like an N-bit signed two's complement number (with carries propagating from the non-overlap portion to the overlap portion if necessary), but when viewed from a multilane perspective the lanes form a redundant mixed-sign representation of a larger P-bit number. In the example of FIG. 4 there are four lanes and so M=256, but the number of lanes can vary depending on the hardware implementation and/or the metadata defined for a given RHPA number.

Part (2) of FIG. 4 shows the relative significance of each bit of the RHPA number shown in part (1). The overlap bits V[0] of the least significant lane have the same significance as the V least significant bits of the non-overlap bits NV[1] of the next lane. Likewise overlap bits V[1] and V[2] have the same significance as the V least significant bits of non-overlap bits NV[2] and NV[3] respectively. The overlap in significance between lanes means that the RHPA number as a whole represents a P-bit value which is smaller than the total number of stored bits M. If V is the same for each N-bit portion (other than the top portion), then $$P = M - V\left(\frac{M}{N} - 1\right).$$

More generally, if different lanes can have different numbers of overlap bits, $P=M-\Sigma V$, where $\Sigma V$ is the total of the number of overlap bits in each lane other than the top lane.

In each overlapping portion of the P-bit value, the actual bit values of that P bit number are represented by the sum of the overlap bits V of the lower lane and the non-overlap bits NV in the higher lane (taking into account any carries that may be caused by adding the non-overlap bits NV and the overlap bits in lower lanes). Hence, one way of converting the RHPA value to an equivalent integer value is shown in part (3) of FIG. 4, where the overlap bits in each lane are sign-extended and added to the non-overlap bits of the higher lane (from low order to high order, adjusting the overlap bits after each lane addition).

The RHPA number is redundant in the sense that there is more than one way to represent a given P-bit number using the M bits of the RHPA value. For example considering the overlap in the lowest two lanes, in an example where the number of overlap bits V=4, if the corresponding bits of the P-bit value are 1111, then one way to represent this would be to have the overlap bits V[0]=0b0000 in the lower lane and the non-overlap bits NV[1]=0b1111 in the next highest lane. However, other ways of representing the same values could be V[0]=0b0101 and NV[1]=0b1010, or V[0]=0b1111 and NV[1]=0b0000, say.

Note that the overlap bits V[3] in the highest lane are not really overlap bits because there is no higher order lane to overlap with. Hence, it can often be useful to consider the high order lane as having all non-overlap bits, and some of the examples below will show this. Hence, in some cases the top lane may be considered to be formed entirely of non-overlap bits (so that the most significant bit of the P-bit value as a whole corresponds to the most significant bit of the M-bit value in the top lane).

However, in other embodiments, it may be preferable to treat the top lane as having overlap bits too, so that the most significant bit of the P-bit numeric value represented by the RHPA corresponds to the most significant bit of the non-overlap portion (excluding the overlap portion) of the top lane. This approach may make circuit implementation easier if it allows each lane to be processed in a more symmetric manner (with fewer modifications to the way the top lane is processed compared to other lanes).

By representing a P-bit numeric value in a redundant form as shown in FIG. 4, several RHPA numbers can be added without carries between lanes, because any carries from additions of the non-overlap portions in a given lane can be accommodated within the overlap portion of the same lane, without needing to propagate carries through to the next lane. The addition performed in each lane simply sees two or more N-bit signed integers which are added by performing a conventional N-bit two's complement addition, which is entirely independent of the corresponding N-bit additions in other lanes. This means that each of the N-bit additions can be performed in parallel, so that regardless of the number of lanes, the entire M-bit values can be added in the time taken to perform a N-bit addition.

In fact, at least $(2^{V-1}-1)$ such RHPA numbers can be added without carries between lanes, with any carries from the addition of non-overlap portions being collected in the overlap portion (if there are lanes having different numbers of overlap bits, then V in this expression would be the minimum number of overlap bits in any given lane having overlap bits). The $(2^{V-1})$th addition would be the first that could possibly generate a carry between lanes (because the top overlap bit is a sign bit, lane overflow occurs when there is a positive or negative overflow from the second most significant overlap bit, which when starting from an RHPA number where all the bits are 0 can occur after a minimum of $2^{V-1}$ further additions have been performed). For example, if V=14, this would allow at least 8191 RHPA numbers to be added to the accumulator (i.e. 8192 values added in total) before there is any risk of overflow from a single lane. This is particularly useful for the high performance computing field where addition of many input values is common. In practice, as not every addition will cause a carry into the overflow portion, sometimes more than $2^{V-1}$ accumulations are possible without overflow from the top bit of the N-bit portion.

Occasionally, if enough additions have been performed to cause a risk of overflow (or an actual overflow) from the top bit of an N-bit lane, then an overlap reduction operation can be performed to convert a given RHPA value to a second RHPA value in which the overlap bits represent a smaller magnitude than the overlap bits of the given RHPA value, to effectively free up bit space in the overlap portions for accommodating more carries. Also, when converting an RHPA number back to another format such as integer or floating-point, such overlap reduction may also be performed. However, in practice, such an overlap reduction operation may not be required often, and so by allowing M-bit additions of multiple inputs to be performed in the time taken for an N-bit addition, RHPA enables a great saving in processing time. Note that the term "overlap reduction" does not imply that the overlap bits in every lane must be reduced to a smaller magnitude. It is enough that at least one lane has its overlap bits reduced in magnitude, and it is possible that some forms of overlap reduction (e.g. the restricted-redundant example of FIG. 13 discussed below) could lead to overlap bits in a given lane increasing in magnitude. Some examples of overlap reduction operations are described below.

Figure 5:
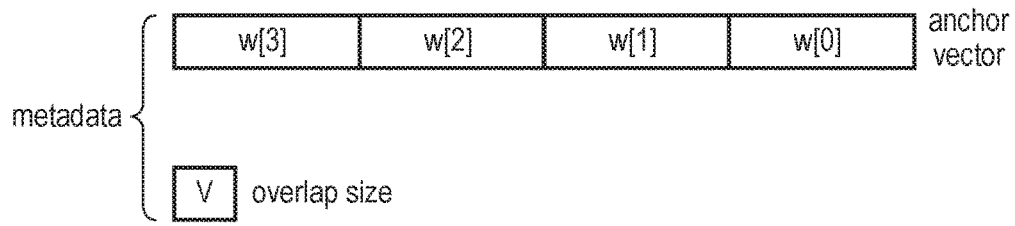
FIG. 5 shows an example of metadata for defining a significance of each portion of the Redundant HPA value and for defining the number of overlap bits.

FIG. 5 shows an example of the metadata defined for an RHPA value. In this example, the metadata includes an anchor vector comprising a number of anchor elements w[i] each specifying the significance (or 'weight') of the least significant bit in a corresponding lane of the RHPA value, and an overlap size value V specifying the number of overlap bits in each lane.

In some cases, the metadata for an RHPA number may also identify the number of N-bit lanes comprised by the RHPA number, either explicitly or implicitly by identifying the total number of bits M (from which, given the lane size N, the number of lanes can be determined).

In contrast to the HPA format, for which the weights w[i], w[i+1] in successive lanes would differ by the lane size N, for an RHPA value the weights w[i], w[i+1] in successive lanes differ by N–V (the lane size minus the number of overlap bits). Hence, the processing circuitry 14 can identify from the anchor vector and the overlap size in the metadata the significance of each bit within an RHPA value. The significance of a given bit j of a given lane with anchor value w[i] (j=0 to N–1) is given by w[i]+j. Note that during additions of two or more RHPA numbers, it is not necessary to consider the anchor values or the overlap size, and the numbers can simply be added to form a result. The anchor value is used by the processor when converting between the RHPA format and other formats such as integer or floating-point, and the overlap size value V is referenced when performing overlap propagation or conversion to/from a different format.

FIG. 5 shows the overlap size value V as separate from the anchor vector, but in another example the overlap size V may be specified in the anchor vector itself. For example a SIMD (single instruction multiple data) vector register of the same size as the registers 12 used to hold the RHPA value may be allocated for storing the metadata, with each lane of the vector register holding the corresponding anchor value w[i] for a corresponding lane of processing and the overlap size V.

Also, it is not essential for these parameters to be defined in a control register. In some systems the overlap size V may be fixed for a given hardware implementation and may not be programmable by the user. However, enabling the programmer to specify the overlap size V can be useful for trading off the number of successive additions which can be performed without propagating carries between lanes against the total number of lanes required for adding a value of a given size P. In general, the larger the overlap size V, the more additions that can be performed without overlap propagation, but this will result in more lanes being required for a number of a given size P. By reducing the overlap size V numbers of a given size can be added using fewer lanes, which may allow performance savings by allowing two or more separate sets of RHPA values to be added in parallel using respective subsets of lanes of a wider vector processor (see FIGS. 21-24 discussed below for example), but in this case the overflow boundary will be reached sooner and fewer additions can be performed before it may be necessary to propagate overlap bits to a subsequent lane.

In other examples the overlap size V could be specified in the encoding of an instruction for controlling processing of RHPA values. Similarly, the anchor vector could also be identified in an instruction. In some examples, instead of an anchor vector specifying the significance of each lane separately, the metadata could simply specify the significance of a given bit within a given lane of the RHPA value, and the significance of the other lanes could be derived from that bit significance. For example if only the bit significance of the lowest lane is specified, the other lanes' significance can be calculated by adding multiples of N–V to the significance of the lowest lane.

Figure 6:
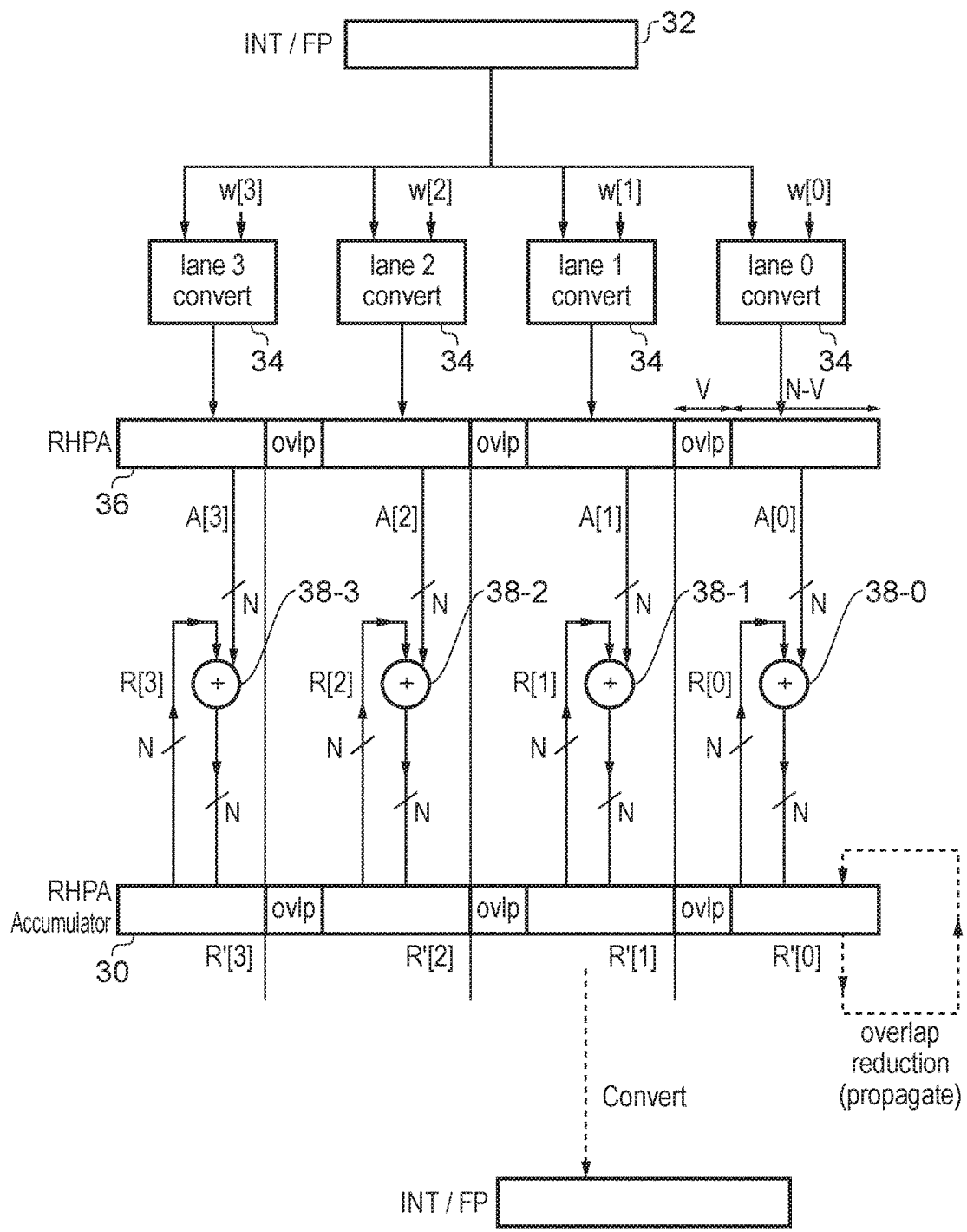
FIG. 6 shows an example of an accumulation operation using the RHPA representation.

FIG. 6 shows an example of using the RHPA format to speed up an accumulation operation, which is a relatively common operation, especially in high performance computing where thousands or even millions of different values may need to be added together. An accumulator register 30 may be provided to store an accumulator value in the RHPA format which represents the running total of all the values added so far. In each cycle, an input operand 32 is provided to add to the RHPA accumulator value. For some instructions, the input operand 32 could be specified directly by the instruction. For other types of instructions, the input operand 32 may be the result of some other processing operation applied to operands specified directly by the instruction (e.g. a multiply-add instruction may generate the input operand 32 by multiplying two values). The input operand 32 could be an integer value or floating-point value.

The input operand 32 is provided to a number of lane conversion units 34 which generate corresponding N-bit portions A[0] to A[3] of an RHPA number 36. Each lane conversion unit 34 receives that lane's significance w[i] as defined by the corresponding element of the anchor vector of the metadata associated with the RHPA accumulator value, and uses this to map bits of the input operand 32 (in the case of a floating-point value, bits of the significand) to bits of corresponding significance within that lane. For some lanes there may be no bits in the input operand 32 which correspond in significance with any of the bits in that lane, and so such lanes may be filled entirely with sign bits (0 if the input operand 32 is positive, 1 if the input operand 32 is negative). The overlap bits of each lane are set to sign bits. The conversion of an integer or floating-point value to RHPA will be described in more detail below in FIGS. 10 and 11.

Each N-bit portion of the generated RHPA value 36 is then added to a corresponding portion of the accumulator value by a respective add circuit unit 38 provided in parallel for each lane. Each add circuit unit 38 performs an independent N-bit signed two's complement addition in parallel with the other add circuit units 38, to generate a corresponding N-bit portion of the result which is written back to the corresponding portion of the accumulator register 30 to replace the previous value of the accumulator. The additions are independent, in that no carries are propagated between lanes.

By repeating the accumulation operation several times, a series of input operands can be added together quickly, exactly and associatively and the order in which the input operands are input will not affect the result. This means that accumulations can be performed faster. For example, two or more instances of the circuitry shown in FIG. 6 could be provided in parallel to add respective subsets of an array of values to be added, to form a number of partial accumulator values. Each of the partial accumulator values can then be added to form the final result. This would not be possible with floating-point arithmetic because of the non-associative nature of floating-point.

The final accumulation result can either be left in the accumulator register 30 for further processing as an RHPA value, or converted back to an alternative number representation. Techniques for converting RHPA to integer or floating-point are described below.

Some examples are useful here. For ease of explanation, consider a tiny RHPA format, consisting of a 32-bit number broken into four 8-bit lanes. For these examples V=4, so each lane has 4 non-overlap bits and 4 overlap bits. Rather than trying to convert FP numbers to this format, we use as inputs 16-bit sign-magnitude integers. We further assume an implicit anchor of 0, so we are interested in all integer values (if the initial value was in FP format, then if there were any fractional input bits they would be discarded—but this is not a possibility with sign magnitude integer inputs).

Example 1

Suppose we convert the sign magnitude hexadecimal integer 123a to RHPA format. The anchor is zero, so the non-redundant bits of the low-order lane contains the part of the input with weights $2^0$ to $2^3$, namely a=1010 (binary). The number is positive, so the overlap bits of the low order lane are zeros, giving a low-order lane value of binary 0000_1010. Similarly, the next lane contains the parts of the input with weights $2^4$ to $2^7$, in this case 3=0011 (binary). Proceeding with all the lanes (they are all computed in parallel) we get the RHPA number:

0000_0001 0000_0010 0000_0011 0000_1010

Example 2

Converting 923a to RHPA is similar (this is −123a in sign-magnitude format), but since the sign bit is set, each lane gets the two's complement of what it did in the previous example:

1111_1111 1111_1110 1111_1101 1111_0110

Example 3

Adding 7fff (largest possible positive input) to 123a shows the utility of the overlap bits. rhpa is a small program here that adds a 16-bit sign magnitude number to one of the tiny RHPA numbers. The addition is easily handled with no carries between lanes because of the overlap bits.

| $ rhpa 0102030a 7fff | | | |
|---|---|---|---|
| 0000_0001 | 0000_0010 | 0000_0011 | 0000_1010 |
| + 0000_0111 | 0000_1111 | 0000_1111 | 0000_1111 |
| = 0000_1000 | 0001_0001 | 0001_0010 | 0001_1001 |

Example 4

Adding 20f0 to 923a shows that different lanes can have different signs: two of the lanes are positive and two are negative.

| $ rhpa fffefdf6 20f0 | | | |
|---|---|---|---|
| 1111_1111 | 1111_1110 | 1111_1101 | 1111_0110 |
| + 0000_0010 | 0000_0000 | 0000_1111 | 0000_0000 |
| = 0000_0001 | 1111_1110 | 0000_1100 | 1111_0110 |

Further examples are shown in Appendix A below.

In addition to enabling values to be added with narrower add circuit units than regular HPA, RHPA also has the potential to be much faster because it can accumulate multiple values at the same time. Whereas with regular HPA, a given very wide adder could only add two HPA values at a time, with RHPA since the overlap bits can accommodate addition of up to $2^{V-1}-1$ values to an accumulator without worrying about lane overflow, this means that an addition of many values can be performed as a single operation with all of the values being added simultaneously, rather than needing a number of sequential additions.

For example, FIG. 7 shows an addition of j RHPA values (j is greater than or equal to 3), where each add circuit unit 42 includes a j to 2 reduction tree 44 (Wallace tree, similar to what is used in multipliers) which can reduce j separate N-bit values to two N-bit terms, followed by a carry propagate adder 46 for adding the two N-bit terms to produce an N-bit result value R. For example, j could be 4, 8 or 16, and compared to sequentially adding a single value at a time, this can reduce the time taken to add a given number of data values by a significant amount. The reason this is possible with RHPA is because the overlap bits allow us to add multiple items without crossing lane boundaries.

Figure 8:
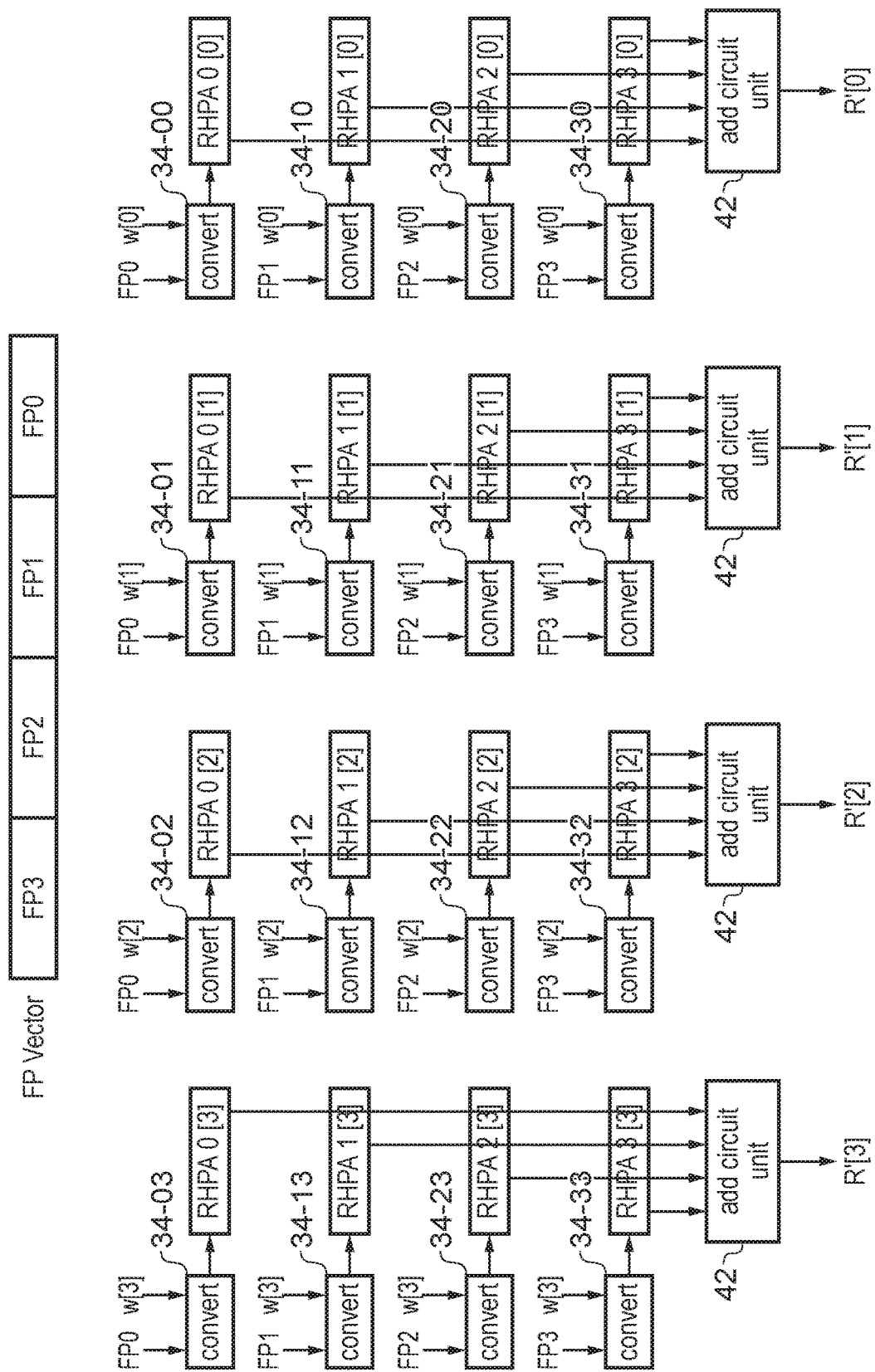
FIG. 8 shows an example where each RHPA value added in a single operation is converted from a corresponding element of an input vector.

As shown in FIG. 8, the RHPA values being added in a single operation could be derived from respective input values specified in an input vector. In this example, each element of the input vector is a respective floating-point value FP0-FP3. The processor has an array of lane conversion units 34 which each function as in the lane conversion units of FIG. 6, but which receive different floating-point inputs FPj or anchor weights w[i]. In general, the lane conversion unit 34-ji generates the $i^{th}$ element of an RHPA value corresponding to floating-point value FPj of the original input vector. For example, floating-point value FP0 is provided to each of the lane conversion units 34-00 to 34-03 of the first row, which generate the respective elements RHPA0[0] to RHPA0[3] of a corresponding RHPA value RHPA0. Similarly, the other rows generate the elements of RHPA values RHPA1-RHPA3 corresponding to floating-point values FP1 to FP3. The corresponding elements of each generated RHPA value are then added by add circuit units to generate the corresponding results of the accumulator value. The processing for each lane is performed entirely in parallel with other lanes.

While FIG. 8 shows an example where the number of floating-point values in the input vector is the same as the number of lanes of processing of the RHPA value, this is not essential. For instance, an 8-element floating-point vector could be mapped to 8 4-element RHPA values with 4 lanes of processing adding the corresponding elements of each RHPA value. The number of lanes within the RHPA values depends on the metadata for the RHPA value, not the size of the input vector.

Also, while not shown in FIGS. 7 and 8 for ease of explanation, in some cases one of the RHPA values being added could be the previous value of the accumulator value R itself.

Figure 9:
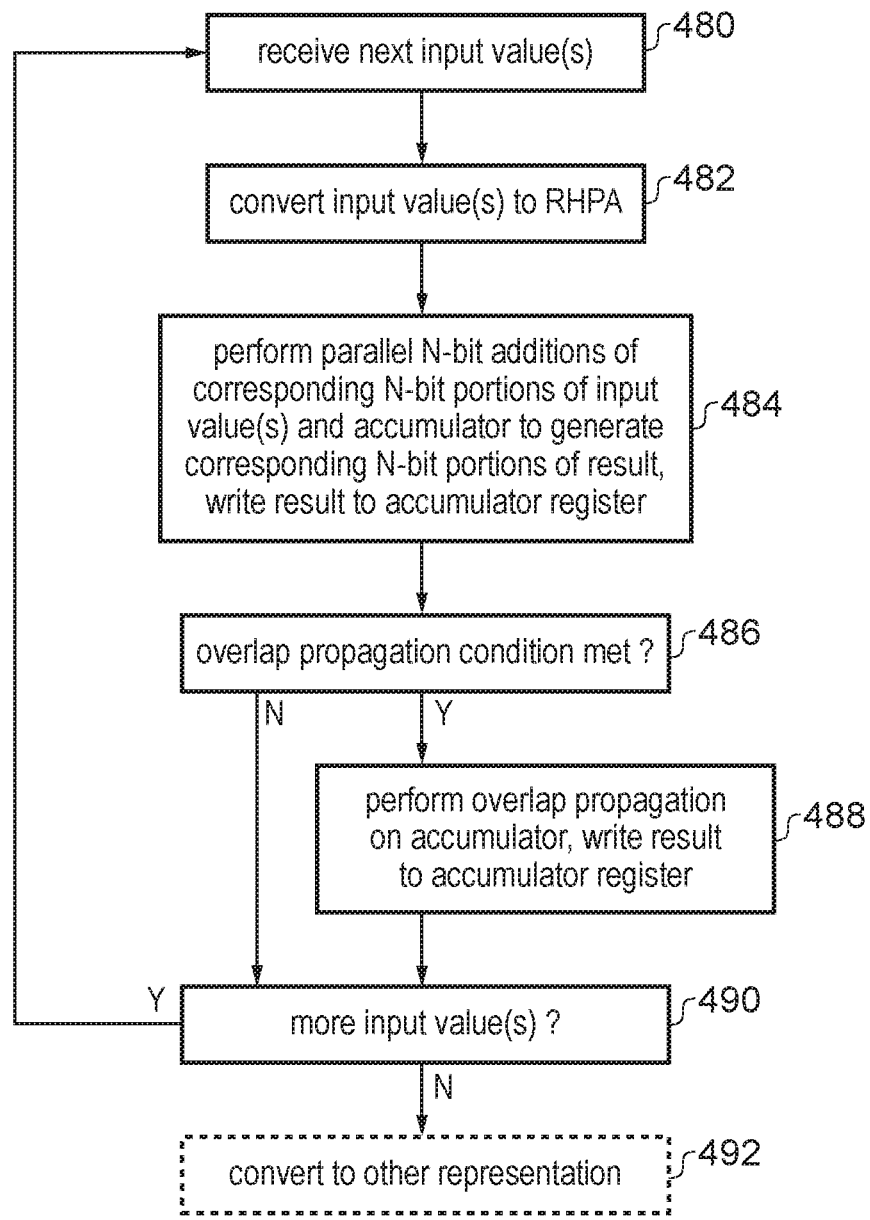
FIG. 9 shows a method of accumulating values using the RHPA representation.

FIG. 9 shows a method of performing accumulations using the RHPA format. At step 480 one or more next input values are received. These input values could be operands specified directly by an instruction, or could be the result of some other processing performed in response to an instruction, such as the product of a multiplication for example. As shown in FIGS. 7 and 8, in some cases more than one input value may be received at this point. At step 482, the received input value(s) are converted to the RHPA form. Examples of the conversion will be described below with respect to FIGS. 10 and 11. At step 484 the parallel add circuit units 38, 42 perform parallel N-bit additions of corresponding N-bit portions of the input value(s) and the accumulator value to generate corresponding N-bit portions of the result, and the result is written to the accumulator register 30. Each N-bit addition may be a standard two's complement N-bit addition which can be performed entirely in parallel with the other additions. Alternatively, when two or more input values are being added to the accumulator, then the N-bit addition can comprise a reduction of a number of terms to two terms using a Wallace tree and the addition of the two terms using a carry-propagate adder to generate the corresponding N-bit portion of the result.

At step 486, it is determined whether the overlap propagation condition is met. As discussed below, the overlap propagation condition may be considered met when, for example, a certain number of accumulations have been performed, when the overlap bits in a certain lane reach a given value, or when an actual overflow occurs from a given lane during one of the N-bit additions performed at step 484. If the overlap propagation condition is met, then at step 488 an overlap propagation operation is performed on the accumulator value to propagate overlap bits from one lane to the following lane, which reduces chances of overflow from a given lane. Various examples of the overlap propagation operation are described below. The result of the overlap propagation operation is written back to the accumulator register so that further accumulations can be performed with reduced chance of overflow between lanes. On the other hand, if the overlap propagation condition is not met, at step 488 is omitted. At step 490 it is determined whether there are more input values to be considered and if so the method returns to step 480. If not, the method ends, or optionally at step 492 the final accumulator result can be converted to another representation such as floating point, fixed point, or integer. Techniques for performing this conversion are described below with respect to FIGS. 17 to 19.

While FIGS. 6-8 show examples of performing additions on values in RHPA format, other operations can also be performed. For example, more generally the processing circuitry 14 may have a number of operation circuit units to perform independent N-bit operations in parallel to compute a function of corresponding N-bit portions of two or more RHPA values to generate a corresponding N-bit portion of a result value also in RHPA format. For example, each N-bit operation may comprise any of the following: an addition or subtraction, a multiplication, a logical operation (e.g. AND, OR, NOR, XOR, etc.), a Galois field operation, etc., or a combination of two or more such operations. Using the RHPA format enables steps of the N-bit operation which result in a carry to be accommodated within the same lane, which helps to speed up processing of long values.

Conversion to RHPA Representation

Figure 10:
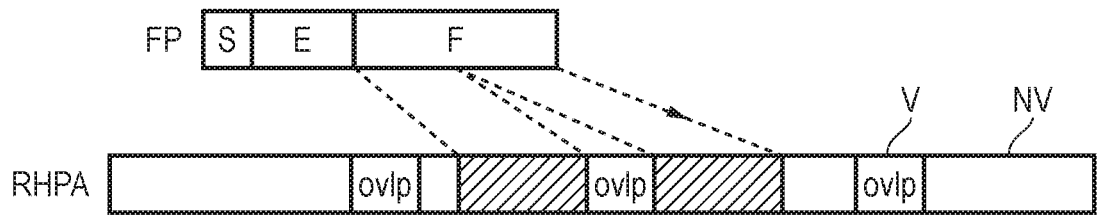
FIGS. 10 and 11 show examples of converting a floating-point value to an RHPA value.
Figure 11:
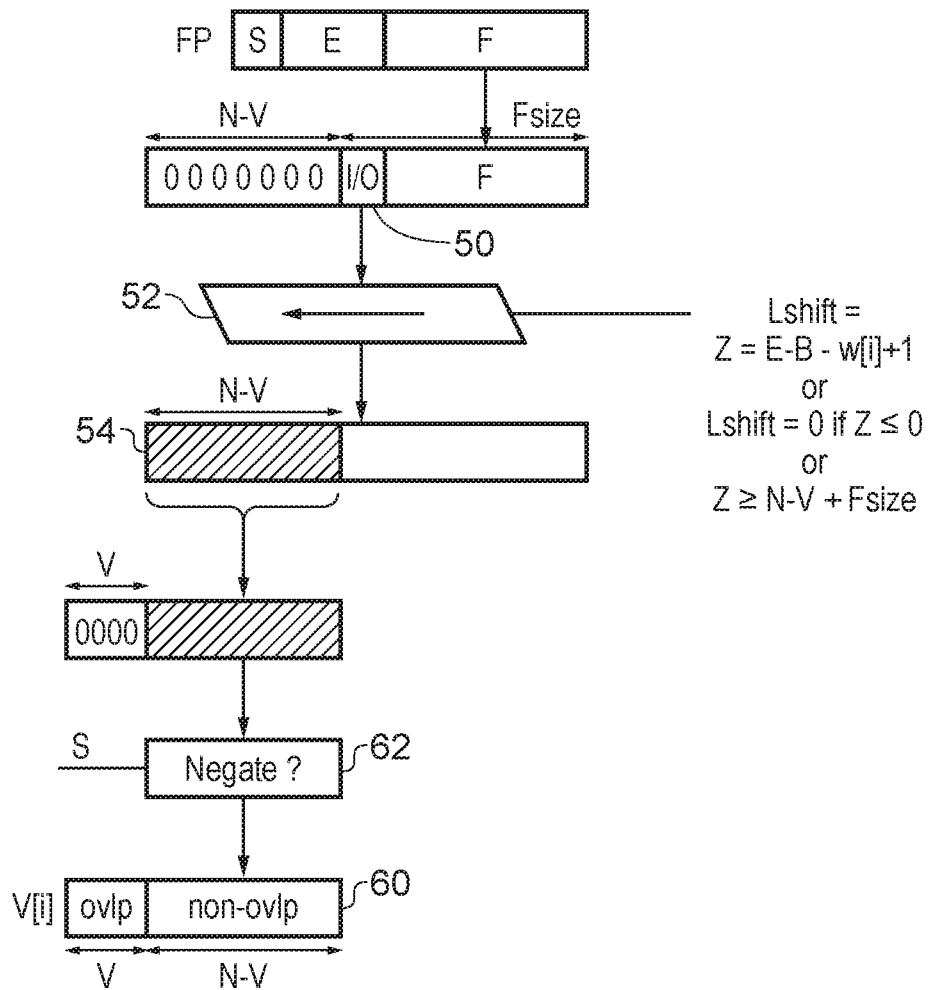

FIGS. 10 and 11 show examples of converting a floating-point value to an RHPA value. As shown in FIG. 10, the conversion essentially maps bits of the significand F of the floating-point value to corresponding non-overlap bits of the RHPA value, which could span more than one lane, in dependence on the exponent E of the floating-point value and the anchor value defined in the metadata for the RHPA calculation to be performed. If the floating-point value is negative, the significand bits are negated on mapping them to the RHPA non-overlap bits. On the other hand, the overlap bits of the RHPA value are filled with sign bits. If the floating-point value is positive (indicated by the sign bit S=0) then the overlap bits V of each lane would be zero, and if the floating-point value is negative (sign bit S=1), then the overlap bits V are set to 1.

FIG. 11 shows the conversion operation in more detail. FIG. 11 shows the processing operation for generating a single N-bit lane of the RHPA value. To generate the entire RHPA value, the operation shown in FIG. 11 would be performed for each lane (preferably in parallel, although a serial implementation could also be used). Hence, FIG. 11 corresponds to the operation of a single lane conversion unit 34 shown in FIG. 6 or 8, for example.

As shown in FIG. 11, the stored fraction F is expanded to the actual significand by including the implicit bit 50, which is equal to 1 if the floating-point value is normal and non-zero, and equal to 0 if the floating-point value is subnormal or zero. Also, the actual significand (1.F or 0.F) is padded with N−V bits equal to '0' at the most significant end. The resulting value is input to a left shifter 52 which left shifts the value by a number of bit positions, Lshift. The shift amount Lshift is calculated based on the exponent E of the floating-point value being converted and the lane anchor value w[i] for the particular lane being processed.

In general, Lshift is calculated with a value equivalent to the following, where $Z=E-B-w[i]+1$:

Lshift=0 if $Z \leq 0$ (this is the case when the floating-point value is less significant than any of the bits of the lane to be generated)

Lshift=0 if $Z \geq N-V+Fsize$ (this is the case when the floating-point value is more significant than any of the bits of the lane to be generated)

Otherwise, Lshift=Z.

where:

E is the (biased) exponent of the floating-point value

B is the bias value for the particular floating-point representation being used, e.g. for single precision B=127 and for double precision B=1023 w[i] is the lane anchor value for the current lane being generated, which indicates the significance of the least significant bit in that lane Fsize is the number of bits in the actual significand (including the implicit bit of 0 or 1, but not including the N–V '0' bits), e.g. Fsize=24 for single precision or 54 for double precision N is the lane size (the total number of bits in one lane of the RHPA value), and V is the number of overlap bits.

It will be appreciated that it is not essential for the shift amount to be calculated with this exact set of operations—any operation which gives an equivalent result could be used. Also, in examples where the lane anchor value w[i] indicates the significance of a bit other than the least significant bit of the lane, the expression for Z can be adjusted accordingly.

The top N–V bits of the shift result 54 are selected. If 0<Z<N-V+Fsize then at least one bit from the original significand will have been shifted into this window. The top N–V bits of the shift result 54 are padded with V overlap bits at the most significant end. The overlap bits are set to 0 initially. This value is output as the converted N-bit lane value 60 for the current lane if the sign bit S of the original floating-point value was 0 (the floating-point value was positive). On the other hand, if the floating-point value was negative (sign bit=1), then the value is negated 62 (invert all the bits and add 1) and the result is output as the converted N-bit lane value 60.

In summary, the anchor value w[i] gives the weight of the smallest bit we care about for the current lane (with the difference in anchors between lanes corresponding to N–V). The appropriate significand bits that are within the range represented by the lane are selected using the shifter 52. If we are converting a positive number the overlap bits contain 0s, and if we are converting a negative number we populate the lane with the N-bit two's complement of the shift result, which has the effect of populating the overlap bits with 1s. This operation can then be performed in parallel for each lane to generate the overall RHPA value.

FIGS. 10 and 11 show conversion of a floating-point value to an RHPA value. When converting a fixed-point or integer value, the operation is the same, except that the there is no exponent and the exponent value E in the expressions above is effectively fixed to some known value (zero for integers, and non-zero for fixed-point values), and the number of bits in the original value Fsize may be different. As for floating-point, bits from the significand are mapped to corresponding bits of the N-bit lane if the original value overlaps with the range represented by that lane, but no negation is necessary as the fixed-point or integer value is already a two's complement number using signed-digit representation (as opposed to the sign-magnitude representation of the FP number).

Overlap Reduction

As noted above, we can add at least $2^{V-1}$ numbers without worrying about lane overflow, a condition in which the value of a particular N-bit lane changes in such a way to lose information. Lane overflow would occur when a carry out occurs from the second most significant overlap bit of the lane. To avoid losing information, when we are at or near the lane overflow boundary, an overlap reduction operation can be performed to reduce the number of overlap bits being used, to free up space in the overlap bits to accommodate further carries if necessary. In general, the overlap propagation operation may comprise any operation in which a first RHPA value is converted to a second RHPA value in which the overlap bits in at least one N-bit portion of the second RHPA value represent a smaller magnitude than the overlap bits in a corresponding portion of the first RHPA value.

One way of performing overlap reduction is to perform an overlap propagation operation in which the overlap bits from a given lane are propagated to the next highest lane and added to the non-overlap bits in that lane. By propagating the overlap bits to the next lane, the overlap bits in the preceding lane are pushed closer to zero, which reduces the chance of another addition causing a lane overflow. There are various ways of performing the overlap propagation operation, three of which are described below with respect to FIGS. 12 to 14.

Figure 12:
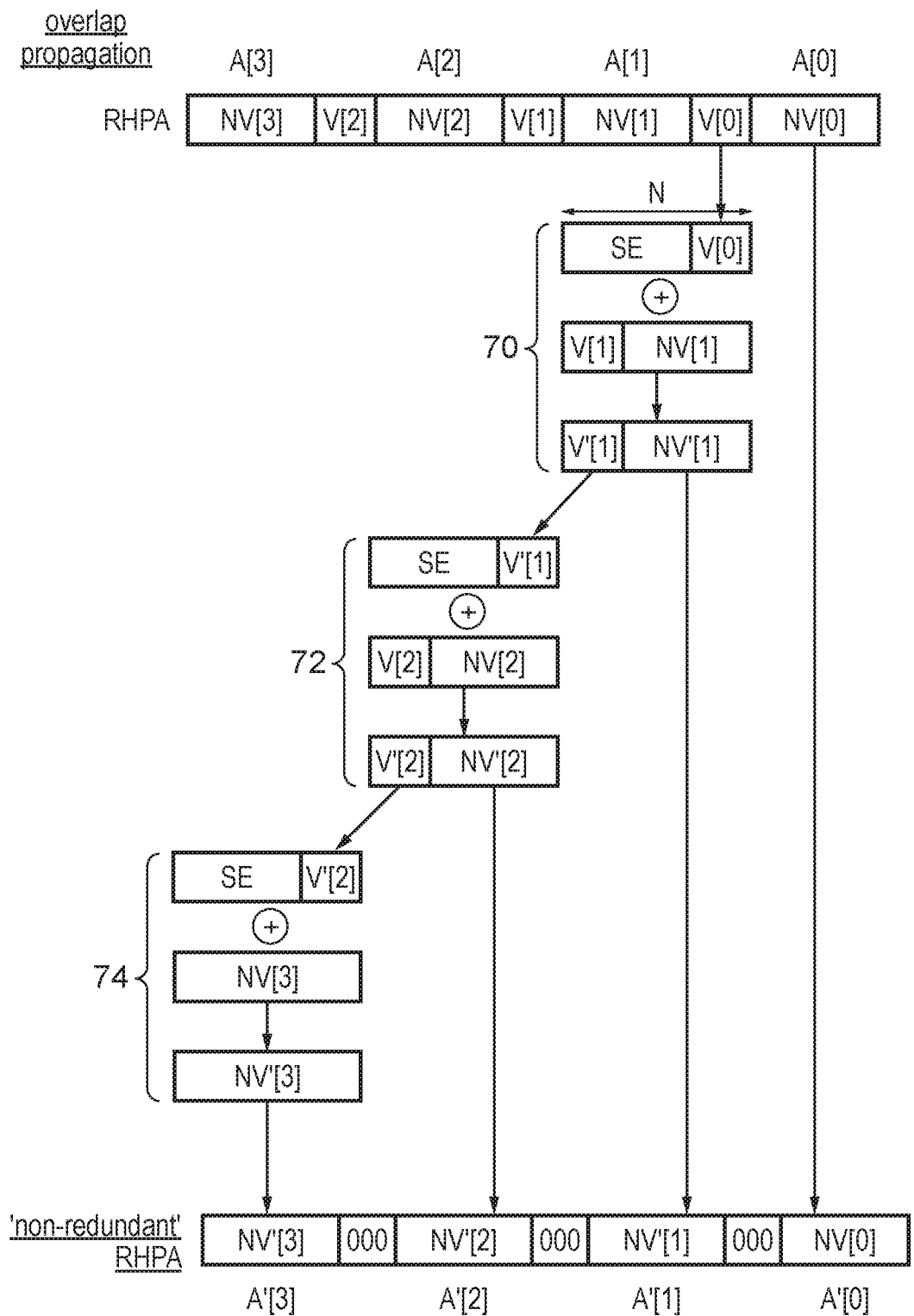
FIG. 12 shows a first example of an overlap propagation operation for generating an RHPA value in a non-redundant form.

FIG. 12 shows a first example of an overlap propagation operation in which a given RHPA value is converted into a "non-redundant" RHPA value, which refers to an RHPA value in which the overlap bits in each lane are all 0. While the concept of a "non-redundant redundant HPA" value may seem like an oxymoron, the term "non-redundant" is used to refer to the fact that there is only one way of representing a given value using an RHPA value where all the overlap bits are 0 (as opposed to RHPA values with some non-zero overlap bits which permit multiple ways of representing the same numeric value). With a non-redundant RHPA value, the non-overlap bits NV have the same bit values that the corresponding bits would have in a normal two's complement integer or fixed-point value.

As shown in FIG. 12, to make a given RHPA value non-redundant, first an initial N-bit addition 70 is performed to add an N-bit sign extended version of the overlap bits V[0] from the lowest lane to all N bits (including non-overlap bits NV[1] and overlap bits V[1]) of the next highest lane, to generate an N-bit value comprising modified non-overlap bits NV'[1] and modified overlap bits V'[1]. Although often the modified overlap bits V'[1] could be identical to the corresponding overlap bits V[1] of the original RHPA value, sometimes adding the sign extended overlap bits V[0] from the lower lane could result in a carry propagating into the overlap bits, resulting in a different value for the modified overlap bits V'[1]. This is why the subsequent additions are performed sequentially. Hence, for each subsequent lane a further N-bit addition 72, 74 is performed to add an N-bit sign extension of the modified overlap bits V'[1], V'[2] generated in the preceding addition to all N bits of the next highest lane, to generate further modified non-overlap bits and overlap bits, until the final lane is reached. The non-redundant RHPA value is then formed with the non-overlap bits NV[0] in the lowest lane being mapped directly from the original RHPA value, the non-overlap bits NV'[1], NV'[2], NV'[3] in other lanes corresponding to the modified non-overlap bits generated in the respective additions 70, 72, 74, and all overlap bits in the generated non-redundant RHPA value being set to 0.

In summary, making the number non-redundant is accomplished by adding the non-overlap bits of a given lane to the sign-extended overlap bits from the preceding lane, starting with the low order lane and preceding up to the high order lane, zeroing out the overlap bits for a given lane after they have been propagated to the next lane. Since each addition requires the modified overlap bits generated by a preceding addition, this is a sequential process and so if the vector of the original RHPA value is relatively wide, then this process can be slow.

A numeric example of converting an RHPA value to a non-redundant form is shown below, again with V=4 and N=8:

| lane3 | lane2 | lane1 | lane0 |
|---|---|---|---|
| 1101_0111 | 0111_1010 | 0111_0011 | 1000_0100 | step 1: sign extend lane 0 overlap bits, add to lane 1, zero out lane 0 overlap bits

| lane3 | lane2 | lane1 | lane0 |
|---|---|---|---|
| 1101_0111 | 0111_1010 | 0111_0011 | 0000_0100 |
|  |  | +1111_1000 |  |
|  |  | =0110_1011 | <= new lane 1 | step 2: sign extend new lane 1 overlap bits, add to lane 2, zero out new lane 1 overlap bits

| lane3 | lane2 | lane1 | lane0 |
|---|---|---|---|
| 1101_0111 | 0111_1010 | 0000_1011 | 0000_0100 |
|  | +0000_0110 |  |  |
|  | =1000_0000 | <= new lane 2 |  |
| 1101_0111 | 0000_0000 | 0000_1011 | 0000_0100 |
| +1111_1000 |  |  |  |
| =1100_1111 | <= new lane 3 |  |  | final non-redundant value:

| lane3 | lane2 | lane1 | lane0 |
|---|---|---|---|
| 1100_1111 | 0000_0000 | 0000_1011 | 0000_0100 |

Figure 13:
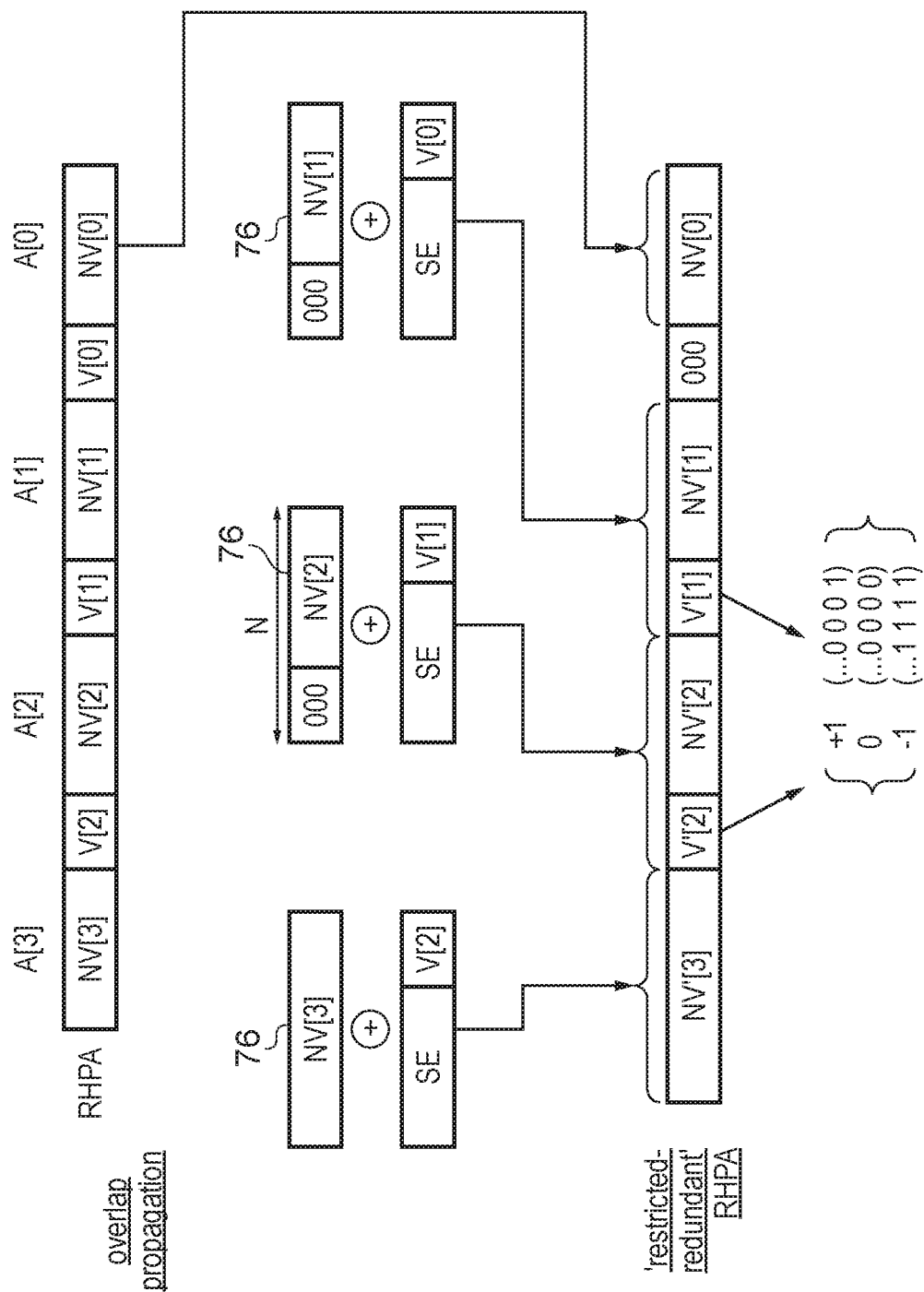
FIG. 13 shows a second example of an overlap propagation operation for generating an RHPA value in a restricted-redundant form.

FIG. 13 shows a second example of an overlap propagation operation to convert an RHPA value to a "restricted-redundant" (or "minimally-redundant") RHPA value. In the restricted-redundant RHPA value, in any given lane the corresponding set of overlap bits correspond to one of +1, 0 and −1 and cannot take any other value. That is, the pattern of bits of the overlap bits V in a given lane would, if interpreted as a signed integer, have a value of +1, 0 and −1. When considering the significance of the overlap bits V in the overall RHPA value, the overlap bits actually represent a value of $+2^w$, 0 or $-2^w$, where W is the significance of the lowest bit in the next highest lane. In the restricted-redundant form, different lanes can have different values for the overlap bits, but each lane has overlap bits restricted to one of the set {+1, 0, −1}. The least significant two overlap bits in a given lane will be 0b01, 0b00, 0b11 to represent +1, 0, −1 respectively, and if V>2 then any further overlap bits of the same lane will equal the second least significant overlap bit of that lane.

As shown in FIG. 13, an advantage of the restricted-redundant conversion is that the entire overlap propagation operation can be performed in parallel. As shown in FIG. 13, a number of parallel N-bit additions 76 are performed, each adding the sign-extended overlap bits V[i] for a given lane to the non-overlap bits NV[i+1] of the next highest lane (with the overlap bits in the next highest lane having been set to 0). Each of these additions 76 generates a corresponding N-bit portion of the restricted-redundant RHPA value. The least significant lane of the restricted-redundant RHPA value is formed simply by mapping the non-overlap bits NV[0] of the lowest lane in the original RHPA value directly to the corresponding bits of the restricted-redundant value, and setting the overlap bits in the lowest lane to zero. Since each lane does all the steps in parallel, using at most the information in its own lane and the overlap bits from the neighbouring lower-order lane, this method is much faster than the process for making a vector non-redundant.

An example of converting an RHPA value to a restricted-redundant is shown below.

| lane3 | lane2 | lane1 | lane0 |
|---|---|---|---|
| 1101_0111 | 0111_1010 | 0111_0011 | 1000_0100 | step 1: create sign-extended overlap values from the neighboring lower-order lane

| lane3 | lane2 | lane1 | lane0 |
|---|---|---|---|
| 0000_0111 | 0000_0111 | 1111_1000 |  | step 2: each lane zeros out its own overlap values

| lane3 | lane2 | lane1 | lane0 |
|---|---|---|---|
| 1101_0111 | 0000_1010 | 0000_0011 | 0000_0100 | step 3: add values from steps 1 and 2

| lane3 | lane2 | lane1 | lane0 |
|---|---|---|---|
| 1101_0111 | 0000_1010 | 0000_0011 | 0000_0100 |
| +0000_0111 | 0000_0111 | 1111_1000 |  |
| =1101_1110 | 0001_0001 | 1111_1011 | 0000_0100 | restricted-redundant value:

| lane3 | lane2 | lane1 | lane0 |
|---|---|---|---|
| 1101_1110 | 0001_0001 | 1111_1011 | 0000_0100 |
| (+1) | (−1) | (0) |  |

Notice that the restricted-redundant value in example 6 has overlap values confined to the set {+1, 0, −1}. Also notice that the restricted-redundant value is quite different from the non-redundant value representing the same number in the non-redundant example shown above. Unlike the sequential process of FIG. 12, this type of conversion can be done in a single cycle.

Once a number is restricted-redundant, a minimum of $2^{V-1}-2$ additional FP values can be added to it without causing lane overflow. Also a minimum of $2^{V-2}$ restricted-redundant RHPA values can be added together without causing lane overflow. This last bound is interesting for combining partial accumulations that may have come from other SIMD units or other processors.

Note that in the restricted-redundant overlap propagation operation of FIG. 13, it is possible that when the original RHPA value has a lane where all the overlap bits V[i] are 0, the corresponding lane in the restricted-redundant RHPA value could have overlap bits V'[i] representing +1 or −1, due to a carry caused by the addition of the non-overlap bits NV[i] of that lane and the overlap bits V[i−1] of the next lowest lane. Therefore, it will be appreciated that the term "overlap reduction operation" does not imply that all lanes must have their overlap bits reduced in magnitude—the magnitude of the overlap bits could increase in some lanes. However, in general, the overlap reduction operation will cause the overlap bits in at least one lane to reduce in magnitude.

Figure 14:
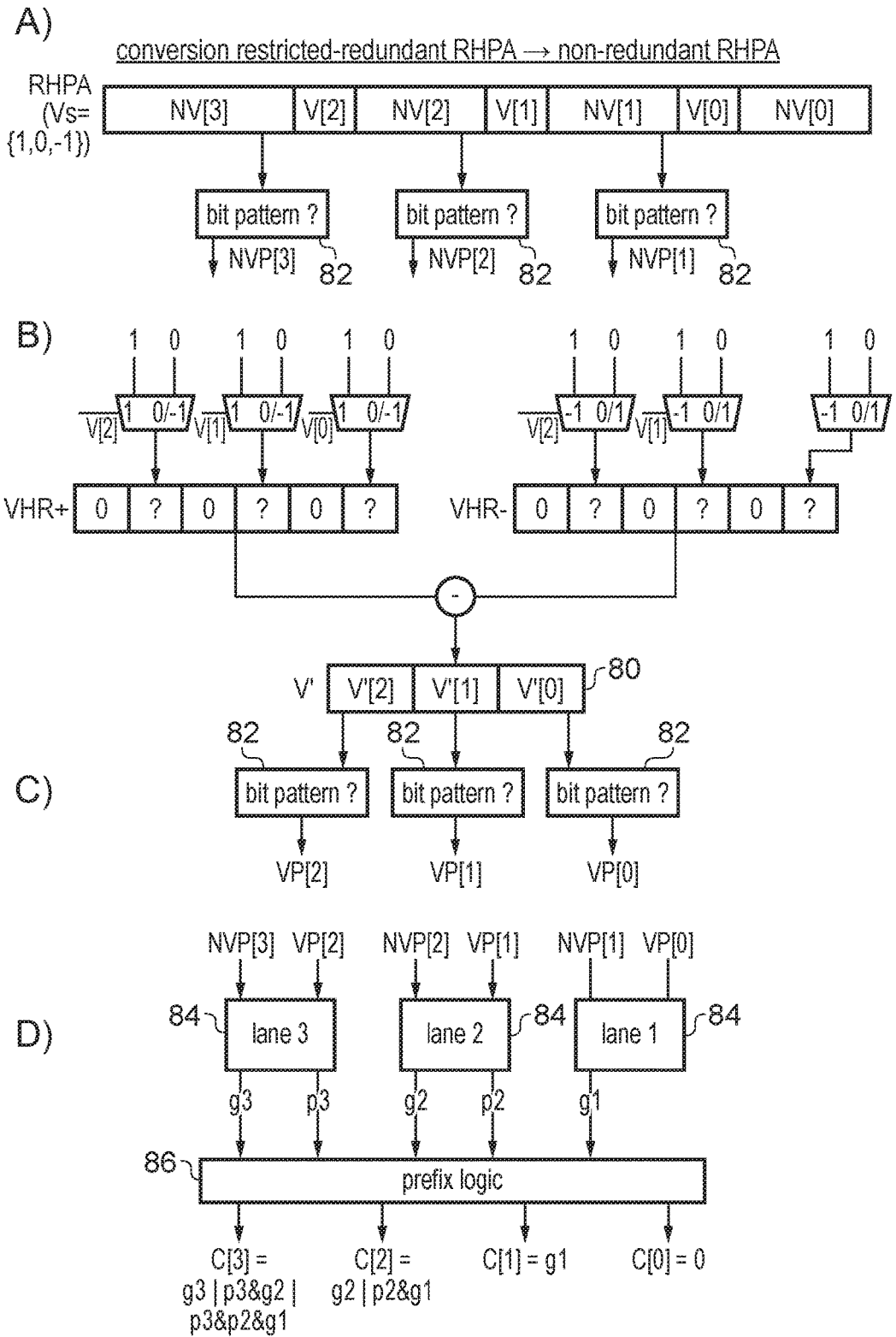
FIGS. 14 A-E show an example of converting a restricted-redundant RHPA value to a non-redundant RHPA value.
Figure 14:
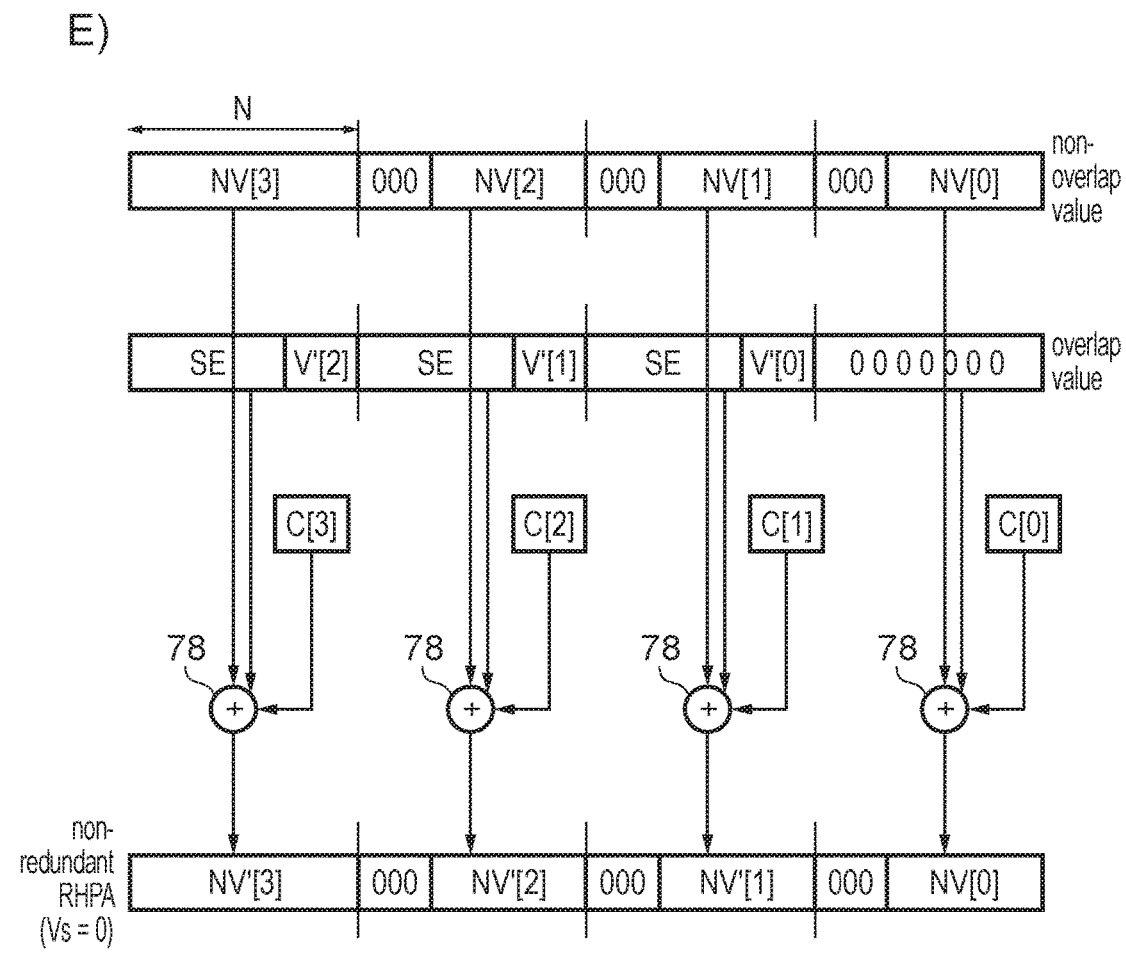

If a non-redundant RHPA value is required, then it can be generated from the restricted-redundant RHPA value by performing the same sequential method of FIG. 12. However, a non-redundant RHPA value can also be generated by first converting a given RHPA value to the restricted-redundant form using the method discussed with respect to FIG. 13, and then mapping the restricted-redundant value to a non-redundant RHPA value as shown in FIG. 14. An advantage of this approach is that the non-redundant RHPA value can be generated with a series of parallel N-bit operations (rather than a sequential operation as in FIG. 12).

In general, the method shown in FIG. 14 generates an overlap value and a non-overlap value based on the restricted-redundant RHPA value to be converted to non-redundant form. The overlap value represents the total of all the overlap bits of the restricted-redundant RHPA value (taking into account each bit's sign and relative significance), and the non-overlap value represents the total of all the non-overlap bits (again, taking into account their sign and significance). As shown in part E of FIG. 14, the overlap value and non-overlap value are added to generate the non-redundant RHPA value, with the addition being carried out in N-bit chunks by parallel adders 78. Each adder 78 adds corresponding N-bit portions of the non-overlap value and overlap value together with a carry bit C representing the carry value that would propagate from the next lowest lane if a full M-bit addition of the overlap value and non-overlap value was carried out, to generate a corresponding portion of the non-redundant RHPA value.

As shown in part E of FIG. 14, the non-overlap value simply corresponds to the restricted-redundant RHPA value with any overlap bits V set to 0 (as discussed above, the top lane may be treated as not having any overlap bits, so may remain the same in the non-overlap value).

Taking the restricted-redundant RHPA value shown above as an example (again with N=8 and V=4):

| lane3 | lane2 | lane1 | lane0 |
|---|---|---|---|
| 1101_1110 | 0001_0001 | 1111_1011 | 0000_0100 |

The corresponding non-overlap value would be:

1101_1110 0000_0001 0000_1011 0000_0100.

On the other hand, generating the overlap value is a little more complex because some of the sets of overlap bits could represent −1 and so the total of these bits are subtracted from the total of the overlap bits representing +1 or 0. For example, in restricted-redundant RHPA value:

| | lane3 | lane2 | lane1 | lane0 |
|---|---|---|---|---|
| | 1101_1110 | 0001_0001 | 1111_1011 | 0000_0100 |
| Overlap bits represent: | | (+1) | (−1) | (0) | but these indicate adjustments to the next highest lane of the non-overlap value as follows:

| lane3 | lane2 | lane1 | lane0 |
|---|---|---|---|
| 1101_1110 | 0000_0001 | 0000_1011 | 0000_0100 |
| +1 | −1 | 0 | |

(note that the overlap bits in lane 1 of the restricted-redundant RHPA value actually represent an adjustment to lane 2 for example). We can see that effectively, the overlap bits represent a high-radix two's complement value with signed digits of +1, 0 or −1. For example, the overlap bits in lane 2 of the restricted-redundant RHPA value (to be added to lane 3) represent $+1*2^{w[3]}$ (where w[3] is the weight of the least significant bit of lane 3). Similarly the overlap bits in lane 1 of the restricted-redundant RHPA value represent $-1*2^{w[2]}$, etc.

Hence, the equivalent two's complement value to total of all the overlap bits can be calculated by subtracting the total of the overlap bits representing −1 from the total of the overlap bits representing 0 or +1:

Example A

| | lane3 | lane2 | lane1 | lane0 |
|---|---|---|---|---|
| VHR+: | 0000_0001 | 0000_0000 | 0000_0000 | 0000_0000 |
| (total of overlap bits in lanes where overlap bits represent 0 or +1) | | | | |
| VHR−: | 0000_0000 | 0000_0001 | 0000_0000 | 0000_0000 |
| (total of overlap bits in lanes where overlap bits represent −1) | | | | |

Which expressed as an equivalent addition (having negated the second value) would be:

0000_0001 0000_0000 0000_0000 0000_0000

1111_1111 1111_1111 0000_0000 0000_0000 +

0000_0000 1111_1111 0000_0000 0000_0000   (the overlap value)

In practice, as in the restricted-redundant RHPA value, each set of overlap values can only take the values −1, 0 and +1, only the least significant two overlap bits per lane need to be considered (which will take one of values 0b11, 0b00 or 0b01), and all other overlap bits will equal the second least significant overlap bit of the lane.

Therefore, as shown in part B of FIG. 14, only two bits per lane need to be considered. As shown in the left hand side of part B of FIG. 14, a first value VHR+ is formed comprising a pair of bits corresponding to each lane other than the lowest lane, and for each pair:

the upper bit of the pair is equal to 0, and the lower bit of the pair is equal to 0 if the overlap bits in the corresponding lane represent −1 or 0, and equal to 1 if the overlap bits in the corresponding lane represent +1.

Note that if this approach is applied to the example above, the first value VHR+ would be equivalent to the bits shown in bold in the top value shown in example A.

Similarly, as shown in the right hand side of part B of FIG. 14, a second value VHR− can be formed comprising a pair of bits per lane (excluding the lowest lane), and for each pair:

the upper bit of the pair is equal to 0, and the lower bit of the pair is equal to 0 if the overlap bits in the corresponding lane represent +1 or 0, and equal to 1 if the overlap bits in the corresponding lane represent −1.

Again, note that this effectively represents the least significant two bits per lane (shown in bold) in the bottom value shown in Example A above.

The second value VHR− can then be subtracted from the first value VHR+(or VHR+ can be added to the two's complement of VHR−) to generate corresponding two-bit portions V'[0], V'[1], V'[2] of the overlap value. Each of these two-bit portions is equivalent to the bottom two bits of the corresponding lane of the overlap value (see the two bits per lane shown in bold in the overlap value of Example A above). Each two-bit portion can then be sign extended (extended with 0s if the top bit is 0 and with 1s if the top bit is 1) to generate the corresponding N-bit portions of the overlap value shown in part E of FIG. 14.

Parts A, C and D show the carry lookahead scheme for determining the carry bits C[1] to C[3] (carry bit C[0] is always 0) for adding to the corresponding lanes of addition in part E.

As shown in part A, logic 82 is provided to examine the non-overlap bits NV[1], NV[2], NV[3] for each lane of the restricted-redundant RHPA value other than the lowest lane. The logic 82 for a given lane NV[i] determines a corresponding non-overlap bit pattern NVP[i], which indicates one of the following bit patterns:

Propagate (p)—when all bits of NV[i] are 1

Kill (k), where all bits of NV[i] are 0

Generate (g), where the least significant bit of NV[i] is 1 and all other bits are 0

Double (d), where the least significant bit of NV[i] is 0 and all the other bits are 1

Uninteresting (u), corresponding to any other pattern of bits.

It will appreciated that rather than operating on the original restricted-redundant RHPA value, the bit pattern identifying logic 82 could also be applied to the sets of non-overlap bits in the non-overlap value shown in part E. Hence, in general the bit pattern of each set of non-overlap bits is identified.

Similarly, as shown in part C of FIG. 14, having generated the pairs of bits of the overlap value, bit pattern identifying logic 82 classifies each pair of bits as one of p, k, g, d in the same way as for the non-overlap value (for the overlap value, it is not possible to have the 'uninteresting' case u because there are only two bits being compared). Again, it is possible for the bit pattern identifying logic 82 to be applied after sign extending the pairs of bits to form the full overlap value shown in part E, rather than before, but still it is not possible for the 'uninteresting' case u to arise because all bits more significant than the second bit of a given lane of the overlap value will have the same value as the second bit.

It will be appreciated that the respective overlap and non-overlap bit patterns identified by the bit pattern identifying logic 82 could be represented using a multi-bit signal encoded to identify which of the conditions p, k, g, d, u are detected, or by a series of one-bit indications each corresponding to one of the conditions p, k, g, d and identifying whether that condition has been detected (u could be represented by an absence of any of the conditions p, k, g, d). In general, the bit pattern identifying logic 82 may comprise a set of logic gates for determining the conditions explained above (e.g. using AND and NOR gates).

As shown in part D of FIG. 14, for each lane other than the lowest lane, carry lookahead circuitry 84 receives the indications of the non-overlap pattern NVP[i] of the non-overlap bits in that lane and the overlap pattern VP[i−1] of the overlap bits in the next lowest lane, and this is mapped to a lane generate signal gi, and for the lanes other than the lowest and second lowest lanes, a lane propagate signal pi, according to the following table:

|  | NVP[i +1] | | | | |
| --- | --- | --- | --- | --- | --- |
| VP[i] | p | g | k | d | u |
| p (all 1's) | G | G | G | G | G |
| g (lsb = 1) | G | K | K | P | K |
| k (all 0's) | P | K | K | K | K |
| d ~(lsb = 1) | G | P | K | G | G | where:
in the cases labelled "G", the lane generate signal gi=1 and lane propagate signal pi=0
in the cases labelled "P", the lane generate signal gi=0 and lane propagate signal pi=1
in the cases labelled "K", the lane generate signal gi=0 and lane propagate signal pi=0

The lane generate and lane propagate signals are then input to prefix logic 86 which generates the carry bits C[i] for each lane according to the following equations:

$C[0]=0$ $C[1]=g1$ $C[2]=g2$ OR ($p2$ AND $g1$)

$C[3]=g3$ OR ($p3$ AND $g2$) OR ($p3$ AND $p2$ AND $g1$)

and so on if there are more than 4 lanes.

Essentially, by examining the bit patterns of the overlap value and the non-overlap value in each lane, it can be determined whether, if there was a carry into that lane, there would be a carry out, and hence each carry bit C can be determined without actually needing to sequentially perform the additions. This enables part E to perform a number of parallel additions 78 to give the same result as if the additions had been performed sequentially.

As the operations of FIG. 14 for each lane can be performed largely in parallel, for a relatively wide vector performing overlap propagation by first performing the restricted-redundant conversion of FIG. 13 followed by the non-redundant conversion of FIG. 14 can be faster than performing the non-redundant process shown in FIG. 12.

More details of this overlap propagation method are provided in Appendix B below.

Figure 15:
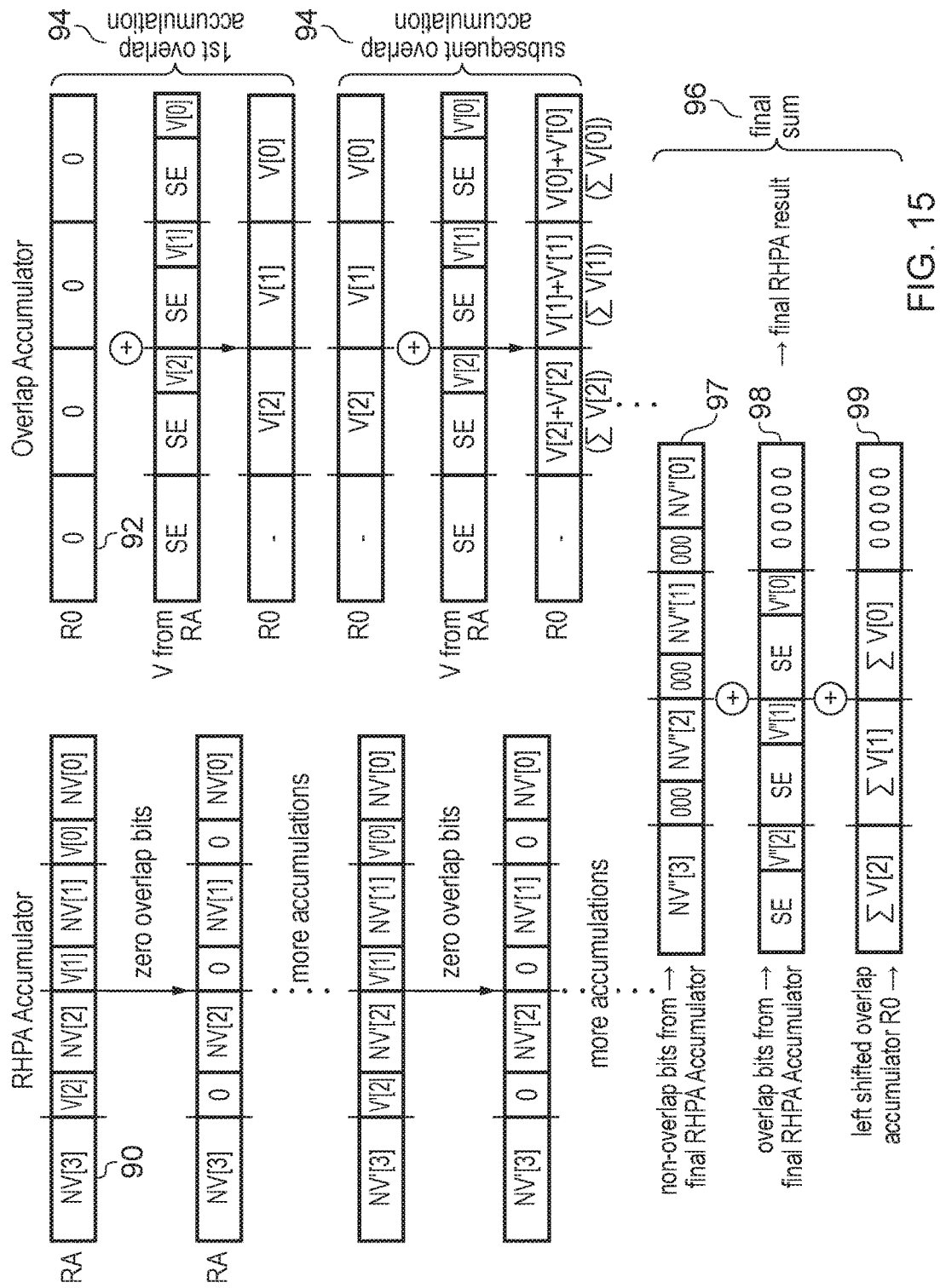
FIG. 15 shows an example of an overlap accumulation operation to add the overlap bits from an RHPA accumulator to an overlap accumulator value.

The overlap reduction operation could also comprise an overlap accumulation operation as shown in FIG. 15. When performing a series of accumulations to generate an RHPA accumulator value to be stored in an RHPA accumulator register 90, a second register 92 is also allocated for storing an overlap accumulator value. As shown in FIG. 15, the overlap accumulator register 92 is initially set to 0 before starting to accumulate input operands into the RHPA accumulator register.

When overlap reduction is required, an overlap accumulation operation 94 is performed in which each set of overlap bits from the RHPA accumulator value is sign extended and added to the corresponding portion of the overlap accumulator register 90. The overlap bits of the RHPA accumulator register 90 are zeroed, and then further accumulations into the RHPA accumulator register 90 can be carried out without risk of overflow.

If the RHPA accumulator register 90 again reaches the point where there is a risk of lane overflow, then another overlap accumulation operation 94 can be performed to again add the sign-extended overlap bits from the RHPA accumulator value to the previous contents of the corresponding portions of the overlap accumulator value.

Hence, the overlap accumulator value effectively maintains a running total of the overlap bits generated in each lane of the RHPA accumulator, where each time the RHPA accumulator starts running out of overlap bits, these bits are added into the overlap accumulator value so that the overlap bits of the RHPA accumulator can be zeroed. As the overlap accumulator value has all N bits per lane available for tracking the overlap values (rather than only V bits as in the RHPA accumulator), a very large number of accumulations into the RHPA accumulator can be performed before there is any risk of losing information from the combination of the RHPA accumulator and overlap accumulator registers 90, 92.

Once the final accumulation into the RHPA accumulator register 90 is complete, the final sum 96 can be computed in RHPA form by adding three vectors as follows:
a vector 97 corresponding to the final RHPA accumulator value with the overlap bits cleared to 0;
a vector 98 in which the lowest lane is 0, and each subsequent lane is a sign extension of the overlap bits V" from the next lowest lane in the final RHPA accumulator value;
a vector 99 in which the lowest lane is 0, and each subsequent lane corresponds to the value of the next lowest lane in the overlap accumulator register 92. That is, the overlap accumulator register 92 can be left-shifted by N bits to generate the vector 99. Each element of the vector 99 represents the sum of all the overlap bits which were added into the overlap accumulator register in any previous overlap accumulation operations 94.

The final sum 96 can be carried out in N-bit chunks using a number of parallel N-bit add circuit units as discussed above. The final sum 96 could be calculated in a single operation by using a 3:2 reduction and carry-propagate addition as in the example of FIG. 7, or by performing two successive 2-input integer additions using regular N-bit adders.

An advantage of the overlap accumulation operation relative to overlap propagation is that processing performed for the overlap accumulation operation stays entirely within lane, and there is no shifting of data between lanes as would be required for propagating the overlap bits of one lane to another lane. With the overlap accumulation approach, shifting data between lanes is only required during the final sum 96 computation which would be performed once for the entire accumulation rather than at each overlap accumulation operation 94.

Another advantage of the overlap accumulation operation is that it enables sums that overflow the RHPA vector as whole (e.g. by adding many large numbers), but then later come back into range as a result of subsequent accumulations (e.g. by subtracting large numbers) to be correctly computed without loss of information (because in effect the high-order lane gets overlap bits).

On the other hand, the overlap accumulation operation may require a second register to be allocated for storing the overlap accumulator value, so if register pressure means there is not enough registers to provide two registers per accumulation, then the overlap propagation operation may be preferred which can propagate the overlap bits between lanes so that the information is retained in the same register as the RHPA accumulator.

Hence, overlap reduction may be achieved either by overlap propagation or by overlap accumulation.

We will often wish to accumulate more than $2^{V-1}$ floating-point values (where V is the minimum number of overlap bits in any lane other than the top lane), in which case the overlap reduction operation may be needed periodically to avoid overflow between lanes. Regardless of which overlap reduction method is used (any of the overlap propagation methods and overlap accumulation method could be performed), the processor may determine when to perform the overlap reduction operation in different ways. For example, 3 ways of determining when to do this include:

(1) Count the number of accumulated values, and do an overlap reduction after every k additions or subtractions (where $k \leq 2^{V-1}-1$ if using an overlap accumulation or overlap propagation operation converting to non-redundant form, or $k \leq 2^{V-1}-2$ if using an overlap propagation operation converting to restricted-redundant form).

(2) Detect that we are near the lane overflow state by examining the overlap bits for maximum positive (0b0111 . . . ) or maximum negative values (0b1000 . . . ), or nearly maximum positive or maximum negative values. When these conditions are detected, then perform overlap reduction. Note that in the case where more than one value is accumulated into the accumulator register per cycle, then the near overflow detection may need to trigger the overlap reduction operation earlier than when only one value is accumulated per cycle—e.g. with two values accumulated per cycle overflow reduction could be triggered when the overlap bits represent 0b011 . . . 110 or 0b100 . . . 001 (such that two increments or decrements could lead to lane overflow). Hence, in general, the processing circuitry may detect when the overlap bits exceed a certain predetermined value and then trigger the overlap reduction operation.

(3) Detect that we have actual lane overflow by examining the carry-in and the carry-out from the high-order overlap bit (the sign bit). However, this may require some additional logic in order to get back to a non-overflowing state.

A theoretical benefit of using methods (2) and (3) over method (1) is that the counting method for (1) has to be pessimistic. Especially when accumulating mixed-sign values, there could be many more than $2^{V-1}$ accumulations before we are in any danger of lane overflow. On the other hand, because converting to a restricted-redundant format is so cheap (in some implementations it may be done in one cycle), it is likely that (1) will be the highest performing method in practice.

In the above examples, the overlap reduction operation is performed separately from an accumulation into the RHPA value. However, it is also possible to perform overlap propagation operation at the same time as adding another RHPA value to the RHPA accumulator.

Figure 16:
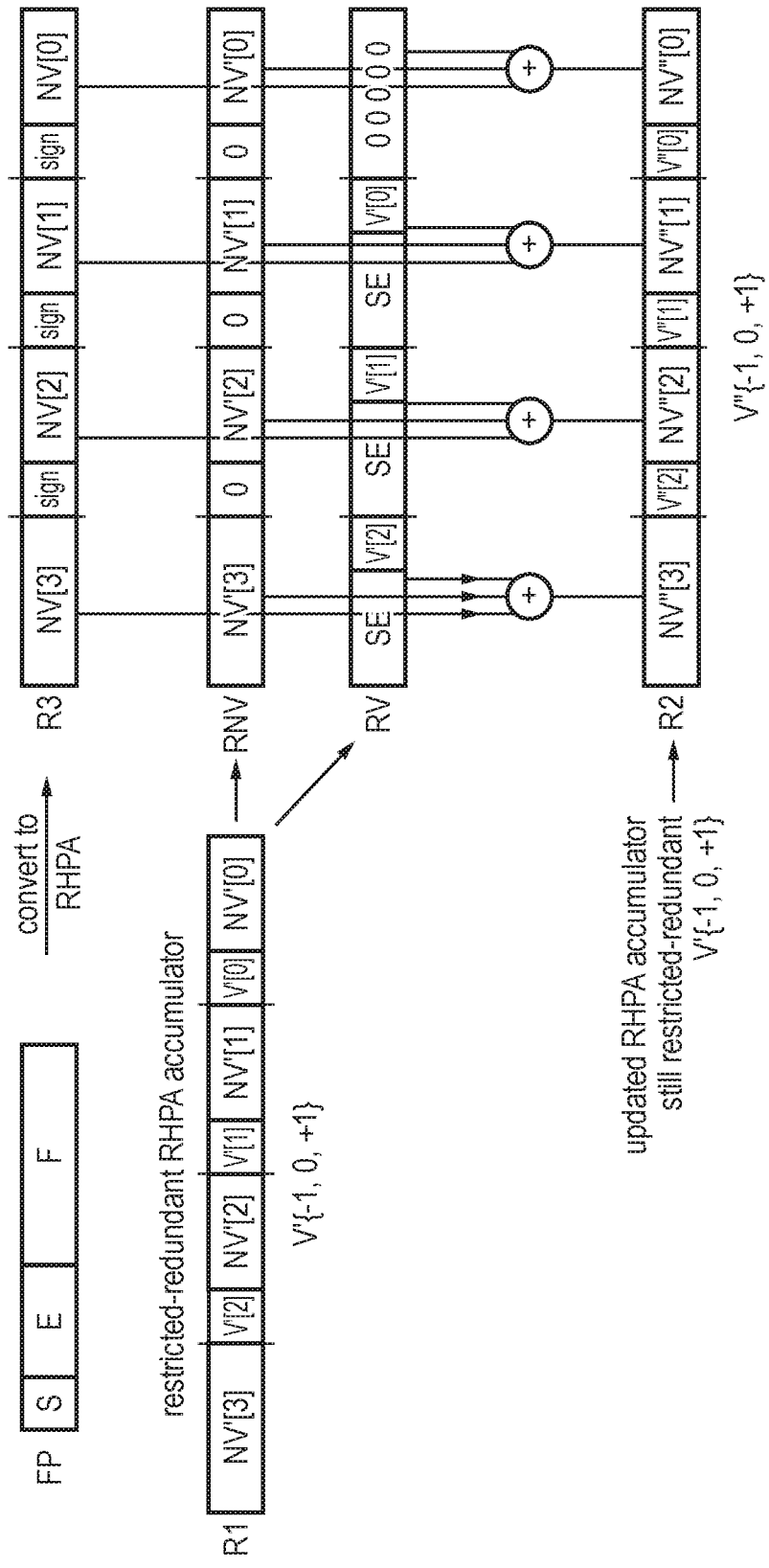
FIG. 16 shows an example of simultaneously adding a converted RHPA value converted from a floating-point value to a restricted-redundant RHPA accumulator and performing overlap propagation to retain the updated RHPA accumulator in restricted-redundant form.

As shown in FIG. 16, when a first RHPA value R1 is in restricted-redundant form, an overlap propagation can be performed to generate a second RHPA value R2 corresponding to the sum of the first RHPA value R1 and a third RHPA value R3 generated by converting an input operand (e.g. a floating-point value FP) into RHPA form (the conversion can be performed as discussed above for FIGS. 10 and 11). The restricted-redundant RHPA value R1 is mapped to two vectors: a non-overlap vector RNV in which all the overlap bits of the first RHPA value R1 are set to 0, and an overlap vector RV in which the bottom lane is 0, and the other lanes are set to a sign extension of the overlap bits of the preceding lane of the first RHPA value R1.

A number of 3-input N-bit additions are then performed in parallel to add corresponding N-bit portions of the non-overlap vector RNV, the overlap vector RV and the third RHPA value R3, to generate a corresponding N-bit portion of the second RHPA value R2. These additions could be performed in one step by using the 3:2 reduction and carry propagation as in FIG. 7, or in two steps using standard 2-input adders.

The second RHPA value R2 can then be used as the first RHPA value R1 for the next accumulation with a different input operand.

Hence, with this approach there is no need to perform a distinct overlap propagation operation separate from the accumulation. Instead, each time another value is accumulated, an overlap propagation can also be performed to maintain the RHPA value in restricted-redundant form. This approach may therefore eliminate the need to incur overhead in tracking the point when overlap reduction is required.

FIGS. 36 to 39 explain why adding the RHPA-converted input operand R3 to the vectors RNV, RV corresponding to the non-overlap bits and overlap-bits of a restricted-redundant RHPA value produces another RHPA value which will also be restricted-redundant. Suppose we are converting and adding a floating-point number to a restricted-redundant accumulator. FIG. 36 shows the two operands laid out across 3 lanes. The bits "s.ext" in the top overlap part of the restricted-redundant RHPA number indicate that the RHPA number has not overflowed into the overlap bits. The "s.ext" bits of the FP number and the top lane of the RHPA after conversion can be either 0 or −1; in both cases, if the "s.ext" bit is −1, the non-overlap bits must be non-zero (see FIG. 37).

Next, we shift the overlap bits from the restricted-redundant RHPA number left by one lane and reset the overlap bits to 0 (see FIG. 38). Finally, performing the lane-by-lane addition leaves us with a restricted-redundant result, as shown in FIG. 39. In Lane 0, the overlap bits could end up as +1 if the input FP number was positive and the add there causes a carry-out. In lane 1, we cannot get −2 in the overlap if the FP conversion leaves a (sign extension of) −1 there because the −1 in the shifted-up overlap part would be assimilated by the positive bits in the non-overlap part of the FP number. Similarly, we cannot get +2 in the lane 1 overlap because if adding the two non-overlap parts could cause a carry of +1, the +1 shifted up from Lane 0 could not cause a second carry, and vice versa. Finally, we cannot get −2 in the overlap part of Lane 2 for the same reasons. However, we could get a +1 but only if there is an overflow; also, a −1 in Lane 2 overlap could now indicate an overflow.

Therefore, regardless of the values of the FP and restricted-redundant RHPA values, the result of the addition will still be restricted-redundant. Note that as the possible overlap values {+1, 0, −1} for a restricted-redundant value can be represented with only two overlap bits, when the approach of FIG. 16 is used to simultaneously perform addition of the FP value and the accumulator and restricted-redundant overlap propagation, there is no need to provide more than 2 overlap bits per lane (as any bits more significant than the second least significant overlap bit would have the same value as the second least significant overlap bit). Therefore, more bits per lane can be used as non-overlap bits, increasing the numeric range that can be represented using a given vector length.

Conversion from RHPA Representation

Figure 17:
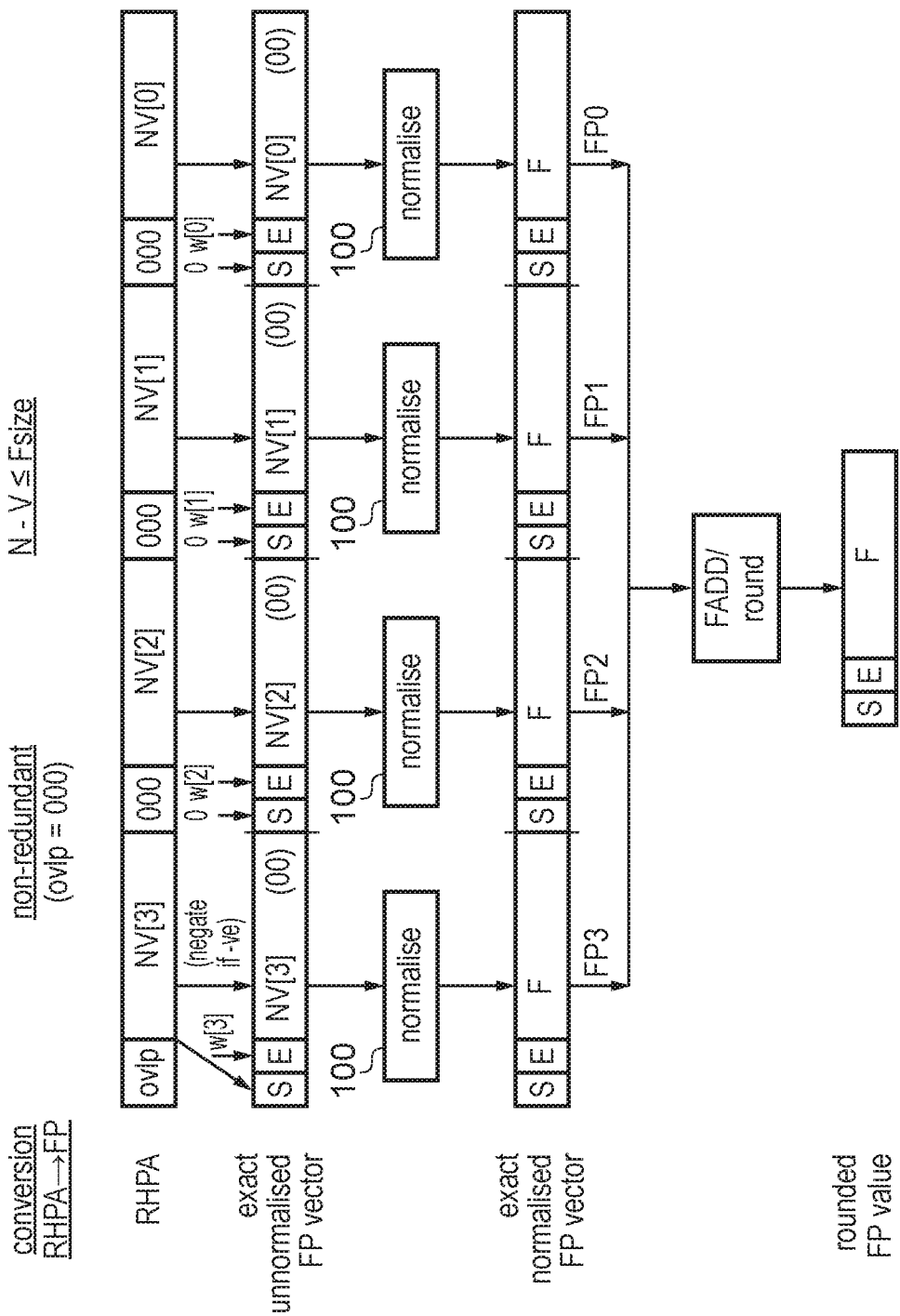
FIG. 17 shows an example of converting an RHPA value in the non-redundant form to a floating-point value.
Figure 18:
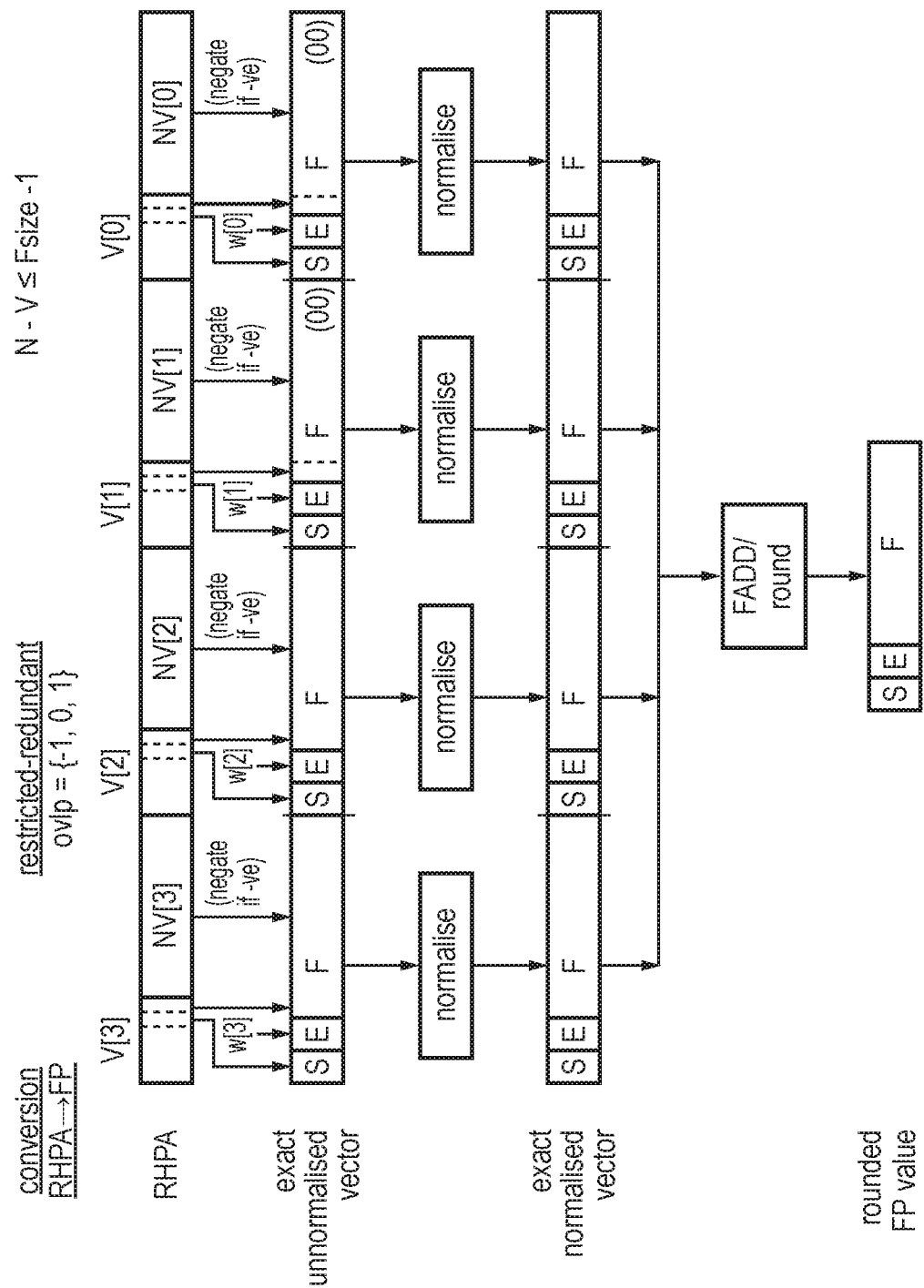
FIG. 18 shows an example of converting an RHPA value in the restricted-redundant form to a floating-point value.
Figure 19:
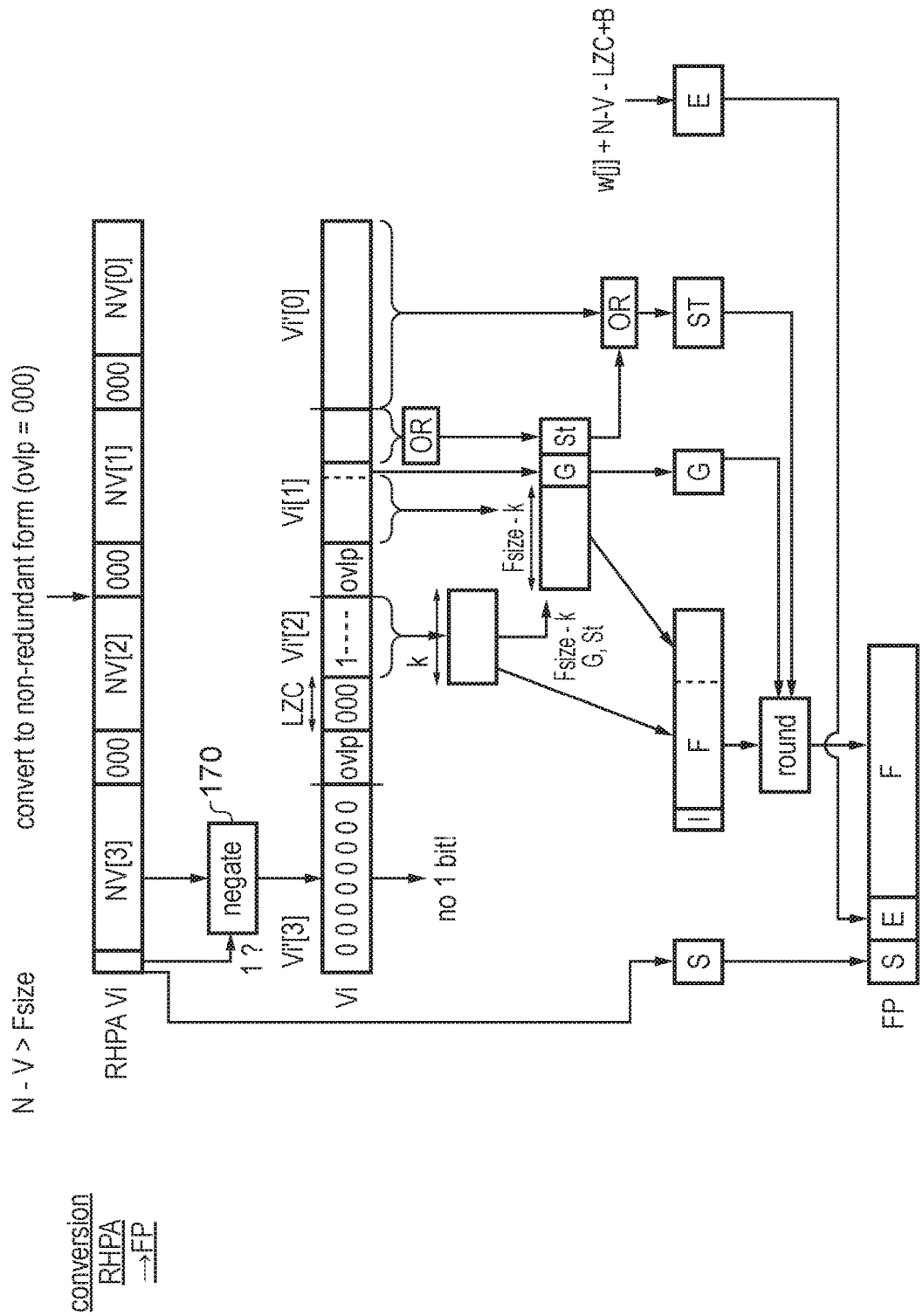
FIG. 19 shows a third example of converting an RHPA value to a floating-point value.

FIGS. 17 to 19 show various techniques for converting an RHPA value to a floating-point value. In general, if the RHPA value is not already in the non-redundant form (FIG. 17 or FIG. 19) or the restricted-redundant form (FIG. 18), an overlap reduction operation is performed to ensure that this is the case prior to performing the conversion to floating-point.

As shown in FIG. 17, when the RHPA is in the non-redundant form and N−V Fsize (where Fsize is the number of bits of the stored significand in the floating-point format to be generated, including the implicit 1 bit), the non-overlap bits of each lane fit exactly within the significand of one floating-point value, and so a corresponding vector of floating-point values can be generated, with each element of the vector comprising a floating-point value equivalent to the corresponding lane of the non-redundant RHPA value, without any loss of information due to rounding.

Hence, for each lane of non-overlap bits NV[i] other than the most significant lane:
 the N−V non-overlap bits are mapped directly to the top N−V bits of an unnormalised floating-point significand. If Fsize>N−V then the least significant (Fsize−(N−V)) bits of the significand are zero.
 the exponent E[i] for that lane is set equivalent to E[i] =w[i]+N−V−1+B, where w[i] is the anchor value for that lane (indicating the significance of the least significant bit of the lane), N is the lane size, V is the number of overlap bits, and B is the bias amount for the floating-point representation being used;
 the sign bit S is 0 (since in a non-redundant RHPA value the overlap bits in all lanes other than the top lane will be zero indicating a positive value for the remaining non-overlap bits).

On the other hand, for the most significant lane (NV[3] in this example):

If the most significant non-overlap bit is 1 (indicating that the RHPA value as a whole is negative), the non-overlap bits NV[3] are negated to form the corresponding bits NV'[3] of the unnormalised significand. If the most significant non-overlap bit is 0 (indicating a positive RHPA value), the non-overlap bits NV[3] are mapped directly to the corresponding bits NV'[3] of the unnormalised significand. If Fsize>N−V then the least significant (Fsize−(N−V)) bits of the significand are zero.
 The exponent E[3] is set in the same way as for the other lanes, but based on the lane anchor value w[3] for the top lane.
 The sign bit S is equal to the most significant non-overlap bit of the top lane.

This produces a vector of floating-point values which are exact, but unnormalised, because the top '1' bit in the significands of each lane could be at a bit position other than the most significant bit of the significand. Therefore, for each lane normalisation circuitry 100 shifts the significand of a given lane to place the top '1' bit at the most significant bit position, adjusts the exponent E accordingly, and then discards the top '1' bit which is implicit in the stored floating-point representation, to generate an exact normalised floating-point value. If the value is subnormal, then the exponent E is set to 0.

In some cases, the exact normalised floating-point vector can then be output as the result of the conversion. This may be desired so that the increased precision of the original RHPA value can be retained even after converting to floating-point form.

However, in order to convert to a single floating-point value which is (at least approximately) equivalent to the original RHPA value, the floating-point elements of the vector can be added together and rounded to generate the final floating-point result (as shown in the bottom of FIG. 17).

As noted above, floating-point additions are not associative and the order in which the floating-point elements are added will affect the final result. If the final result only needs to be approximately equivalent to the RHPA value, then adding the values in any order may be acceptable.

However, to provide a correctly rounded result when rounding according to one of RZ, RP, RM, RNA or RX rounding, the floating-point elements can be added in an order starting from the least significant element and ending with the most significant element. For example with 4 floating-point elements, these would be added as follows ((FP0+FP1)+FP2)+FP3, where the addition shown inside a given set of brackets would be carried out before adding the following term outside the brackets. If the FP numbers were added from high-order lane to low-order lane, then following each addition there could be a rounding increment to generate a rounded value, and this may lead to too many increments being performed. For example, when performing RP rounding with the highest order number containing a sticky bit—that FP result is already incremented because of sticky, but it will increment again with each lower-order FP number that is added to it. In a 1024-bit implementation we might increment the FP value 15 times after we have computed the correct value. This issue can be avoided by adding the low order elements FP0 and FP1 first, and then successively adding in the next highest element in subsequent additions until the top element FP3 is reached.

For RNE rounding, adding the floating-point elements in this way may not always give the correct rounded result. If only an approximate result is needed, this may not be a problem. However, if a correctly rounded result is required, then the method described with respect to FIG. 19 below can be used instead.

FIG. 18 shows a similar operation to FIG. 17, but where the original RHPA value has first been converted to restricted-redundant form (or was restricted-redundant already). In this case, in addition to the N–V non-overlap bits, the least significant overlap bit also contributes to the significand of the corresponding floating-point value generated for a given lane, and so this approach works when N–V≤Fsize–1. Also, for a restricted-redundant RHPA value, each of the lanes could have overlap bits representing a value of +1 or −1, so each of the lanes is treated as a signed value (similar to the top lane in the non-redundant RHPA example of FIG. 17).

Hence, for each lane i:

the N–V non-overlap bits NV[i] and the least significant overlap bit V[i] of that lane are mapped to the top N–V+1 bits of an unnormalised floating-point significand, with a negation being applied if the second least significant overlap bit of V[i] in that lane is 1 (indicating a negative lane weighting). If Fsize–1>N–V then the least significant Fsize–1–(N–V) bits of the significand are zero.

the exponent E[i] for that lane is set equivalent to E[i]=w[i]+N–V+B, where w[i] is the anchor value for that lane (indicating the significance of the least significant bit of the lane), N is the lane size, V is the number of overlap bits, and B is the bias amount for the floating-point representation being used. Note that the exponent in this case is one higher than in the case of FIG. 17 because of considering the additional bit from the overlap portion.

the sign bit S[i] for each lane equals the second least significant bit of the overlap bits V[i] in the corresponding lane.

Again, the resulting unnormalised floating-point values are normalised to produce a vector of exact normalised floating-point values, which can then be added together to produce the final rounded floating-point value in the same way as in FIG. 17.

An advantage of the technique shown in FIGS. 17 and 18 is that the conversion is largely a parallel process where each lane can be converted to a respective floating-point value in parallel and then added. The examples of FIGS. 17 and 18 assume that the top lane is for symmetry treated as containing V overlap bits in a similar way to the other lanes.

If N–V>Fsize (for FIG. 17) or N–V>Fsize–1 (for FIG. 18), the method shown in FIG. 17 or FIG. 18 could still be performed, but in this case the floating-point vector would be a vector of rounded floating-point values which do not correspond exactly to the corresponding elements of the original RHPA value. This is because there are lanes where the number of non-overlap bits is larger than the significand of one floating-point value, and so converting these to respective floating-point values would require rounding. While in this case the FP vector no longer represents the RHPA value exactly, adding the respective FP elements in the same way as in FIGS. 17 and 18 to generate the final rounded FP value can still give the correct rounded result for all rounding modes other than RNE.

Alternatively, a different approach for converting an RHPA value to a floating-point value FP can be used as shown in FIG. 19. This is particularly useful if RNE rounding is being used. This method assumes the RHPA value has first been converted to non-redundant form (or was non-redundant already). As shown in FIG. 19, the most significant bit of the non-redundant RHPA value is mapped directly to the sign bit S of the floating-point value FP.

To generate the significand F of the floating-point value, a series of operations are performed as follows. If the most significant bit of the non-redundant RHPA vector Vi is 1 (i.e. the RHPA value is negative), then at step 170 the entire value is negated (invert and add 1) to produce a modified vector Vi'. For positive values the RHPA vector Vi is not negated and remains unchanged (Vi'=Vi). Hence, the modified vector Vi' has at least one leading zero, so represents a positive value. Starting with the most significant lane of the modified vector Vi', a significand generation operation is performed element by element sequentially. The processing lane for the most significant element searches for the first non-sign bit within that element (i.e. the first bit value of 1). In this example the upper element in lane 3 does not comprise any non-sign bits and so processing moves to the next lane 2.

The processing for element 2 identifies a non-sign bit of 1 and determines a leading zero count LZC representing the number of zeroes preceding the non-sign bit 1 (not including the overlap bits). A partial significand is then formed from k bits of the corresponding data element Vi'[2], where k=min(N–V–LZC, Fsize), where Fsize is the number of bits in the significand of the FP value to be generated (including the implicit bit) and LZC is the leading zero count. The k-bit partial significand value is output together with an indication (Fsize-k) of the number of remaining bits still to be obtained for the significand, a guard bit G and sticky bit St. If N–V–LZC>Fsize, then the guard bit G equals the bit of element Vi'[2] one place to the right of the bits taken for the partial significand, and if N–V–LZC<=Fsize then G=0. Similarly, if N–V–LZC>Fsize+1 then the sticky bit St equals a bitwise OR of any bits of element Vi'[2] to the right of the guard bit G, and otherwise the sticky bit St=0.

The processing then moves to the next lane for element Vi'[1], where another partial significand value is generated. The upper portion of the non-overlap bits of element Vi'[1] is selected as the partial significand, with the number of bits taken corresponding to the value Fsize-k which was output from the previous lane. This lane also updates the values of the guard and sticky bits G, St, with the guard bit G being equal to the bit of element Vi'[1] one place to the right of the lowest bit taken for the partial significand and the sticky bit St corresponding to the bitwise OR of any bits less significant than the guard bit G. The lane of processing for the least significant element Vi'[0] receives the sticky bit St from the higher lane and updates it by ORing all bits of element Vi'[0] with the sticky bit St from the previous lane.

The partial significands generated for lanes 2 and 1 are then concatenated to form a significand value F. The significand is rounded based on the values of the guard and sticky bits G, S, using any desired rounding mode. The stored significand for the floating-point value FP is then obtained from the rounded significand value, ignoring the most significant bit of the rounded significand, which is implicit in the floating-point representation.

Meanwhile, the biased exponent E for the floating-point value is determined as:

$$E=w[j]+N-V-LZC+B,$$

where w[j] is the significance of the least significant bit of the data element Vi'[j] within which the most significant non-sign bit was found (e.g. the significance indicated by the anchor point value for element w[2] in the example shown in FIG. 19), N is the lane size, V is the number of overlap bits, LZC is the leading zero count and B is the bias value for the floating-point representation being used.

When Fsize≤N−V, then at most only two adjacent data elements can contain bit values which contribute to the unrounded significand F, as in the example of FIG. 19, and other lanes will either be more significant lanes containing only sign bits or less significant lanes which contribute only to the sticky bit St. It is also possible that the unrounded significand could be formed entirely from bit values within one lane, depending on the position of the first non-sign bit within a lane. When Fsize>N−V then it may be possible for the unrounded significand F to be formed from bits selected from three or more adjacent data elements of the vector.

RHPA values can also be mapped to fixed-point or integer values by simply selecting bits of equivalent significance to the bits of the fixed-point or integer format to be generated. However, this may sometimes lead to overflow or underflow when the RHPA value is outside the range representable in the fixed-point or integer format being used. Hence, it may be more common to convert between RHPA and floating-point.

The conversions shown in FIGS. 17 to 19 may be performed in response to a dedicated conversion instruction, which takes a given RHPA value as an input operand and converts it to an equivalent value in another format (including initially converting the RHPA value to non-redundant or restricted-redundant form if necessary). Alternatively, the conversion operation may be part of another operation. For example, an arithmetic instruction (e.g. add or multiply) may control the processor to perform some processing operation using RHPA values and then convert the result back to another format such as floating-point, integer, or fixed-point.

Multiplication

Figure 20:
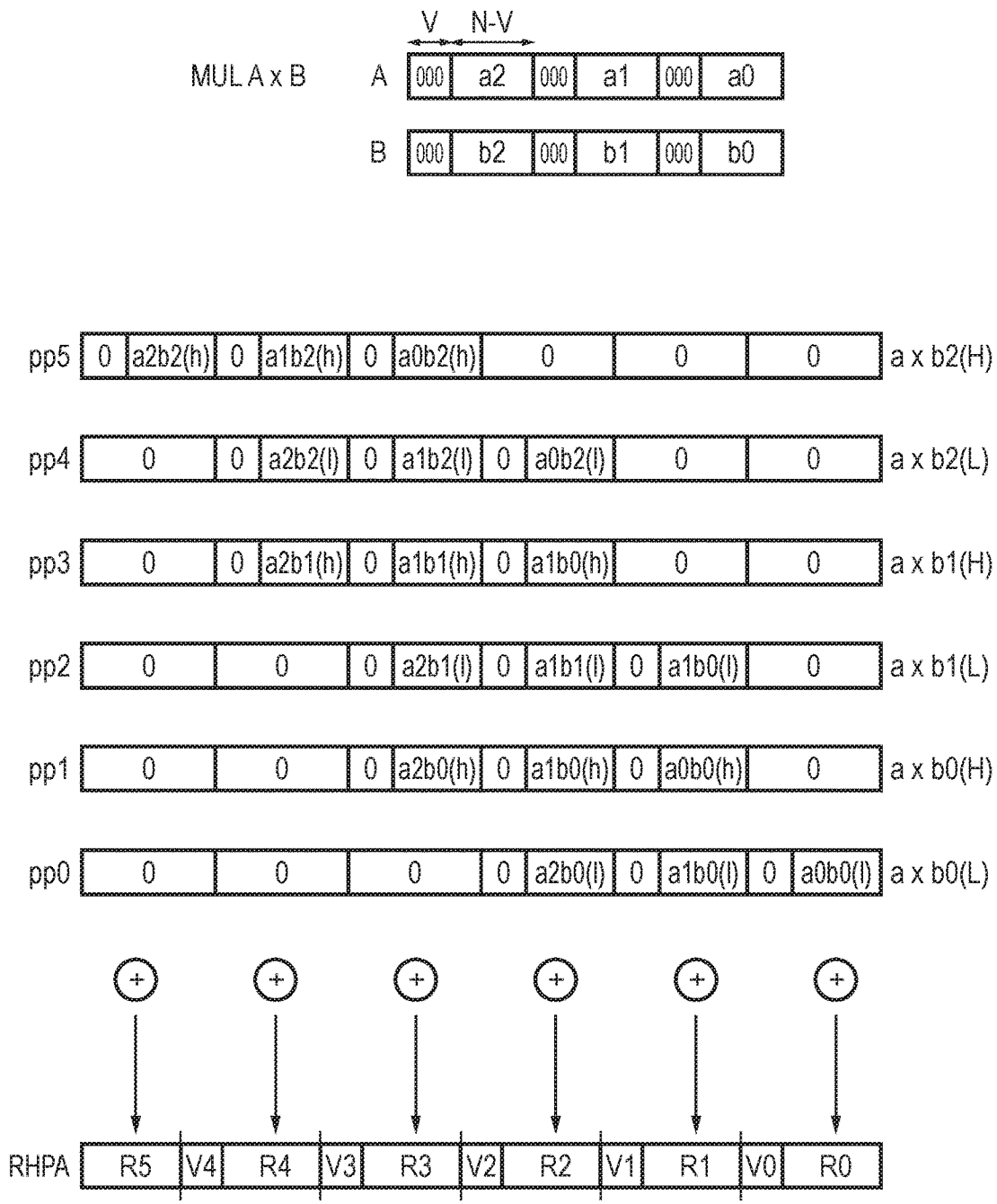
FIG. 20 shows an example of using addition of RHPA values to add partial products of a multiplication of two operand values.

FIG. 20 shows an example of using the RHPA format to speed up multiplication of two relatively long integers. Without RHPA, the multiplication may require sequential addition of a series of partial products, which can be slow for relatively long inputs. By using RHPA, the partial products can be added in a single operation using parallel adds operating on respective chunks of the partial products, because any carries can be accommodated within the overlap bits. This allows the product (in RHPA form) to be generated faster.

For example, if the integer values are mapped to two RHPA values A=(a2, a1, a0) and B=(b2, b1, b0) in non-redundant form, where each N-bit digit has an overlap of V bits (e.g. with N=64 and V=10, the integers A and B would have 3*54=162 bits each), then A*B can be computed as:

| 5 | 4 | 3 | 2 | 1 | 0 (lane) |
|---|---|---|---|---|---|
|   |   | a2 | a1 | a0 |   |
| * |   | b2 | b1 | b0 |   |

This vector x vector multiplication could be implemented as a sequence of vector x element operations. The instruction MUL calculates the lower half of the product of the two input operands, and the instruction MULH calculates the upper half of the product of the two input operands. Hence, the partial product matrix would be:

| pp5 | a2b2(h) | a1b2(h) | a0b2(h) |         | a*b2 MULH |
|-----|---------|---------|---------|---------|-----------|
| pp4 |         | a2b2(l) | a1b2(l) | a0b2(l) | a*b2 MUL  |
| pp3 |         | a2b1(h) | a1b1(h) | a0b1(h) | a*b1 MULH |
| pp2 |         | a2b1(l) | a1b1(l) | a0b1(l) | a*b1 MUL  |
| pp1 |         | a2b0(h) | a1b0(h) | a0b0(h) | a*b0 MULH |
| pp0 |         |         | a2b0(l) | a1b0(l) | a0b0(l) | a*b0 MUL |

If the original operands a and b are available in vector registers with N bits per lane (e.g. the vector registers have been populated with a contiguous load operation or similar operation), an operation would be needed to "splat" a selected element (b0, b1 or b2) of operand b to the wanted lanes for each multiplication step, with the other lanes containing '0' in at least one of the elements. A dedicated instruction could be provided for this "splat" operation, or this could also be achieved with other instructions for selecting the appropriate element of b and then an AND with a mask to carry out the zeroing. Shifting can be done after the multiplications (to save "splats") or before (to save moving data between lanes).

Having added the partial products and generated the result in RHPA form, the product can then be converted back to an integer value (by first converting to non-redundant RHPA, and then collapsing the vector back into an integer form eliminating the overlap bits). This can be done using either a dedicated instruction or a series of shifts. Alternatively, the RHPA product value could be processed further in RHPA form rather than being converted back to integer.

Lane Position Information

As discussed above, additions of RHPA values can be carried out efficiently using a number of parallel add circuit units. Typically, the hardware for a given implementation may provide a certain number of add circuit units supporting a given total vector size, for example eight parallel add units for performing 64-bit additions each, which would give a total vector size in hardware of 512 bits. However, the desired range for a given RHPA value might be larger or smaller than the implemented vector size, for example 256 bits or 1024 bits. When the RHPA value is smaller than the implemented vector size then two or more separate RHPA values can fit within one vector, which allows two or more distinct operations to be processed in parallel by different subsets of the lanes of processing provided by the hardware.

Figure 21:
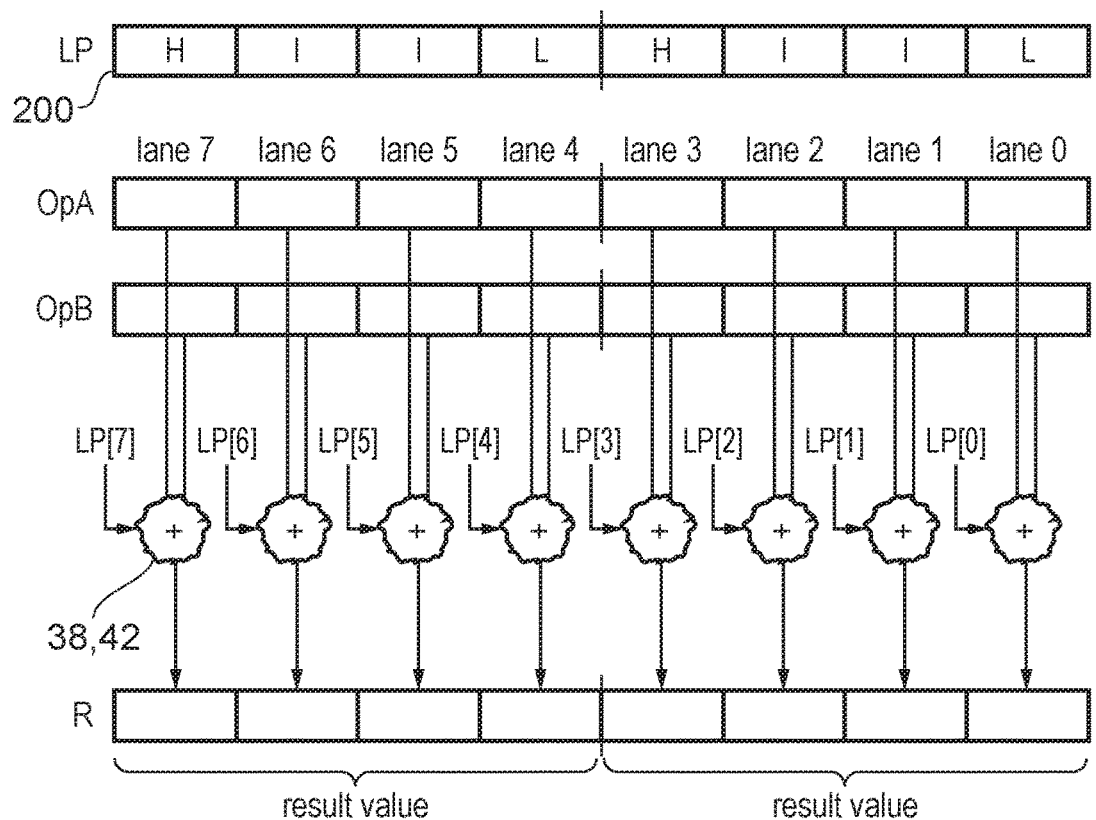
FIG. 21 shows an example of use of lane position information to control each lane of processing based on the relative position of the result element to be generated by that lane within a corresponding result value.

For example, as shown in FIG. 21 two 256-bit accumulators could be accumulated in parallel within respective halves of a 512-bit vector hardware implementation, using 8 lanes of 64-bit adders. Similarly, to calculate a larger RHPA value than the implemented hardware vector size, one instruction may trigger processing of the lower half of the larger RHPA accumulator and in a second pass of the hardware may process the upper half of the accumulator.

However, the least significant lane and the most significant lane of a given RHPA value may need to be processed differently from intermediate lanes. For example, for the most significant lane of a given RHPA value, lane overflow may be treated differently since the overflow from the high order lane is a true overflow condition i.e. an error that requires recomputation with a larger anchor value or a larger accumulator, while overflow from other lanes merely indicates that overlap propagation may be required. On the other hand, during overlap propagation, the least significant lane is treated differently from other lanes because there are no lower order overlap bits to add to it (e.g. see FIG. 13 where the least significant lane is simply mapped directly from the original RHPA value and does not require an addition), while the most significant lane may also be treated differently since in this lane there may be no need to zero any overlap bits (again, see FIG. 13 where the most significant lane is different to the intermediate lanes).

To enable each lane of processing to operate independently of other lanes, without considering information from the other lanes, it can be useful to provide a lane position indicator which indicates the position of the lane within the overall result value being generated. For example, as shown in FIG. 21 a lane position vector 200 may be provided containing a series of two-bit type indicators for each lane, the type indicator showing whether the lane is a low-order lane (L), an intermediate lane (I), or a high order lane (H). In this example, lanes 0 and 4 are indicated as low order lanes, lanes 3 and 7 are indicated as high order lanes, and the other lanes are indicated as intermediate lanes, showing that the final result will contain two independent result values which each span four lanes. Each add circuit unit 38, 42 receives the lane position indicator for the corresponding lane together with the operands to be processed by that lane, and determines how to process the operands in dependence on the lane position indicator.

For example, when a lane overflow occurs, the add circuit unit may select one of a number of overflow handling responses in dependence on whether the lane position indicator indicates that the current lane being processed is the most significant lane in the corresponding result value. For example, the processing may trigger an overflow exception when the current lane is the high order lane and may suppress the overflow exception otherwise. For lanes other than the high order lane, when an overflow occurs then the overlap propagation operation could be performed. Likewise, the lane position indicator may also affect how overlap propagation is performed as discussed above.

Figure 22:
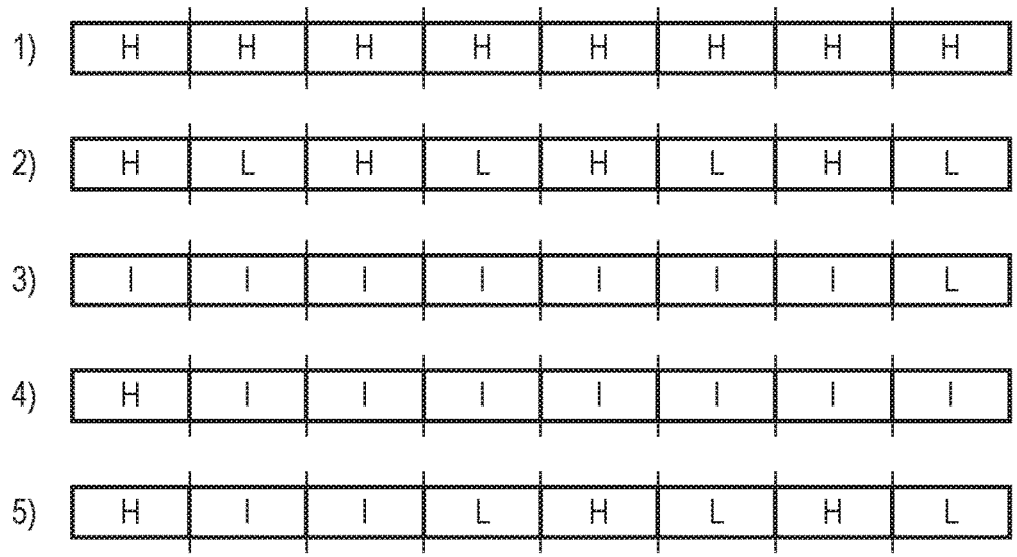
FIG. 22 shows several examples of using the lane position information to control generation of result values which are wider or narrower than the result vector length.

FIG. 22 shows other examples of lane position information specifying different configurations of the lanes. In example 1, all the lanes are indicated as high order lanes indicating that each lane corresponds to an independent N-bit result. It will be appreciated that this situation could also be represented by all of the lanes being indicated as low order lanes.

Example 2 shows a case where the even-numbered lanes are indicated as low order lanes and the odd-numbered lanes are indicated as high order lanes, so that each pair of elements represents a result value spanning two elements.

Examples 3 and 4 show a case where the overall RHPA result value spans 16 lanes, and so a first calculation with lane position information defined in example 3 represents the lower half of the result (with the bottom lane indicated as a low order lane and other lanes indicated as intermediate lanes), and a second calculation with lane position information defined in example 4 generating the upper half of the result (with the upper lane indicated as a high order lane and the other lanes indicated as intermediate lanes).

Hence, the lane type indicator is also useful for accumulators that are wider than the implementation. For example, consider a 512-bit accumulator that must fit in a 256-bit implementation. Each accumulation would require two additions. Suppose the base anchor value is 0 (so we are accumulating integer values only), the overlap size is ovlp=8, and that we indicate high lanes with an H, intermediate lanes with an I, and low-order lanes with an L. So for example, a control lane containing lane indicator, overlap, and anchor values might look something like I:8:168, meaning that the lane is intermediate with 8 overlap bits and an anchor value of 168. For the 512-bit accumulator the low order anchor vector would then have values (I:8:168, I:8:112, I:8:56, L:8:0), and the high-order anchor vector would have values (H:8:392, I:8:336, I:8:280, I:8:224). Accumulating an FP input to both of these 256-bit vectors would give the correct 512-bit RHPA value.

Also, as shown in example 5, providing the lane position information of this sort enables accumulators of different sizes to be accumulated in parallel within the same vector. For example, in example 5 the vector contains one four-lane accumulator (H:I:I:L) and two two-lane accumulators (H:L) with the boundaries between the accumulators indicated using the lane position identifiers. Hence, it is not essential for all the RHPA accumulators to have the same size.

Figure 23:
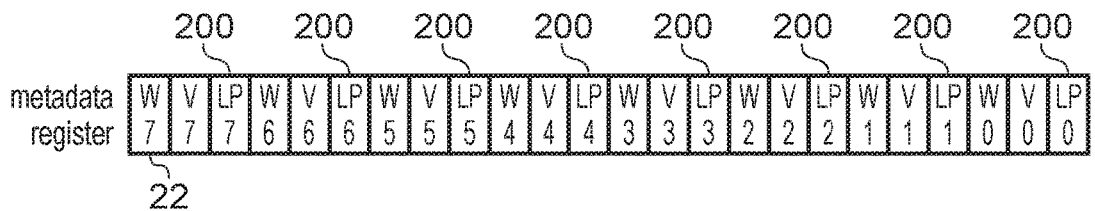
FIG. 23 shows an example of a metadata register specifying an anchor value, a number of overlap bits and lane position information for each lane of processing.

The lane position information may be programmable so that the programmer can set the size of the accumulators being calculated. In some cases the lane position information could be identified within the encoding of an instruction, however, often it will be held within a register. As shown in FIG. 23 it may be convenient to hold the lane position information 200 for each lane within the same metadata register 22 that provides the lane anchor information W specifying the significance of that lane and the overlap value V identifying the number of overlap bits. Since useful anchors for current floating point formats can easily fit in 16-bits, an implementation using the same SIMD register set for anchors and accumulators as is used for the RHPA vectors themselves can easily hold the lane type indicator 200 as well.

When the vector processed by the hardware includes two or more independent values, then some control may be needed to ensure that the correct input values are mapped to the correct lanes. In some cases one or more instructions may be executed to place the relevant data in the correct lanes before applying the RHPA addition. However, in other cases this could be done by the hardware in response to the same instruction that triggers the accumulation.

As discussed above, it is possible for the input values to be specified as a vector of operands which can each be converted to RHPA form and then accumulated. A simple method would be to have each accumulator add those input vector elements that are in the same relative position within the SIMD vector, so that a 512-bit of 8 DP floating point values could have the four high-order DP values accumulated in the high order accumulator and the four low-order DP values accumulated in the low accumulator.

Figure 24:
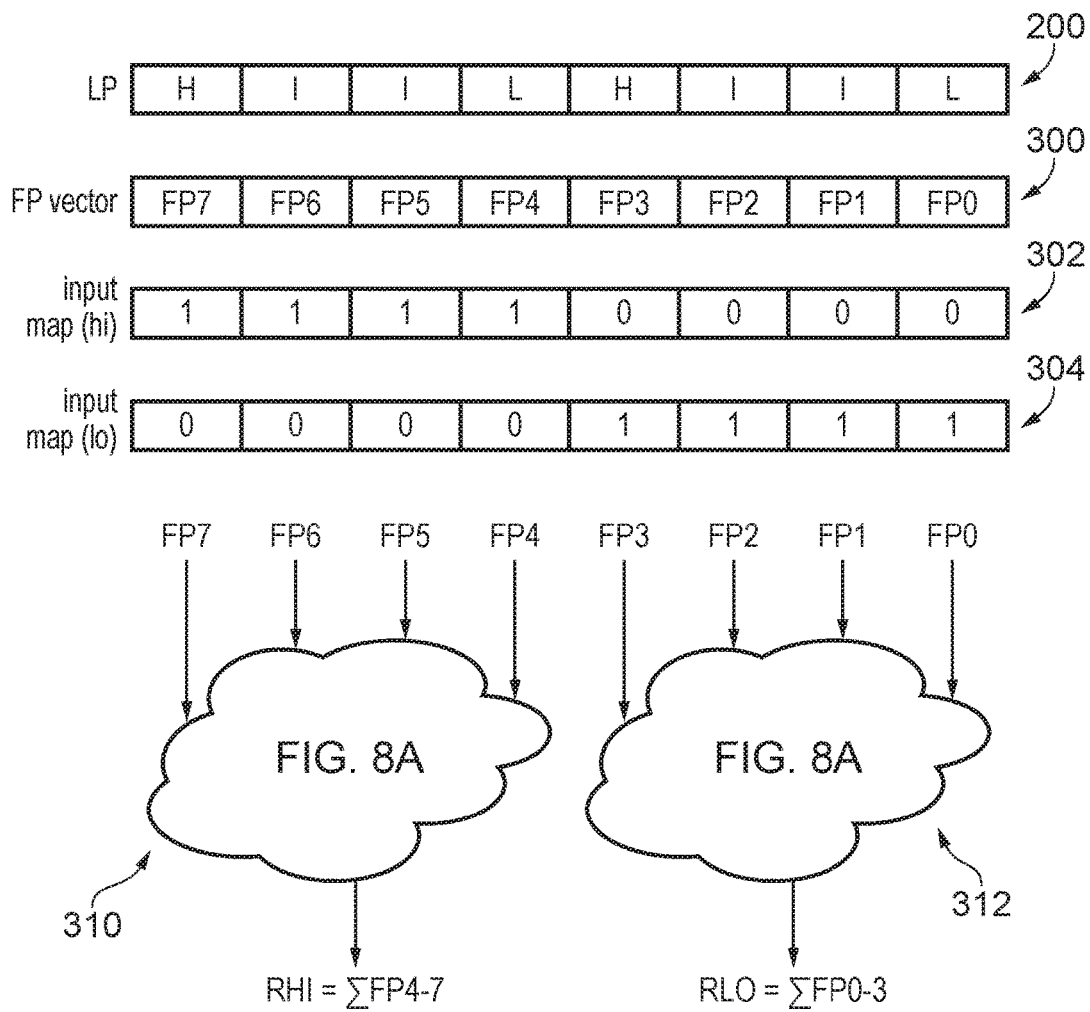
FIG. 24 illustrates an example of using input map information to identify which elements of an input vector are to be processed by different subsets of lanes of processing corresponding to independent result values within a single vector.

However, as shown in FIG. 24 a more flexible method may be to use input map information 302, 304 to specify which of the input floating point vector elements should be accumulated in each lane. Hence, a floating point vector 300 may be provided together with the lane position information 200, a high input map 302 identifying the floating point values to be added in the high order accumulator and a low input map 304 specifying the floating point values to be added by the low order accumulator. In this example the high order is 1111_0000 and so the circuitry 310 for accumulating a high order accumulator would add the RHPA values corresponding to floating point inputs FP4 to FP7. Similarly the low order input map 304 is 0000_1111 and so the circuitry 312 for generating the low order accumulator would add the RHPA values corresponding to FP0 to FP3. The circuitry 310, 312 for performing these additions may correspond to that shown in FIG. 8 above for example.

Such a mapping is much more flexible, and this can enable other types of operations such as accumulating the even lanes of the floating-point vector 300 in one accumulator and the odd lanes in another accumulator with input maps 0101_0101 and 1010_1010 respectively (to calculate FP0+FP2+FP4+FP6 and FP1+FP3+FP5+FP7). The input map can allow the hardware to combine the elements of a given vector in different ways, to reduce the need for other instructions to be executed to place the relevant data in particular lanes, which can help to improve performance. Again, as for the lane position information 200, the input map data could also be placed in the same metadata register 22 as the anchor value W and the number of overlap bits V.

Although the examples discussed above generally assume that the number of overlap bits V is the same in each lane (other than the top lane), this is not essential. As shown in FIG. 25 it is possible to define the RHPA value with different lanes having different numbers of overlap bits V. For example, with the metadata vector register 22 of the type shown in FIG. 23 which specifies the number of overlap bits V separately for each lane, the number of overlap bits can be set differently for different lanes.

For example, in FIG. 25 each element of the metadata vector 22 is of a format {LP: V: W}, where LP is the lane position information, V is the overlap size for that lane, and W is the anchor value specifying the significance of the lowest bit in that lane). In this example, a 512-bit RHPA value is formed of 8 64-bit lanes. The metadata 22 specifies that the bottom 4 lanes have 12 overlap bits per lane, the next 3 lanes have 2 overlap bits per lane, and the top lane has 0 overlap bits. The lower part of FIG. 25 shows the relative significances of each 64-bit lane, with the lower 4 lanes overlapping by a greater number of bits than the top 4 lanes. Note that this means that the lane anchors W for neighbouring lanes differ by 62 in the top 4 lanes (64−2) but differ by 52 in the bottom 4 lanes (64−12).

This approach could be useful for example, when a given range of numeric values need to be accommodated within the RHPA format, but in practice most values tend not to use the full range. In this case, for many values some upper bits will be sign bits, and so adding or performing other processing operations on a series of such RHPA values may not change the bits in the upper lanes very often. On the other hand, the bits in the lower lanes may change more frequently and cause carries more often. As the lower lanes are at greater risk of overflow than the upper lanes, it can be useful to provide more overlap bits in the lower lanes than the upper lanes. In this way, the lower lanes can still have the increased protection against lane overflow, but there is no need to unnecessarily allocate the same number of overlap bits in the upper lanes which are unlikely to be needed, so that instead more bits of the upper lanes can be used as non-overlap bits to extend the range that can be represented with a given number of bits M of the overall RHPA vector. In this way, either a given range can be represented using a smaller vector, or a given vector can represent a larger range.

While FIG. 25 shows an example with two different overlap sizes, it will be appreciated that other examples could provide a more gradual reduction of the number of overlap bits from lower lane to upper lane. Also, other examples could assign more arbitrary overlap sizes to each lane. In examples where the vector includes several independent data values (as indicated by the lane position information), then it would also be possible to define different overlap sizes for each of the independent values.

Multiplication of Long Operands

Figure 26:
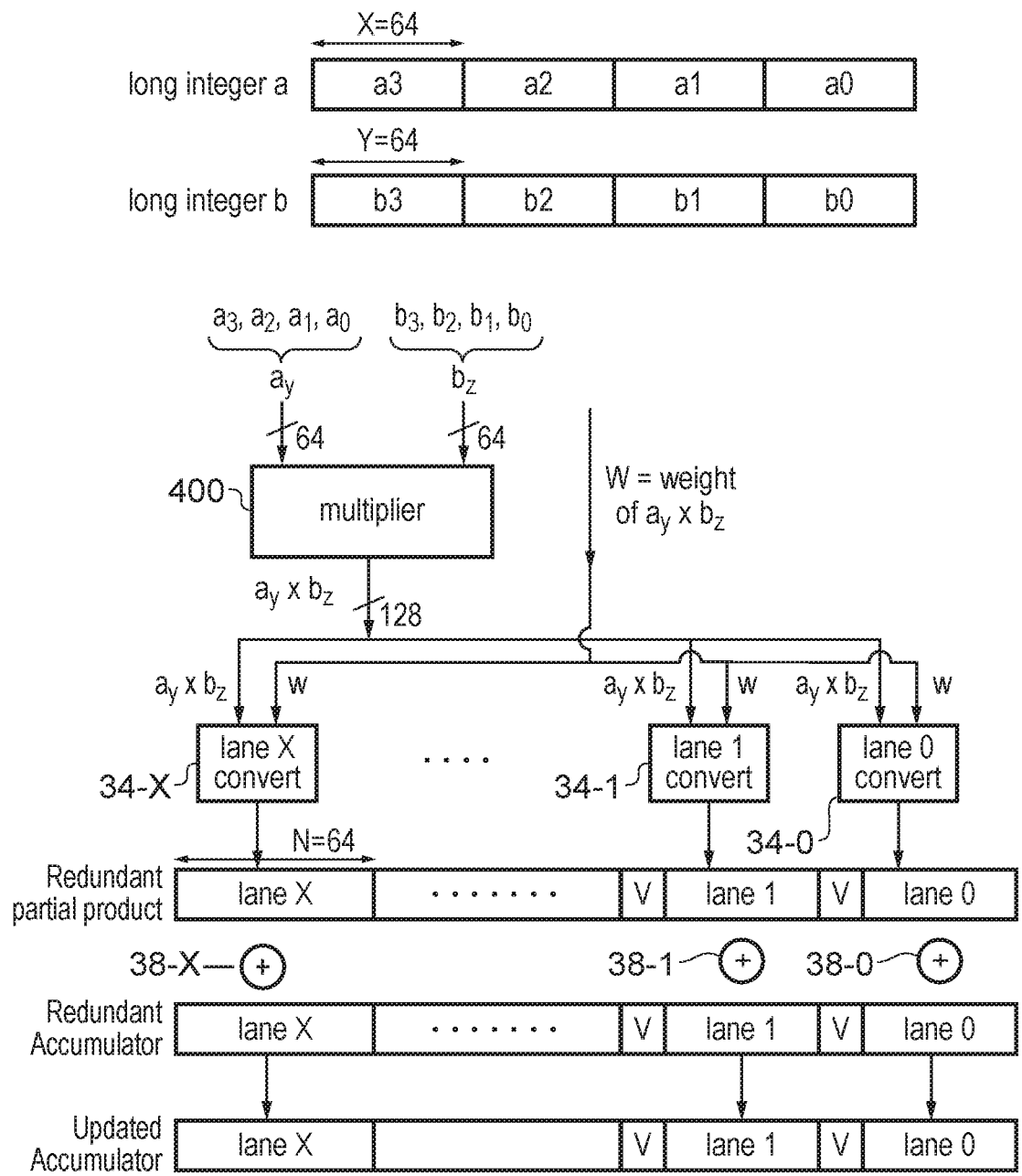
FIG. 26 shows an example of multiplying two long integers using the RHPA format for adding partial products of respective portions of the integers.

The RHPA format can also be used to speed up multiplication of relatively long operands, such as long integer values. FIG. 26 shows an example of multiplying two 256-bit integer values a, b, each of which are divided into four 64-bit portions (a3, a2, a1, a0), (b3, b2, b1, b0). The processing circuitry 14 comprises multiplying circuitry 400, conversion circuitry 34 and adding circuitry 38.

The multiplying circuitry 400 comprises a 64×64-bit multiplier which generates a 128-bit partial product ay*bz by multiplying a selected 64-bit portion ay of the first integer a and a selected 64-bit portion bz of the second integer b (where ay is any of a3, a2, a1, a0 and bz is any of b3, b2, b1, b0).

The 128-bit partial product generated by the multiplying circuitry 400 is passed to the conversion circuitry 34 which converts the product to the RHPA format in a similar way to the technique discussed above. Hence, the conversion circuitry may include a number of lane-conversion units 34-0 to 34-$x$ for generating corresponding lanes of the redundant partial product. Each lane conversion unit 34-0 to 34-$x$ is supplied with the partial product ay*bz generated by the multiplying circuitry 400 and significance indicating information w which indicates a significance of the partial product. For example, the significance indicating information may indicate the significance of a given bit of ay*bz (e.g. the most significant bit or least significant bit). Each lane conversion unit 34-0 to 34-$x$ determines whether the partial product has any bits of a significance falling within the range of the corresponding lane, and if so maps bits of the partial product to corresponding bits within the corresponding lane. The overlap bits of the lower lanes are filled with sign bits as in the examples of FIGS. 10 and 11.

In general, the method shown in FIG. 11 may be used by each lane conversion unit 34-0 to 34-$x$, except that:

the product being converted in FIG. 26 has 128 bits rather than Fsize bits as in FIG. 11, so the threshold for setting Lshift to 0 is Z N−V+128 rather than Z≥N−V+Fsize (more generally if the integers a and b are divided into X and Y-bit chunks respectively, the threshold is Z≥N−V+X+Y).

In the expression Z=E−B−w[i]+1, "E−B" represents the true exponent of the FP value, which represents the significance of the most significant bit of the significand. Hence, this is replaced with an indication of the significance of the highest bit of the partial product, which may be either identified explicitly by the significance indicating information w, or derived from the significance indicating information (e.g. if w indicates the significance of the least significant bit of the partial product, E-B should be replaced with w+127, or more generally w+X+Y−1).

Having converted the partial product to RHPA format, the adding circuitry 38 adds the converted partial product to an accumulator value also represented in the RHPA format, to generate an updated accumulator in the RHPA format. The adding circuitry 38 comprises a number of parallel add circuit units 38-0 to 38-$x$ for adding corresponding lanes of the converted partial product and the accumulator, to produce a corresponding lane of the updated accumulator. Since the addition is performed using a number of smaller parallel additions, it can be performed quickly.

By repeating this operation a number of times using different pairs of portions of the integers a, b as the selected portions ay, bz to generate a number of partial products, and accumulating each partial product into the accumulator register, the final result in the accumulator register corresponds to the product of the original integers a, b. As the accumulation is performed in the RHPA format, a long (e.g. 512-bit) addition can be performed using a number of smaller (e.g. 64-bit) independent additions in parallel, with carries being accommodated using the overlap bits, so that the overall multiplication operation can be performed much faster than with previous techniques.

As shown in FIG. 27, the overall multiplication operation can be pipelined so that the add operation for adding a given partial product to the accumulator may be performed in parallel with the multiplication for generating a following partial product. In this example, the notation ay*bz(w) indicates that the least significant bit of the partial product ay*bz has significance w. In the example of FIG. 27, each 64*64-bit multiplication takes 3 cycles and the addition takes 1 cycle, so by pipelining successive multiplies and the addition, the overall operation only requires 3+16 cycles=19 cycles. In contrast, with previous techniques, calculating a 512-bit product of two 256-bit integers would typically require over 60 cycles.

Hence, as shown in FIG. 27, the multiplication may be seen as a series of partial product accumulating operations, where each partial product accumulating operation triggers a multiplication of selected portions ay, bz of the operands to generate a partial product, a conversion of the partial product to a converted partial product in the RHPA form, and an addition of the converted partial product to the accumulator in RHPA form using a number of parallel smaller additions. Note that the accumulator Acc is initialised to zero before the first product is accumulated.

In some cases, a single multiply instruction specifying the operands a, b could be decoded by the decoding circuitry 20 into separate multiply-accumulate micro-operations each for controlling the processing circuitry 14 to perform one of the partial product accumulating operations. For example, each micro-operation can identify the particular portions ay, bz of the integers to be multiplied. In other examples, the program instructions received by the decoder may already include separate multiply-accumulate instructions corresponding to each of the partial product accumulating operations.

It will be appreciated that the partial products could be calculated in a different order to the one shown in FIG. 27. The end result is the same regardless of which order the partial products are calculated in.

The resulting product at the end of cycle 19 is still in RHPA redundant format. The product can be kept in this format if it will be used for further computation (e.g. computing a sum of several products), or any of the conversion methods discussed above can be used to convert the product to a non-redundant format.

It is possible to start performing an overlap propagation for converting the RHPA product to the non-redundant format in parallel with some of the later accumulations. As shown in FIG. 12, a non-redundant overlap propagation may involve a series of sequential additions moving up from the lower end of the RHPA value to the upper end. As shown in FIG. 28, if the partial products are determined in ascending order of significance, then beyond a certain point of the process some lower lanes of the final RHPA product are complete, and will not be updated by subsequent accumulations, and so the overlap propagation additions acting on such lower lanes can be performed before the accumulations affecting higher lanes are complete.

For instance, FIG. 28 shows an example where each 64-bit lane has 8 overlap bits (N=64, V=8) and so to represent the 512-bit product, ten 64-bit lanes are used, with the least significant bit of each lane having significance {504, 448, 392, 336, 280, 224, 168, 112, 56, 0} respectively. By the end of cycle 5, bits 0 to 127 of the product are complete because all the subsequent accumulations act on bits of significance 128 or greater. Therefore, the bottom two lanes (corresponding to bits 0 to 111 of the product) are complete and so the overlap propagation addition can be performed in cycle 6 to add the overlap bits V[0] of the bottom lane to the non-overlap bits NV[1] of the next lane, and update lane 1 of the accumulator with the result of the addition.

Similarly, by the end of cycle 8, bits of significance 191 or lower will no longer be updated, and as the top bit required for the next overlap propagation addition NV[2]+V'[1] has significance 167, it can be performed in cycle 9. Note that V'[1] is the modified overlap bits resulting from the overlap propagation addition performed in cycle 6).

In a similar way, each of the subsequent overlap propagation additions can be performed as soon as the bits required by that addition are complete and will no longer be updated by any subsequent accumulations. In this example, this allows the first 5 overlap propagation additions to be performed in parallel with some of the accumulations affecting higher lanes, so that completing the non-redundant overlap propagation only required another 4 cycles, giving a total of 23 cycles for the entire multiplication and conversion to non-redundant form. Hence, even if non-redundant overlap propagation is used, the total number of cycles is still relatively low as some of the overhead of the overlap propagation can be avoided by performing it partly in parallel with the accumulations.

It will be appreciated that the particular timing at which each overlap propagation addition can be performed will depend on factors such as the number of partial products being generated (which depends on the size of the original integers), the size of the partial products being generated by each multiplication step, the vector lane size N used for the RHPA accumulator, and the number of overlap bits V provided for each lane.

Alternatively, overlap propagation could be performed after all the accumulations shown in FIG. 27 are complete, either by using the non-redundant conversion of FIG. 12, or by performing a restricted-redundant overlap propagation operation as shown in FIG. 13 followed by a conversion to non-redundant form using the carry lookahead method shown in FIG. 14.

This method for multiplying long integers has several advantages. Firstly, it requires very little additional circuitry beyond the multiplier 400 and the circuitry for performing addition of RHPA numbers as shown in FIG. 6. The RHPA processing lanes already "know" how to accumulate pieces of numbers in the appropriate places (using the lane conversion units 34 to map data from an input to the appropriate lanes based on a weight value w), so large integer multiplication can also be much faster than it has been. Hence, in one example the hardware comprises a single X*Y-bit pipelined multiplier, with an (X+Y)-bit product and a separate exponent-like value w saying what the value of the minimum product bit is. A multiply and accumulate operation is provided that performs the multiplication and adds the partial product to the RHPA accumulator.

Hence, a multiply-and-accumulate instruction may be provided which specifies two sub-portions ay, bz of the larger integers as operands for the multiplication, at least one vector register for the RHPA accumulator (optionally a second vector register may also be provided to specify the anchor of the RHPA accumulator), and a small constant for the implied exponent (weight w).

Note that in the embodiment shown above, the weight w for each partial product is always a multiple of 64, so it really only needs to be a few bits. A 3-bit number would handle 256×256 bit products, with implied exponents 0, 64, 128, 192, 256, 320, 384, and 448. Note that although 448 is not shown in FIGS. 27 and 28, as each partial product is 128 bits wide, it may be simpler to allocate separate weight values to each 64-bit portion of the partial product so that they can be converted directly by the 64-bit lane conversion units, hence 448 may be used to indicate the significance of the upper half of the product of a3*b3. Similarly, a 4-bit number would handle 512×512 bit products.

In some examples, the RHPA accumulator vector may have an associated anchor value, which may be defined using any of the various examples of representing metadata as discussed above. Hence, if only a certain numeric range is of interest, the anchor value can be used to restrict the number of lanes that are calculated during the multiplication, with overflow or underflow being signalled if some of the bits of the products are out of the range indicated by the anchor value. If an anchor value is provided, then each lane conversion unit may receive two significance indicating inputs—one indicating the significance of the corresponding lane of the RHPA vector (as determined from the anchor), and one indicating the significance of the partial product being generated in the current step (the weight value w shown in FIG. 26). This would be analogous to FIG. 11 which uses the exponent E of the FP value and the anchor value w[i] as the two significance indicating inputs.

However, if the input operands are integers, they always have a fixed significance with the least significant bit corresponding to zero. Hence, if the RHPA vector is large enough to cover the product of the two integers (e.g. at least 512 bits in the example of multiplying two 64-bit integers), then we do not need an explicit anchor for the RHPA vector. Hence, there may be no need to allocate an anchor vector register for this operation. For example, w[i] for the bottom lane may be assumed to be 0 by default, and w[i] for other lanes may correspond to a certain multiple of (N–V), where N is the lane size and V is the overlap size. Where no RHPA anchor is provided for the RHPA accumulator, the overlap size V may be implicit from the instruction (e.g. a multiply-accumulate instruction of the type discussed above could implicitly be assumed to always use a certain overlap size V (e.g. 8 or 12 bits for example).

Another advantage of this technique is that there is no need to convert the input operands to RHPA format as shown in FIG. 20. Portions can simply be extracted from longer integers and multiplied using a smaller multiplier 400, and only the partial product is converted to RHPA which can be done in the same cycle as accumulating the partial product into the accumulator. Hence, there is no need to incur additional cycles in converting the inputs to RHPA before performing the first multiplication.

Also, this technique is much faster than existing long multipliers. For example, it is estimated that calculating a 512-bit product would require around 60 instructions on existing hardware, and even more cycles, as opposed to the 19 cycles shown in FIG. 27 for example.

It will be appreciated that the 64×64-bit multiplication shown in FIG. 26 is just an example. Any X-bit×Y-bit multiplier would be acceptable, where X may equal Y (multiplication of like sized items) or could be different from Y (multiplication of two unlike-sized items). Hence, it is not essential for the input operands to be divided into equal sized portions.

Also, it is not essential for the input operands to have the same number of portions. For example, a multiplication of 256-bit integer by a 128-bit integer could be performed using 64-bit portions a3, a2, a1, a0 and b1, b0.

In some cases, one of the input operands may only have one portion, with the other operand including multiple portions. For example, a 512-bit integer formed of 64-bit portions a7-a0 could be multiplied by a 64-bit integer b using eight partial product accumulations corresponding to a7*b, a6*b, . . . , a0*b.

Also, it is not essential for the lane size of the redundant accumulator to be the same as the size of the portions into which the operands a, b are divided. More generally, the lane size of the redundant accumulator may be N bits, which could be different from the portion sizes X or Y used for the input operands.

Hence, regardless of the relative sizes (or number of portions) of the input operands, the sizes X, Y of the portions into which the input operands are divided, and the lane size N used by the redundant accumulator, a given multiplication where at least one of the operands is relatively long can be broken down into a number of smaller partial product multiplications, and the partial products generated can be added in redundant form to enable the overall operation to be performed faster than using conventional integer representation.

Also, it is not essential for the input operands to be integers. For example, one or both of the input operands could be a FP value, or an RHPA value. For example, when multiplying an RHPA value by a DP FP value, each lane of the RHPA value could be multiplied by the significand of the DP FP value to generate a corresponding partial product, with the weight w associated with the partial product being derived from the RHPA anchor and the FP exponent, and each of the partial products can be converted to RHPA form and accumulated into an RHPA register in the same way as shown in FIG. 26. In another example, a crypto key could be multiplied by a smaller value using a series of X*Y-bit multiplications.

In the example of FIG. 26, the significance indicating value w is represented separately from the product ay*bz. However, another option is to encode the significance indicative value directly within the product itself.

Figure 29:
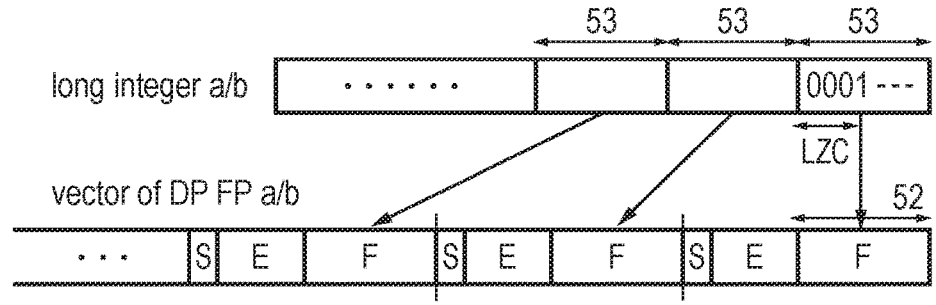
FIG. 29 shows an example of mapping a long integer operand to a vector of floating-point values.
Figure 30:
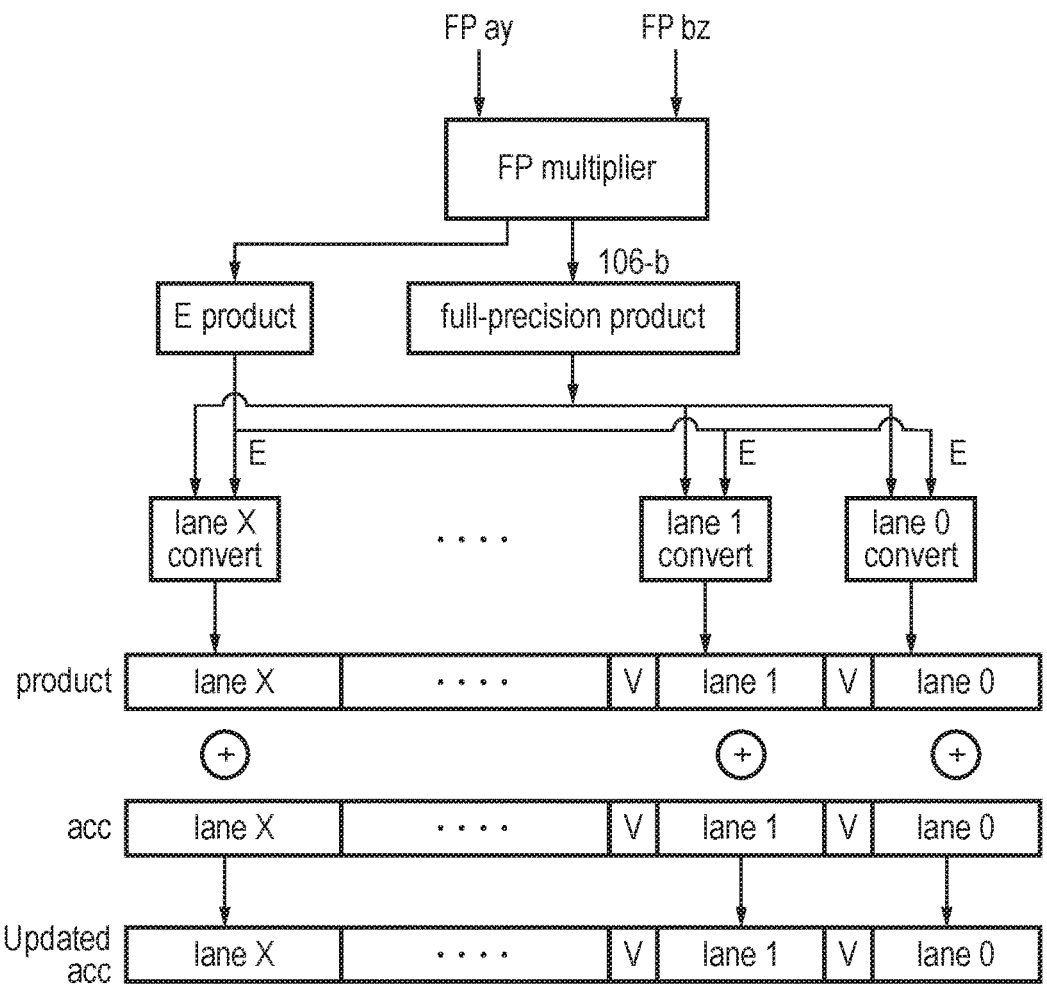
FIG. 30 shows an example of using a floating-point multiplier to determine the partial products of respective pairs of portions of the input operands.

For example, as shown in FIG. 29, an alternative embodiment would be to divide the inputs into 53-bit chunks, and encode each chunk with an appropriate exponent, so that the input operands are effectively represented as a vector of floating-point elements. Hence, each selected pair of portions ay, bz provided to the multiplier is simply a pair of DP FP values. As shown in FIG. 30, a DP FP multiplier can then be used to multiply the pair of DP FP values to produce a full precision 106-bit partial product together with an exponent $E_{product}$ corresponding to the sum of the exponents of the two FP values ay, bz being multiplied. The product can then be converted to RHPA using the exponent $E_{product}$ the significance indicating value, and accumulated in RHPA form as discussed above. Note that with this approach $E_{product}$ would indicate the most significant bit of the partial product rather than the least significant bit.

The method of FIGS. 29 and 30 would simplify the instruction encoding because the exponent is built into the number (there is no need for an implicit or explicit weight indicating value w). To convert a long integer into DP chunks as shown in FIG. 29, an additional instruction may be provided for controlling a permute unit to arrange each chunk of 53 bits in a respective 64-bit lane of the vector:

| lane | 4 | 3 | 2 | 1 | 0 |
|---|---|---|---|---|---|
| bits | 255:209 | 208:157 | 156:105 | 104:53 | 52:0 |

After the permutation, each lane then converts its input to a DP number. The exponent for lane i is computed by counting the leading zeros in the low-order 53 bits of lane i to get LZC[i], then setting the exponent to 53*(i+1)−LZC[i]. The significand is constructed in the usual way, discarding the leading 1 and left-justifying the fraction.

Summary

Some particular examples have been discussed above, however more generally processing circuitry may process M-bit data values having a redundant representation representing a P-bit numeric value using a number of N-bit portions, where M>P>N. The processing circuitry can identify the significance of bits of each N-bit portion of the redundant representation based on an anchor value. Within a group of at least two adjacent N-bit portions, a plurality of overlap bits of a lower portion of the group have a same significance as a plurality of least significant bits of at least one upper portion of the group. The processing circuitry has a number of operation circuit units to perform a number of independent N-bit operations in parallel, each N-bit operation comprising computing a function of corresponding N-bit portions of at least two M-bit operand values having the redundant representation to generate a corresponding N-bit portion of an M-bit result value having the redundant representation.

This approach enables relatively long operands to be processed in smaller N-bit operations performed in parallel, while still permitting a wide range of numeric values to be represented but without the hardware cost of providing a sufficiently wide adder to cover the entire supported range. By using the anchor value, the boundaries of significance to be calculated can be limited so that less hardware is required and in practice this is enough for most practical calculations to be performed. The overlap bits enable fast processing of relatively long M-bit data values in shorter N-bit chunks because carries can be accommodated within a lane rather than requiring propagation between lanes for every addition.

Many different kinds of processing operations can be performed on the corresponding N-bit portions of the operand values. For example, each N-bit operation can be an addition, subtraction, multiplication, logical operation, Galois field operation, and so on, or a combination of two or more of such operations.

However, the technique is particularly useful where the N-bit operations are additions or subtractions (in general, the term "addition should be interpreted as including subtraction, since A−B is equivalent to A+~B (where ~B is the two's complement of B)). Additions are a very common operation in many processing systems, and so speeding up the addition of M-bit data values by enabling them to be performed with a number of parallel N-bit operations (with carries preserved within each lane) is very useful to improve the processing performance of a given processing system. When the N-bit operations are additions, these could take place in response to a wide range of types of instructions, including not just a simple add instruction, but also other types of instruction such as multiply, multiply-accumulate, or an instruction for any other kind of operation which involves an addition as part of the operation.

The N-bit operations performed by the operation circuit units may be "independent" in the sense that there are no carries propagated between different N-bit operations.

While the processing circuitry is able to identify the significance of the bits of each N-bit portion of the redundant representation based on the programmable anchor value, during the N-bit operations themselves there would not typically be any need to consider the anchor value. The anchor value may be referenced when converting between the redundant representation and other formats, for example, not during regular processing of values in the redundant representation.

In general, the processing circuitry may support performing a first type of conversion operation to convert an input value to a converted M-bit data value having the redundant representation. The input value could be in a range of different formats such as floating-point, integer or fixed-point for example. The conversion operation could be performed in response to a standalone conversion instruction which specifies a given operand to be converted in RHPA form. Alternatively, the conversion operation could be part of a more general processing operation performed in response to another type of instruction. For example, an accumulation instruction could specify an input value which is converted to the redundant representation before being added to the accumulator value, or a multiply-and-convert instruction could trigger two operands to be multiplied together and the product of the multiplication may then be converted to the redundant representation.

In the conversion operation, any overlap bits may be set in dependence on a sign of the input value. Hence, the overlap bits may be signed values which can indicate both positive or negative adjustments to the next lane of the redundant representation. In some cases, the overlap bits may be set to zero when the input value is positive and set to one when the input value is negative.

More particularly, for converting a floating point value to the redundant representation, the conversion operation may comprise mapping bits of a significand of the floating-point value to bits of corresponding significance in the M-bit data value in dependence on the programmable anchor value and an exponent of the floating-point value, with the V overlap bits of at least one N-bit portion set to 0; when the input value is positive, outputting a result of the mapping as the converted M-bit data value; and when the input value is negative, negating the result of the mapping to generate the converted M-bit data value.

In implementations where the anchor value comprises a vector of anchor values specifying the significance of each lane separately, the conversion operation may be performed with a number of parallel conversions mapping the floating point value which was input to bits in the corresponding lane based on that lane's anchor value.

The processing circuitry may also support an overlap reduction operation on a first M-bit value having the redundant representation to generate a second M-bit value having the redundant representation in which the overlap bits in at least one N-bit portion of the second M-bit value represent a smaller magnitude than the overlap bits of at least one corresponding N-bit portion of the first M-bit value. By reducing a given set of overlap bits closer to zero so that there is more scope for accommodating further carries during subsequent additions, the chance of lane overflow is reduced. The overlap reduction operation can be performed after each operation, periodically or when certain conditions are met as discussed below.

The overlap reduction operation may in some examples be an overlap propagating operation to propagate overlap bits from one or more N-bit portions of a first M-bit value in the redundant representation to one or more subsequent portions of the first M-bit value to generate a second M-bit value having the redundant representation. The second M-bit value represents the same P-bit numeric value as the first M-bit value, but using a different pattern of overlap bits. Using an overlap propagation operation to achieve overlap reduction has an advantage that no addition register is required to preserve the values of overlap bits reduced in the overlap reduction. By propagating the values of overlap bits to the next lane, the non-overlap bits in the next lane can be adjusted to preserve the same value that was represented by the overlap bits in the preceding lane, freeing up space in the overlap bits of the preceding lane to accommodate more carries when further operations are performed on the redundantly represented second M-bit value.

The overlap propagating operation can be performed in various ways. In one example, the overlap propagation operation is such that it converts the first M-bit value to a second M-bit value for which all overlap bits are equal to zero. In this case, the overlap propagating operation may comprise performing a plurality of sequential additions including: an initial addition to add the overlap bits of a least significant N-bit portion of the first M-bit value to a following N-bit portion of the M-bit value to generate modified non-overlap bits and modified overlap bits, and at least one further addition to add the modified overlap bits from a preceding addition to a next N-bit portion of the first M-bit value to generate modified non-overlap bits and modified overlap bits, and the processing circuitry may be configured to generate the second M-bit value based on the modified non-overlap bits generated in each sequential addition and with the overlap bits set to 0.

On the other hand, a second approach to overlap propagation is to convert to a second M-bit value where each N-bit portion with overlap bits has the two least significant overlap bits equal to one of 00, 01, 11 and any remaining overlap bits have a same value as the second least significant overlap bit. In this case, then the bit pattern of each set of overlap bits effectively represents one of the set {−1, 0, +1}, which although not completely non-redundant still enables the risk of overflow to be reduced.

With the second approach, the overlap propagation operation may comprise a number of parallel additions, each addition comprising adding the overlap bits of a given N-bit portion of the first M-bit value to non-overlap bits of a following N-bit portion to generate a corresponding portion of the second M-bit value. Hence this approach enables the overlap propagation operation to be performed faster by enabling the additions to be performed in parallel. For long vectors this can be a significant performance benefit.

More particularly, each parallel addition may comprise adding an N-bit sign extension of the overlap bits of the lower N-bit portion (i.e. the overlap bits padded at the most significant end with bits equal to the most significant overlap bit) to an N-bit value corresponding to the following N-bit portion in which the overlap bits have been set to zero.

Having converted the first M-bit value to the second (restricted-redundant) M-bit value using the second approach, the second M-bit value can then be converted to a third (non-redundant) N bit value in which all overlap bits are equal to zero. This enables a non-redundant value to be generated while processing multiple lanes in parallel. The conversion of the second N bit value to the third N bit value may comprise: generating an overlap value representing a total of the overlap bits of the second M-bit value, and a non-overlap value representing a total of the non-overlap bits of the second M-bit value; generating a plurality of carry values in dependence on bit patterns of the overlap value and the non-overlap value; and performing a plurality of parallel additions, each addition for adding corresponding portions of the overlap value and the non-overlap value and one of the carry values to generate a corresponding portion of the third M-bit value.

Another way of performing the overlap reduction operation is to perform an overlap accumulation operation to add the overlap bits of one or more N-bit portions of the first M-bit value to corresponding N-bit portions of an overlap accumulator value, and set the overlap bits in those one or more N-bit portions of the first M-bit value to zero to generate the second M-bit value. While this approach may require a second register to store the overlap accumulator value, it has the value that the processing can remain in-lane until the final result is generated, at which point the N-bit portions of the overlap accumulator value can be shifted up one lane and added to the next lane of the final result. Also, this approach has an advantage in that it may allow calculations which temporarily overflow but then come back into the range representable by the M-bit value to be calculated exactly without triggering an overflow exception.

In some examples, the processing circuitry may detect whether an overlap reduction condition is satisfied for the first M-bit value in the redundant representation, and if so, may trigger performing the overlap reduction operation on the first M-bit value. In general the overlap reduction condition may be satisfied when there is an actual overflow from a given lane of the M-bit value, or a risk that performing another addition could trigger such a lane overflow.

In a first example, the overlap reduction condition may be satisfied when a certain threshold number of additions have been performed to generate the first M-bit value. For example, the processing circuitry may maintain an operation count indicating how many operations (e.g. additions) have been performed to generate the first M-bit value, and perform the overlap reduction operation on the first M-bit value when the operation count indicates that the number of operations is equal to or greater than a predetermined number. Hence, each time an operation is performed (e.g. an accumulation into the register containing the first M-bit value), the processing circuitry may increment the operation count by the number of values being operated on to produce the first M-bit value, and when the operation count reaches the predetermined number or greater, then this may trigger overlap reduction operation to be performed. For example, the predetermined number of operations may be less than or equal to $2^{V-1}-1$. More particularly, for the non-redundant overlap reduction operation the predetermined number of operations may be less than or equal to $2^{V-1}-1$, and for the restricted-redundant overlap reduction operation the predetermined number of operations may be less than or equal to $2^{V-1}-2$. The operation count can be reset each time the overlap reduction operation is performed, to restart counting operations until the next time there is a risk of overflow.

In a second example, the overlap reduction condition may be satisfied when the overlap bits for a given N-bit portion of the first M-bit value have a predetermined value. For example the predetermined value may be set to a value for which the next operation could trigger an overflow from that N-bit portion (e.g. the most positive or most negative value representable using the overlap bits)

Figure 34:
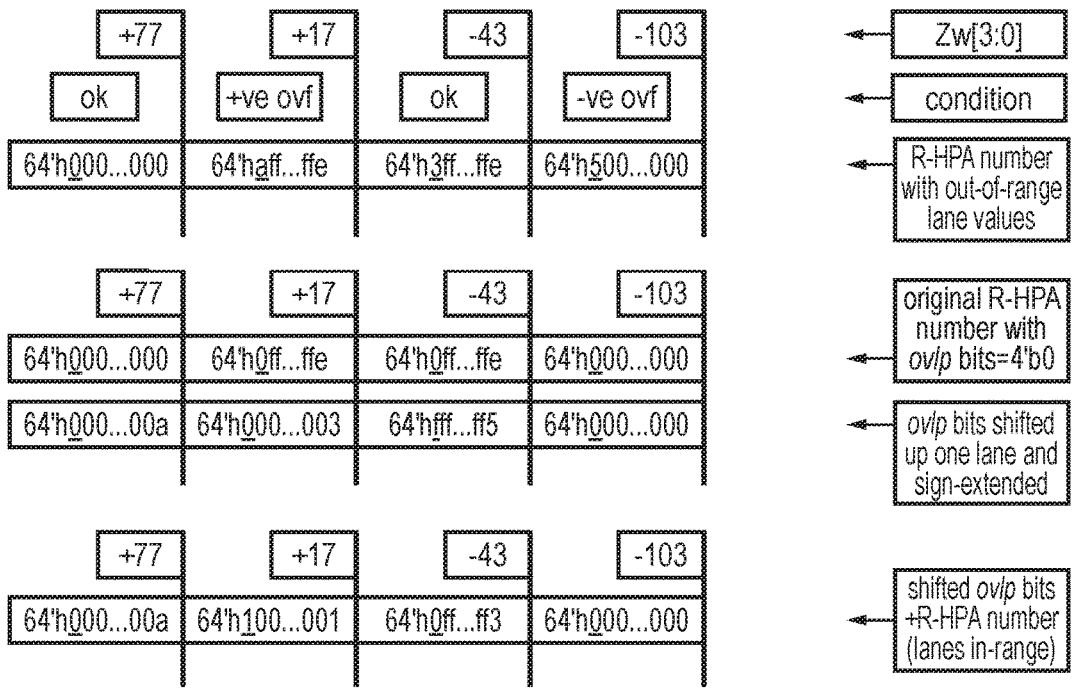
FIG. 34 shows an example of eliminating lane overflow from an RHPA value.

In a third example, the overlap reduction condition may be satisfied when an actual overflow occurs from one of the N-bit portions of the first M-bit data value when performing a processing operation on that value. In this case, the processing circuitry may detect the overflow and then revert to the previous value of the first M-bit value, convert it to the second M-bit value using the overlap reduction operation and then repeat the processing operation on the second M-bit value. Alternatively, the overflowed result of processing the first M-bit value could be mapped directly to the second M-bit value (see the example of FIG. 34 discussed below).

Alternatively, in some examples an overlap reduction operation could be performed every time an operation is performed on a value having the redundant-representation, so that the result is effectively maintained in a non-redundant or restricted-redundant form. For example, if there are only 2 overlap bits in some lanes then this option may be preferred.

In some cases, an overlap propagation operation could be performed at the same time as performing another type of processing operation on the first M-bit data value to generate the second M-bit value. For example, in response to a given instruction identifying an input operand, the overlap propagation operation may be performed comprising a number of N-bit addition operations where each N-bit addition operation comprises adding the non-overlap bits of the corresponding N-bit portion of the first M-bit data value, the overlap bits of the preceding N-bit portion of the first M-bit data value, and a corresponding N-bit portion of a third M-bit value having the redundant representation and corresponding to the input operand, to generate a corresponding N-bit portion of the second M-bit value. If the first M-bit data value is already in restricted-redundant form, then the second M-bit value resulting from this operation will also be restricted-redundant. In this way, the overhead of overlap propagation is reduced since it can essentially be performed at the same time as an addition, and also since the M-bit data value remains in restricted-redundant form, only 2 overlap bits per lane are needed, leaving more bits available for use as non-overlap bits so that the overall M-bit value can represent a wider range. In some examples, the third M-bit value could have the redundant representation already. In other examples, the input operand may be represented in a different representation, and may be converted into the third M-bit value having the redundant representation before adding it to the non-overlap bits and overlap bits of the first M-bit value.

The processing circuitry may also perform a second type of conversion operation to convert a first M-bit value having the redundant representation to a converted value in a different representation. The different representation could be any format including integer, fixed-point or floating-point. In some cases, the second type of conversion operation may comprise performing an overlap propagation operation as discussed above to map an initial M-bit value to the first M-bit value, and then converting the first M-bit value generated by the overlap propagation operation to the converted value. The overlap propagation operation could be the non-redundant or restricted-redundant version. Alternatively, if the M-bit value to be converted is already in a non-redundant or restricted-redundant form, then there may be no need to perform an initial overlap propagation operation and the first M-bit value may simply be converted directly to the converted value.

In one example the second type of conversion operation may comprise mapping each N-bit portion of the first M-bit value to a corresponding floating-point value based on the programmable anchor value. This approach has the benefit that each element of the second M-bit value can be processed in parallel. In some cases the final converted result could be a vector in which each element is one of the floating-point values mapped from the respective N-bit portions of the first M-bit value. This is useful for retaining the higher precision of the redundant representation in floating-point form by providing a vector of floating-point values whose sum is equivalent to the initial redundant representation, and hence avoiding loss of information due to rounding. Alternatively, the processing circuitry may add the respective floating point values mapped from each N-bit portion of the first N bit value to generate a single floating point value as the converted value, with rounding as appropriate. To produce a correctly rounded result, in can be useful to add the respective floating-point values in an order starting with the floating-point value mapped from the least significant N-bit portion of the first M-bit value and ending with the floating-point value mapped from the most significant N-bit portion of the first M-bit value.

Alternatively, the second type of conversion operation could be performed by forming a significand of a floating point value by rounding a group of bits selected from among non-overlap bits of at least one N-bit portion of the first M-bit value based on less significant bits of the first M-bit value than the selected group of bits. This approach is more generally applicable, but may be slower as it may require some sequential processing starting with one portion of the first N-bit value and then moving to the next.

In some cases, the anchor value associated with a given M-bit value in the redundant representation could be a fixed value selected statically for a given hardware implementation.

However, greater flexibility can be provided by using a programmable anchor value, so that the programmer can specify the range of significance to be represented using a given M-bit value in the redundant representation. This allows a relatively narrow set of hardware units to process numeric values across a wide numeric range, by using the programmable anchor value to define a variable window of significance to be calculated in a given operation.

In general the overlap bits of a given lane may represent a signed integer value, and so may represent both positive and negative adjustments to the next lane.

Some implementations may permit the number of overlap bits in a given lane to be greater than N/2. In this case, the overlap portion of that lane may overlap in significance with the non-overlap portions in two or more subsequent lanes. Hence, in a group of three or more adjacent N-bit portions, the overlap bits of the lowest portion may be of equivalent significance to some non-overlap bits in two or more further N-bit portions. While this approach enables even more operations to be performed without risk of overflow, it may complicate overlap propagation and conversion operations since more cross-lane combinations of bits may be required.

A simpler approach may be to restrict the number of overlap bits so that each of the lanes has N/2 overlap bits or fewer. By restricting the number of overlap bits to half the lane size or smaller, the hardware implementation is much simpler as each set of overlap bits represents an adjustment to a single more significant lane, requiring less cross-lane activity. If a greater value number of overlap bits is desired for a given implementation, then the lane size N could be increased.

In some implementations, the number of overlap bits V may be fixed (hardwired) by the hardware implementation. Even so, it can still be useful to provide an overlap size value which identifies the number of overlap bits used by a given implementation, to allow a program to determine the current overlap size being used even if the same code is executed on hardware implementations using different overlap sizes. For example, a control register could specify the overlap size.

However, a more flexible approach is to provide a programmable overlap size value, which the programmer or a compiler can set to a value appropriate for the application to be carried out. This enables a choice in the overlap size value. If it is important to allow a large number of additions to be performed without overflow, the overlap size can be reduced. If fewer additions are expected to be needed, then reducing the overlap size can enable the calculation to be performed with fewer N-bit lanes of processing, which could improve performance by enabling multiple M-bit calculations to be carried out in parallel with different subsets of N-bit add circuit units provided in hardware. Hence, the programmer can set the overlap size value depending on the expected number of additions to be performed and the numeric range of values expected for the required application.

The overlap size value could be specified in a range of ways, but in some cases it may be specified in a control register provided in hardware. In some cases the control register could be the same register used to store the programmable anchor value which sets the significance of each lane.

Alternatively the overlap size value could be specified by an instruction which controls the processing circuitry to process at least one data value having the redundant representation.

In some cases, the number of overlap bits may be the same for each N-bit portion of the redundant representation (other than the most significant N-bit portion which as discussed above may not have any overlap bits). In this case, a single overlap size value may specify the number of overlap bits to be used in each lane of the redundant representation other than the top lane.

However, it is also possible to provide different lanes with different numbers of overlap bits. For example, it may be useful to provide the lower lanes with a greater number of overlap bits than upper lanes, as if numbers at the extremes of the representable are rare, it would be expected that carries into the overlap bits would be more common for the lower lanes than the upper lanes. Hence, in some cases it can be useful to provide an overlap size value which specifies the number of overlap bits separately for two or more of the N-bit portions of the redundant representation. In some cases, each lane could have its overlap size specified separately (or at least each lane other than the top lane could have a separate overlap size value). In other examples, a number of subsets of lanes could each have a separate overlap size indication, but lanes within the same subset may all use the same overlap size.

As discussed above, the redundant representation can be useful for a range of operations, especially if they include an addition. However, it is particularly useful for an accumulation instruction which triggers accumulation of at least one value into an accumulator register.

As multiple values in the redundant representation can be added without risk of overflow between N-bit lanes, the technique also enables a given type of instruction to trigger addition of three or more separate M-bit data values in a single operation, which would not otherwise be possible. This allows further speed up in performance when accumulating data values. In each N-bit add circuit unit, a Wallace tree may be used to combine the corresponding N-bit portions of the at least three M-bit values to generate two N-bit terms, and then a carry-propagate adder may add the two N-bit terms to generate the corresponding N-bit portion of the M-bit result. It will be appreciated that there are a number of ways of implementing a Wallace tree and any known technique may be used.

In some cases the two or more M-bit data values to be added may be derived from respective elements of an input vector. This allows a single instruction to specify multiple input values to be accumulated for example. In some cases, the M-bit data values corresponding to all of the elements of the input vector could be added together to form a corresponding result.

However, it is also possible to generate two or more independent results, with a first M-bit result generated by a first set of N-bit additions to add M-bit data values corresponding to a first subset of input data elements of the input vector, and a second M-bit result generated by a second set of N-bit additions to add M-bit data values corresponding to a second subset of input data elements of the input vector. Hence, M may be smaller than the vector width implemented in hardware. The allocation of which input data elements correspond to the first and second subsets could be static (fixed for a given implementation), or variable based on programmable input map information.

Another application for the present technique is where the M-bit operand values being added are partial products generated during a multiplication of two operand values. This can be particularly useful for multiplying two values which are longer than the lane width N using a number of smaller parallel N-bit operations.

In another example, the processing circuitry may perform an overlap propagating operation on a first data value to generate a second data value, the first and second data values having a redundant representation representing a P-bit numeric value using an M-bit data value comprising a plurality of N-bit portions, where M>P>N, where in the redundant representation, each N-bit portion other than a most significant N-bit portion includes a plurality of overlap bits having a same significance as a plurality of least significant bits of a following N-bit portion, and the processing circuitry is configured to generate each N-bit portion of the second data value other than a least significant N-bit portion by performing an addition operation comprising adding non-overlap bits of a corresponding N-bit portion of the first data value to the overlap bits of a preceding N-bit portion of the first data value.

This approach is useful for reducing the chance of overflow from a value represented in the redundant representation using a parallel technique. It will be appreciated that this particular example of the overlap propagating operation could be applied to long integer or fixed-point values represented in the redundant form which have a fixed significance (rather than an associated programmable anchor value defining a variable significance as in RHPA format discussed above). Using the redundant representation for such values still enables fast addition of long operands, and the overlap propagation operation defined above enables the chances of overflow between lanes to be reduced using a relatively fast parallel operation.

The overlap propagating operation can be performed with the addition operations for at least two of the N-bit portions of the second data value performed in parallel. It is not essential to carry out all of the addition operations in parallel. For example, a system with hardware sufficient for carrying out only some of the additions in parallel may still be faster than a system implementing only sequential conversion to non-redundant form. Nevertheless, for better performance the processing circuitry may perform the addition operation in parallel for each of the N-bit portions of the second data value other than the least significant N-bit portion. The processing circuitry may have parallel add circuit units for carrying out the respective addition operations in parallel.

In another example processing circuitry may perform a plurality of lanes of processing on respective data elements of at least one operand vector to generate corresponding result data elements of a result vector. Lane position information may be provided for each lane of processing, with the lane position information for a given lane identifying a relative position of the corresponding result data element to be generated by the given lane within a corresponding result data value which spans one or more result data elements of the result vector. Each lane of processing can be performed in dependence of the lane position information identified for that lane. This approach enables processing hardware which supports a given vector size to flexibly support processing of data values of a larger or smaller size.

This contrasts with standard single instruction multiple data (SIMD) techniques which would typically have hardwired circuitry which receives a global input specifying a given data element size to be used for every element of the vector, which enables determination of whether to propagate carries between portions of the vector for example. In such SIMD, the data element size would be specified globally for the entire vector, rather than identifying whether particular data elements of a result vector are at the lower or upper end of a given result. By providing the ability to independently specify for each lane the relative position within the corresponding result to be generated, this provides much greater flexibility for using hardware of a given size to calculate results of different sizes including permitting the hardware to generate a result of a larger size than the vector width, and allowing multiple results of different sizes to be calculated in parallel within a single vector, which would not be possible with standard SIMD techniques.

In general, the lanes of processing performed on the respective data elements may comprise any kind of operation applied to the corresponding data elements. This may include not only arithmetic or logical operations, but also for example operations to convert the elements from one representation to another (e.g. converting to or from the RHPA format discussed above).

The lane position information could be represented in different ways. In some cases the lane position information may identify whether the corresponding result data element is the most significant data element of the corresponding result data value. For some types of processing operation, the most significant data element of the result may be treated differently to other elements and so it may be enough simply to identify whether or not each element is the most significant bit element of the result data value (e.g. using a 1-bit indicator).

For example, when an overflow condition is detected for a given lane, the processing circuitry may select how to handle the overflow based on whether the lane position information identifies that lane as corresponding to the most significant data element of the result. For example there may be a number of overflow handling responses available, and one of these may be selected based on the lane position information. For example, the overflow handling responses could include doing nothing, setting information indicating that an overflow has occurred, triggering an exception to handle the overflow, or triggering performance of the overlap propagation operation described above. Which of these is selected may depend on the position of the overflowing lane within the result being generated.

The lane position information could also identify whether the result data element is the least significant data element of the result. For example, processing of the least significant data element may differ from higher order elements in that there are no carries into that lane from lower elements, and some operations (for example the overlap propagating operation discussed above) may treat the low order lane differently from other lanes. Hence, identifying the least significant data element can be useful.

More generally, the lane position information could identify each lane as generating one of the least significant element, the most significant element, or an intermediate element of the result data value. For example a two-bit indicator can indicate this information. This is useful when both the most significant lane and the least significant lane need to be treated differently from the intermediate lanes.

A lane position indicator of this type enables a high degree of flexibility in how the hardware of a given size processes values. For example, when the lane position information for the most or least significant lane of processing identifies that the corresponding result data element is an intermediate data element, then this may trigger the processing circuitry to generate the result vector which represents a partial portion of a result value which has a greater number of bits than the result vector itself. A series of such operations may be performed to calculate each respective portion of the result data value.

Alternatively, when the lane position information identifies that an intermediate lane of processing is to generate the least significant or most significant data element to the corresponding result, then this will trigger the processing circuitry to generate a result vector which includes two or more independent result data values. This enables performance improvement by permitting parallel generation of two or more results.

In some examples, in response to a predetermined type of instruction identifying an input vector comprising a plurality of input data elements when the lane position information identifies that the result vector comprises at least two independent result data values, the processing circuitry may perform at least a first subset of lanes of processing on a first subset of data elements of the at least one operand vector mapped from a first subset of input data elements of the input vector to generate a first of the independent result data values, and a second subset of lanes of processing on a second subset of data elements of the at least one operand vector mapped from a second subset of input data elements of the input vector to generate a second of the independent result data values. Hence, some of the elements of the original input vector may be combined in the first subset of lanes of processing, and other elements may be processed in the second subset of lanes of processing. The processing circuitry may select which input data elements are in the first subset or the second subset in dependence on programmable input map information. This is useful to enable the same type of instruction to combine the input data elements of the input vector in different combinations by setting different values of the input map information. The input map information could be stored in a register referenced by the instruction for example.

The lane position information can be useful for a vector implementation which performs the processing for each lane sequentially, to enable each lane to be performed independently of any other lane. However, it is particularly useful when there are parallel circuit units for performing multiple lanes of processing in parallel.

The lane position information may programmable so that the programmer writing a particular program can set how to map values to be processed onto the hardware. Alternatively, the lane position information could be set by a compiler compiling the source code written by a programmer.

In some cases the lane position information may also be determined by the hardware, for example the programmer may specify the overall result size to be generated and then the hardware may determine the lane position information based on the specified result size and an indication of the hardware vector length implemented in the circuited implementation. This may be useful if the programmer may not know the particular vector size implemented in the hardware for a given implementation.

The lane position information could be specified in various ways, e.g. within the instruction encoding, a general purpose register, or a dedicated control register.

However, it can be particularly useful to define the lane position information in the same control register as one or both of the programmer anchor value and the overlap value discussed above.

A method is provided for multiplying a first operand comprising a plurality of X-bit portions and a second operand comprising at least one Y-bit portion, comprising: generating a plurality of partial products, each partial product comprising a product of a selected X-bit portion of the first operand and a selected Y-bit portion of the second operand;

for each partial product, converting the partial product to a redundant representation in dependence on significance indicating information indicative of a significance of the partial product, wherein in said redundant representation the partial product is represented using a plurality of N-bit portions, where in a group of at least two adjacent N-bit portions of the redundant representation, a plurality of overlap bits of a lower N-bit portion of the group have a same significance as a plurality of least significant bits of at least one upper N-bit portion of the group; and adding the plurality of partial products represented in the redundant representation.

With this method, the multiplication of relatively long operands can be performed faster than previous techniques, because using the redundant representation to add the partial products enables any carries to be accommodated in the overlap bits, to avoid needing to propagate carries between lanes. Also, there is no need to convert the first and second operands to the redundant representation.

The addition can be performed using a plurality of N-bit add circuit units for performing independent N-bit additions using respective N-bit portions of the partial products represented in the redundant representation. By using a number of parallel N-bit additions, rather than larger additions corresponding to the total width of the product, the additions are made much faster, enabling multiplication of relatively long operands in shorter time.

In some cases, it is possible to calculate all the partial products first, and then add the products together in a subsequent additional step. However, if the number of partial products is relatively large, this may require a significant number of registers for storing all the partial products, which may increase register pressure and reduce performance of other operations requiring registers.

Therefore, a more efficient technique can be to accumulate the partial products into an accumulator register storing an accumulator value having said redundant representation. Hence, one or more partial products may be generated and added to the accumulator value which maintains a running total of the partial products calculated so far, and a series of accumulations calculates the final product of the first and second operands.

More particularly, the multiplying of the first and second operands may be implemented using a number of partial product accumulating operations, each partial product accumulating operation corresponding to a different pair of portions selected as said selected X-bit portion and said selected Y-bit portion, and comprising:

multiplying the selected X-bit portion and the selected Y-bit portion to generate one of said plurality of partial products;

converting said one of said plurality of partial products to the redundant representation in dependence on the significance indicating information; and adding said one of said plurality of partial products in said redundant representation to an accumulator value having said redundant representation to generate an updated accumulator value;

wherein the updated accumulator value for one partial product accumulating operation is used as the accumulator value for a next partial product accumulating operation.

By generating the partial products one at a time and accumulating them successively into the accumulator value, only one register needs to be used for storing the accumulator value, leaving more registers available for other operations.

The partial product accumulating operations can be pipelined so that the adding of the partial product and the accumulator value for one partial product accumulating operation can be performed in parallel with the multiplying for a following partial product accumulating operation. The multiplying itself could also be pipelined so that the multiplying may be performed in several stages and a later multiplying stage for an earlier partial product accumulating operation may be performed in parallel with an earlier multiplying stage for a later partial product accumulating operation.

The final result may still be in the redundant representation. If a non-redundant representation (e.g. integer) is desired, then an overlap propagation operation can be performed on a result of adding the plurality of partial products in the redundant representation, to propagate the overlap bits of one or more N-bit portions of the result to one or more subsequent N-bit portions of the result. By propagating the overlap bits from one lane to the next (e.g. by adding the overlap bits to the non-overlap bits of the next lane), a non-redundant format can be obtained where each set of overlap bits is zero. The overlap propagation operation could be performed using any of the techniques discussed above.

In other examples, rather than waiting until all the accumulations are complete, at least one overlap propagation addition (to add overlap bits of one lane to the non-overlap bits of the next lane) could take place in parallel with at least one of the partial product accumulating operations. For example, if the partial product accumulating operations are performed in ascending order of significance of the partial products generated in each partial product accumulating operation, then one or more lower lanes of the final accumulator representing the product of the input operands may be ready before accumulations which affect higher lanes of the accumulator have finished, and so an overlap propagation addition performed on the lower lanes can be performed in parallel with the accumulation affecting higher lanes.

The significance indicating information may be represented in various ways. In general, the significance indicating information may be dependent on a relative position of said selected X-bit portion within said first operand and said selected Y-bit portion within said second operand.

In some cases, the significance indicating information may be dependent on a significance indicating parameter associated with at least one of said selected X-bit portion and said selected Y-bit portion. For example, if the input operands are FP values (or mapped to FP values), the significance indicating information could depend on exponents of the FP values.

Alternatively, the significance indicating information may be dependent on a parameter specified by an instruction for controlling processing circuitry to generate at least one of said partial products. This could be a parameter of the instruction which explicitly identifies the significance of the partial product to be generated, or the significance indicating information could be implicit from a parameter of the instruction which identifies at least which X-bit portion of the first operand is said selected X-bit portion (and if the second operand has more than one Y-bit portion, a parameter identifying which Y-bit portion is the selected Y-bit portion may also be considered to determine the significance of the partial product).

In some examples, the first operand and the second operand comprise integers. Alternatively, the first/second operands could be in other formats, such as FP or the redundant representation. Also, in some cases the first operand could be in a different format to the second operand. Regardless of the format of the first and second input operands, they can be mapped to smaller X-bit portions and Y-bit portions respectively, to permit multiplication of the input operands using a number of smaller multiplications.

In some examples, X=Y, so that the first and second operands have the same sized portions. Alternatively, X and Y may be different.

If X and Y are both equal to, or less than, 53 then the partial product multiplications may be performed using floating-point multiplying circuitry provided for multiplying significands of two double-precision floating-point values. If X or Y is less than 53, then the portions can be padded to produce 53-bit values to be multiplied by the DP multiplier. Hence, this enables existing multiplying hardware to be used.

Similarly, if X and Y are both less than or equal to 24, or less than or equal to 11, then the multiplications may reuse a single-precision or half-precision floating-point multiplier respectively.

Alternatively, a bespoke multiplier may be provided if there is no existing multiplying circuitry which supports X*Y-bit multiplication.

In one example, the method may comprise a step of mapping the first operand to a corresponding vector of floating-point values, each floating-point value having a significand mapped from a respective X-bit portion of the first operand and an exponent dependent on a significance of that X-bit portion within the first operand, wherein the significance indicating information for a given partial product is dependent on the exponent of the floating-point value corresponding to the selected X-bit portion used to generate said given partial product. By mapping the input operands to vectors of floating-point values, the operation can be simplified because the significance indicating information can be represented explicitly within the encoding of the input X- and Y-bit portions and the partial products themselves, rather than requiring a further parameter. Also, this enables existing floating-point hardware to be reused.

A data processing apparatus may comprise processing circuitry configured to perform the method for multiplying the first and second operands as discussed above.

For example, a data processing apparatus may comprise:
multiply circuitry to multiply a selected X-bit portion of a first operand comprising a plurality of X-bit portions and a selected Y-bit portion of a second operand comprising at least one Y-bit portion to generate a partial product;
conversion circuitry to convert the partial product to a converted partial product having a redundant representation in dependence on significance indicating information indicative of a significance of the partial product, wherein in said redundant representation the partial product is represented using a plurality of N-bit portions, where in a group of at least two adjacent N-bit portions of the redundant representation, a plurality of overlap bits of a lower N-bit portion of the group have a same significance as a plurality of least significant bits of at least one upper N-bit portion of the group; and
adding circuitry to add the converted partial product to an accumulator value having said redundant representation.

The adding circuitry may comprise a plurality of N-bit add circuit units to perform independent N-bit additions using corresponding N-bit portions of the converted partial product and the accumulator value. This enables the additions of longer values to be performed faster using the redundant representation.

Control circuitry (e.g. an instruction decoder) may be provided which is responsive to at least one multiply instruction to control the multiply circuitry and the conversion circuitry to generate a plurality of converted partial products in the redundant representation corresponding to different combinations of portions selected as said selected X-bit portion and said selected Y-bit portion, and to control the adding circuitry to add each of said plurality of partial products to the accumulator value. In some cases one multiply instruction specifying the first and second operands may control the generation of all the partial products. In other examples, separate multiply-accumulate instructions could be provided each specifying a different combination of portions as the selected X-bit portion and the selected Y-bit portion to be multiplied and accumulated into the accumulator value.

Further example arrangements are defined in the clauses below:

1. An apparatus comprising:
processing circuitry to process M-bit data values having a redundant representation representing a P-bit numeric value using a plurality of N-bit portions, where M>P>N,
wherein the processing circuitry is configured to identify a significance of bits of each N-bit portion of the redundant representation based on an anchor value, and within a group of at least two adjacent N-bit portions, a plurality of overlap bits of a lower N-bit portion of the group have a same significance as a plurality of least significant bits of at least one upper N-bit portion of the group, where V<N; and
the processing circuitry comprises a plurality of operation circuit units to perform a plurality of independent N-bit operations in parallel, each N-bit operation comprising computing a function of corresponding N-bit portions of at least two M-bit operand values having the redundant representation to generate a corresponding N-bit portion of an M-bit result value having the redundant representation.

2. The apparatus according to clause 1, wherein said plurality of operation circuit units comprise a plurality of add circuit units to perform a plurality of N-bit additions in parallel, each N-bit addition comprising adding the corresponding N-bit portions of said at least two M-bit operand values to generate said corresponding N-bit portion of said M-bit result value.

3. The apparatus according to any of clauses 1 and 2, wherein the processing circuitry is configured to perform a conversion operation to convert an input value to a converted M-bit data value having the redundant representation.

4. The apparatus according to clause 3, wherein the conversion operation comprising setting the overlap bits in dependence on a sign of the input value.

5. The apparatus according to clause 4, wherein when the input value is positive, the processing circuitry is configured to set the overlap bits to 0, and when the input value is negative, the processing circuitry is configured to set the overlap bits to 1.

6. The apparatus according to any of clauses 4 and 5, wherein when the input value comprises a floating-point value, the conversion operation comprises:

mapping bits of a significand of the floating-point value to bits of corresponding significance in the M-bit data value in dependence on the anchor value and an exponent of the floating-point value, with the overlap bits of at least one N-bit portion set to 0;

when the input value is positive, outputting a result of the mapping as the converted M-bit data value; and when the input value is negative, negating the result of the mapping to generate the converted M-bit data value.

7. The apparatus according to any of clauses 1 to 6, wherein the processing circuitry is configured to perform an overlap reduction operation on a first M-bit value having the redundant representation to generate a second M-bit value having the redundant representation in which the overlap bits in at least one N-bit portion of the second M-bit value represent a smaller magnitude than the overlap bits of at least one corresponding N-bit portion of the first M-bit value.

8. The apparatus according to clause 7, wherein the overlap reduction operation comprises an overlap propagating operation to propagate the overlap bits of one or more N-bit portions of a first M-bit value having the redundant representation to one or more subsequent N-bit portions of the first M-bit value to generate a second M-bit value having the redundant representation which represents the same P-bit numeric value as the first M-bit value using a different pattern of overlap bits.

9. The apparatus according to clause 8, wherein in the second M-bit value, the overlap bits are equal to 0.

10. The apparatus according to any of clauses 8 and 9, wherein the overlap propagating operation comprises performing a plurality of sequential additions including:

an initial addition to add the overlap bits of a least significant N-bit portion of the first M-bit value to a following N-bit portion of the M-bit value to generate modified non-overlap bits and modified overlap bits; and at least one further addition to add the modified overlap bits from a preceding addition to a next N-bit portion of the first M-bit value to generate modified non-overlap bits and modified overlap bits;

wherein the processing circuitry is configured to generate the second M-bit value based on the modified non-overlap bits generated in each sequential addition and with the overlap bits set to 0.

11. The apparatus according to clause 8, wherein in the second M-bit value, for each N-bit portion with overlap bits, the two least significant overlap bits have one of values 00, 01, 11 and any remaining overlap bits have a same value as the second least significant overlap bit.

12. The apparatus according to any of clauses 8 and 11, wherein the overlap propagating operation comprises performing a plurality of parallel additions, each parallel addition comprising adding the overlap bits of a given N-bit portion of the first M-bit value to non-overlap bits of a following N-bit portion of the first M-bit value to generate an N-bit portion of the second M-bit value corresponding in significance to said following N-bit portion of the first M-bit value.

13. The apparatus according to any of clauses 11 and 12, wherein each parallel addition comprises adding an N-bit sign extension of the overlap bits of the lower N-bit portion to an N-bit value corresponding to the following N-bit portion with any overlap bits set to 0.

14. The apparatus according to any of clauses 11 to 13, wherein the overlap propagating operation comprises converting the second M-bit value to a third M-bit value in which all overlap bits are equal to 0.

15. The apparatus according to clause 14, wherein converting the second M-bit value to the third M-bit value comprises:

generating an overlap value representing a total of the overlap bits of the second M-bit value, and a non-overlap value representing a total of the non-overlap bits of the second M-bit value;

generating a plurality of carry values in dependence on bit patterns of the overlap value and the non-overlap value; and performing a plurality of parallel additions, each addition for adding corresponding portions of the overlap value and the non-overlap value and one of the carry values to generate a corresponding portion of the third M-bit value.

16. The apparatus according to clause 7, wherein the overlap reduction operation comprises an overlap accumulation operation to add the overlap bits of one or more N-bit portions of the first M-bit value to corresponding N-bit portions of an overlap accumulator value and to set said overlap bits of said one or more N-bit portions of the first M-bit value to zero to generate said second M-bit value.

17. The apparatus according to any of clauses 7 to 16, wherein the processing circuitry is configured to maintain an operation count indicative of a number of operations performed to generate the first M-bit value, and to perform the overlap reduction operation when the operation count indicates that the number of operations is equal to or greater than a predetermined number.

18. The apparatus according to clause 17, wherein the predetermined number of operations is less than or equal to $2^{V-1}-1$, where V is the minimum number of overlap bits comprised by any of the N-bit portions having overlap bits.

19. The apparatus according to any of clauses 17 and 18, wherein the processing circuitry is configured to reset the operation count when the overlap reduction operation is performed.

20. The apparatus according to any of clauses 7 to 16, wherein the processing circuitry is configured to perform the overlap reduction operation in response to detecting that the overlap bits for one of the N-bit portions of the first M-bit value have a predetermined value.

21. The apparatus according to any of clauses 7 to 16, wherein the processing circuitry is configured to perform the overlap reduction operation in response to detecting an overflow from one of the N-bit portions of the first M-bit data value when performing a processing operation on the first M-bit value.

22. The apparatus according to any of clauses 1 to 21, wherein the processing circuitry is configured to perform a conversion operation to convert a first M-bit value having the redundant representation to a converted value in a different representation.

23. The apparatus according to clause 22, wherein the conversion operation comprises performing an overlap propagation operation to propagate the overlap bits of one or more N-bit portions of an initial M-bit value to one or more subsequent N-bit portions of the initial M-bit value to generate said first M-bit value having the redundant representation, and converting the first M-bit value to the converted value.

24. The apparatus according to clause 22, wherein the processing circuitry is configured to map each N-bit portion of the first M-bit value to a corresponding floating-point value in dependence on the anchor value.

25. The apparatus according to clause 24, wherein the processing circuitry is configured to output, as the converted value, a vector comprising the respective floating-point values mapped from each N-bit portion of the first M-bit value.

26. The apparatus according to clause 24, wherein the processing circuitry is configured to add the respective floating-point values mapped from each N-bit portion of the first M-bit value to generate a single floating-point value as the converted value.

27. The apparatus according to clause 26, wherein when the first M-bit value comprises three or more N-bit portions, the processing circuitry is configured to add the respective floating-point values in an order starting with the floating-point value mapped from the least significant N-bit portion of the first M-bit value and ending with the floating-point value mapped from the most significant N-bit portion of the first M-bit value.

28. The apparatus according to clause 22, wherein when the converted value is a floating-point value, the processing circuitry is configured to form a significand of the floating-point value by rounding a selected group of bits selected from among non-overlap bits of at least one N-bit portion of the first M-bit value based on less significant bits of said first M-bit value than said selected group of bits.

29. The apparatus according to any of clauses 1 to 28, wherein the anchor value is programmable.

30. The apparatus according to any of clauses 1 to 29, wherein each of the N-bit portions has N/2 overlap bits or fewer.

31. The apparatus according to any of clauses 1 to 30, wherein the overlap bits represent a signed integer value.

32. The apparatus according to any of clauses 1 to 31, wherein the processing circuitry is configured to identify the number of overlap bits for at least one N-bit portion of the redundant representation based on an overlap size value.

33. The apparatus according to clause 32, wherein the overlap size value is programmable.

34. The apparatus according to any of clauses 32 and 33, wherein the overlap size value is specified in a control register.

35. The apparatus according to clause 34, wherein the anchor value is specified in the same control register as the overlap size value.

36. The apparatus according to clause 33, wherein the overlap size value is specified by a data processing instruction for controlling the processing circuitry to process at least one data value having the redundant representation.

37. The apparatus according to any of clauses 32 to 36, wherein the overlap size value specifies the number of overlap bits separately for two or more of the N-bit portions of the redundant representation.

38. The apparatus according to clause 2, wherein in response to an accumulation instruction, said plurality of add circuit units are configured to perform said plurality of N-bit additions with one of said at least two M-bit data values having the redundant representation comprising an M-bit accumulator value stored in an accumulator register, and the processing circuitry is configured to write the M-bit result value to the accumulator register.

39. The apparatus according to clause 2, wherein in response to a predetermined type of instruction, each N-bit addition comprises adding corresponding N-bit portions of at least three M-bit data values.

40. The apparatus according to clause 39, wherein each add circuit unit comprises a Wallace tree to combine corresponding N-bit portions of the at least three M-bit values to generate two N-bit terms, and a carry-propagate adder to add the two N-bit terms to generate the corresponding N-bit portion of the M-bit result value.

41. The apparatus according to any of clauses 1 to 40, wherein in response to a predetermined type of instruction identifying an input vector comprising a plurality of input data elements, the processing circuitry is configured to perform the N-bit operations with said at least two M-bit data values corresponding to respective values specified in a corresponding input data element of the input vector.

42. The apparatus according to clause 41, wherein in response to the predetermined type of instruction, the processing circuitry is configured to perform a first set of N-bit operations on M-bit data values corresponding to a first subset of input data elements of the input vector, and a second set of N-bit additions on M-bit data values corresponding to a second subset of input data elements of the input vector.

43. The apparatus according to clause 42, wherein the processing circuitry is configured to select which input data elements are in the first subset or the second subset in dependence on programmable input map information.

44. The apparatus according to any of clauses 1 to 43, wherein the at least two M-bit operand values comprise a plurality of partial products generated by the processing circuitry in response to at least one multiplication instruction for multiplying two operand values.

45. A data processing method comprising:
  processing M-bit data values having a redundant representation representing a P-bit numeric value using a plurality of N-bit portions, where M>P>N,
  wherein a significance of bits of each N-bit portion of the redundant representation is identified based on an anchor value, and within a group of at least two adjacent N-bit portions, a plurality of overlap bits of a lower N-bit portion of the group have a same significance as a plurality of least significant bits of at least one upper N-bit portion of the group; and
  the processing comprises performing a plurality of independent N-bit operations in parallel, each N-bit operation comprising computing a function of corresponding N-bit portions of at least two M-bit operand values having the redundant representation to generate a corresponding N-bit portion of an M-bit result value having the redundant representation.

46. An apparatus comprising:
  means for processing M-bit data values having a redundant representation representing a P-bit numeric value using a plurality of N-bit portions, where M>P>N,
  wherein the means for processing is configured to identify a significance of bits of each N-bit portion of the redundant representation based on an anchor value, and within a group of at least two adjacent N-bit portions, a plurality of overlap bits of a lower N-bit portion of the group have a same significance as a plurality of least significant bits of at least one upper N-bit portion of the group; and
  the means for processing comprises means for performing a plurality of independent N-bit operations in parallel, each N-bit operation comprising computing a function of corresponding N-bit portions of at least two M-bit operand values having the redundant representation to generate a corresponding N-bit portion of an M-bit result value having the redundant representation.

47. An apparatus comprising:

processing circuitry to perform an overlap propagating operation on a first data value to generate a second data value, the first and second data values having a redundant representation representing a P bit numeric value using an M-bit data value comprising a plurality of N-bit portions, where M>P>N, where in the redundant representation, each N-bit portion other than a most significant N-bit portion includes a plurality of overlap bits having a same significance as a plurality of least significant bits of a following N-bit portion;

wherein the processing circuitry is configured to generate each N-bit portion of the second data value other than a least significant N-bit portion by performing an addition operation comprising adding non-overlap bits of a corresponding N-bit portion of the first data value to the overlap bits of a preceding N-bit portion of the first data value.

48. The apparatus according to clause 47, wherein in the second data value, for each N-bit portion with overlap bits, the two least significant overlap bits have one of values 00, 01, 11 and any remaining overlap bits have a same value as the second least significant overlap bit.

49. The apparatus according to any of clauses 47 and 48, wherein the processing circuitry is configured to perform the addition operation in parallel for at least two of the N-bit portions of the second data value.

50. The apparatus according to any of clauses 47 to 49, wherein the processing circuitry is configured to perform the addition operation in parallel for each of said N-bit portions of the second data value other than the least significant N-bit portion.

51. The apparatus according to any of clauses 47 to 50, wherein the processing circuitry comprises a plurality of parallel add circuit units to perform said addition operation in parallel for at least two of the N-bit portions of the second data value.

52. The apparatus according to any of clauses 47 to 51, wherein the addition operation comprises adding an N-bit sign extension of the overlap bits of the preceding N-bit portion to an N-bit value equivalent to the corresponding N-bit portion of the first data value with any overlap bits set to 0.

53. The apparatus according to any of clauses 47 to 52, wherein the processing circuitry is configured to generate the least significant N-bit portion of the second data value with non-overlap bits equal to corresponding non-overlap bits of the least significant N-bit portion of the first data value and the overlap bits set to 0.

54. The apparatus according to any of clauses 47 to 53, wherein the overlap propagating operation further comprises converting the second data value to a third data value having the redundant representation, wherein all overlap bits of the third data value are equal to 0.

55. The apparatus according to clause 54, wherein the processing circuitry is configured to generate the third data value by:

generating an overlap value representing a total of the overlap bits of the second M-bit value, and a non-overlap value representing a total of the non-overlap bits of the second M-bit value;

generating a plurality of carry values in dependence on bit patterns of the overlap value and the non-overlap value; and performing a plurality of parallel additions, each addition for adding corresponding portions of the overlap value and the non-overlap value and one of the carry values to generate a corresponding portion of the third data value.

56. The apparatus according to any of clauses 47 to 55, wherein in response to an instruction identifying an input operand, the processing circuitry is configured to perform the overlap propagation operation in which said addition operation comprises adding:

said non-overlap bits of said corresponding N-bit portion of the first data value;

said overlap bits of said preceding N-bit portion of the first data value; and a corresponding N-bit portion of a third data value having said redundant representation and corresponding to said input operand.

57. The apparatus according to clause 56, wherein the input operand has a representation other than said redundant representation, and in response to said instruction, the processing circuitry is configured to convert said input operand to said third data value.

58. The apparatus according to any of clauses 47 to 57, wherein the overlap bits represent a signed integer value.

59. The apparatus according to any of clauses 47 to 58, wherein the processing circuitry is configured to identify the number of overlap bits based on an overlap size value.

60. The apparatus according to clause 59, wherein the overlap size value is programmable.

61. The apparatus according to any of clauses 47 to 60, wherein the processing circuitry is configured to identify a significance of bits of each N-bit portion of a data value represented using the redundant representation based on an anchor value.

62. The apparatus according to any of clauses 47 to 61, wherein the processing circuitry is configured to maintain an operation count indicative of a number of operations performed to generate the first data value, and to perform the overlap propagating operation when the operation count indicates that the number of operations is equal to or greater than a predetermined number.

63. The apparatus according to clause 62, wherein the predetermined number is less than or equal to $2^{V-1}-2$, where V is the minimum number of overlap bits comprised by any of the N-bit portions having overlap bits.

64. The apparatus according to any of clauses 62 and 63, wherein the processing circuitry is configured to reset the operation count when the overlap propagating operation is performed.

65. The apparatus according to any of clauses 47 to 61, wherein the processing circuitry is configured to perform the overlap propagating operation in response to detecting that the overlap bits for one of the N-bit portions of the first data value have a predetermined value.

66. The apparatus according to any of clause 47 to 61, wherein the processing circuitry is configured to perform the overlap propagating operation in response to detecting an overflow from one of the N-bit portions of the first data value when performing a processing operation on the first data value.

67. A data processing method comprising:

receiving a first data value having a redundant representation representing a P-bit numeric value using an M-bit data value comprising a plurality of N-bit portions, where M>P>N, where in the redundant representation, each N-bit portion other than a most significant N-bit portion includes a plurality of overlap bits having a same significance as a plurality of least significant bits of a following N-bit portion; and performing an overlap propagating operation on the first data value to generate a second data value having the redundant representation;

wherein each N-bit portion of the second data value other than a least significant N-bit portion is generated by performing an addition operation comprising adding non-overlap bits of a corresponding N-bit portion of the first data value to the overlap bits of a preceding N-bit portion of the first data value.

68. An apparatus comprising:

means for performing an overlap propagating operation on a first data value to generate a second data value, the first and second data values having a redundant representation representing a P bit numeric value using an M-bit data value comprising a plurality of N-bit portions, where M>P>N, where in the redundant representation, each N-bit portion other than a most significant N-bit portion includes a plurality of overlap bits having a same significance as a plurality of least significant bits of a following N-bit portion;

wherein the means for performing is configured to generate each N-bit portion of the second data value other than a least significant N-bit portion by performing an addition operation comprising adding non-overlap bits of a corresponding N-bit portion of the first data value to the overlap bits of a preceding N-bit portion of the first data value.

69. An apparatus comprising:

processing circuitry to perform a plurality of lanes of processing on respective data elements of at least one operand vector to generate corresponding result data elements of a result vector;

wherein the processing circuitry is configured to identify lane position information for each lane of processing, the lane position information for a given lane identifying a relative position of the corresponding result data element to be generated by the given lane within a corresponding result data value spanning one or more result data elements of the result vector; and the processing circuitry is configured to perform each lane of processing in dependence on the lane position information identified for that lane.

70. The apparatus according to clause 69, wherein the lane position information for the given lane identifies whether the corresponding result data element is a most significant data element of the corresponding result data value.

71. The apparatus according to clause 70, wherein in response to an overflow condition detected for one of the lanes of processing, the processing circuitry is configured to select one of a plurality of overflow handling responses in dependence on whether the lane position information for said one of the lanes of processing indicates that the corresponding result data element is the most significant data element of the corresponding result data value.

72. The apparatus according to any of clauses 69 to 71, wherein the lane position information for the given lane identifies whether the corresponding result data element is a least significant data element of the corresponding result data value.

73. The apparatus according to any of clauses 69 to 72, wherein the lane position information for the given lane identifies the corresponding result data element as one of:

a least significant data element of the corresponding result data value;

a most significant data element of the corresponding result data value; and an intermediate data element of the corresponding result data value.

74. The apparatus according to clause 73, wherein the lane position information comprises a 2-bit indicator.

75. The apparatus according to any of clauses 73 and 74, wherein when the lane position information for a most or least significant lane of processing identifies the corresponding result data element as an intermediate data element of the corresponding result data value, the processing circuitry is configured to generate the result vector representing a partial portion of a result data value with a greater number of bits than the result vector.

76. The apparatus according to any of clauses 73 to 75, wherein when the lane position information for an intermediate lane of processing other than a most or least significant lane of processing identifies the corresponding result data element as the least significant data element or the most significant data element of the corresponding result data value, the processing circuitry is configured to generate the result vector comprising two or more independent result data values.

77. The apparatus according to any of clauses 69 to 76, wherein in response to a predetermined type of instruction identifying an input vector comprising a plurality of input data elements when the lane position information identifies that the result vector comprises at least two independent result data values, the processing circuitry is configured to perform at least:

a first subset of lanes of processing on a first subset of data elements of said at least one operand vector mapped from a first subset of input data elements of the input vector to generate a first of said independent result data values; and a second subset of lanes of processing on a second subset of data elements of said at least one operand vector mapped from a second subset of input data elements of the input vector to generate a second of said independent result data values.

78. The apparatus according to clause 77, wherein the processing circuitry is configured to select which input data elements are in the first subset of input data elements or the second subset of input data elements in dependence on programmable input map information.

79. The apparatus according to any of clauses 69 to 78, wherein the processing circuitry comprises a plurality of processing circuit units to perform the plurality of lanes of processing in parallel.

80. The apparatus according to any of clauses 69 to 79, wherein the lane position information is programmable.

81. The apparatus according to any of clauses 69 to 80, wherein the lane position information for each lane is specified in a control register.

82. The apparatus according to any of clauses 69 to 81, wherein the processing circuitry is configured to identify a significance of bits of each data element of the at least one operand vector or the result vector based on an anchor value.

83. The apparatus according to clause 82, wherein the lane position information and the programmable anchor value are specified in a same control register.

84. The apparatus according to any of clauses 69 to 83, wherein result data elements other than a most significant result data element of the corresponding result value include a plurality of overlap bits having the same significance as a plurality of least significant bits of a subsequent result data element.

85. The apparatus according to any of clauses 69 to 84, wherein the lane position information and an overlap value identifying the number of overlap bits are specified in a same control register.

86. A data processing method comprising:
  identifying lane position information for each of a plurality of lanes of processing to be performed on respective data elements of at least one operand vector to generate corresponding result data elements of a result vector, the lane position information for a given lane identifying a relative position of the corresponding result data element to be generated by the given lane within a corresponding result data value spanning one or more result data elements of the result vector; and
  performing each lane of processing in dependence on the lane position information identified for that lane.

87. An apparatus comprising:
  means for performing a plurality of lanes of processing on respective data elements of at least one operand vector to generate corresponding result data elements of a result vector;
  wherein the means for performing is configured to identify lane position information for each lane of processing, the lane position information for a given lane identifying a relative position of the corresponding result data element to be generated by the given lane within a corresponding result data value spanning one or more result data elements of the result vector; and
  the means for performing is configured to perform each lane of processing in dependence on the lane position information identified for that lane.

88. A data processing method for multiplying a first operand comprising a plurality of X-bit portions and a second operand comprising at least one Y-bit portion, comprising:
  generating a plurality of partial products, each partial product comprising a product of a selected X-bit portion of the first operand and a selected Y-bit portion of the second operand;
  for each partial product, converting the partial product to a redundant representation in dependence on significance indicating information indicative of a significance of the partial product, wherein in said redundant representation the partial product is represented using a plurality of N-bit portions, where in a group of at least two adjacent N-bit portions of the redundant representation, a plurality of overlap bits of a lower N-bit portion of the group have a same significance as a plurality of least significant bits of at least one upper N-bit portion of the group; and
  adding the plurality of partial products represented in the redundant representation.

89. The method of clause 88, wherein the adding of the partial products is performed using a plurality of N-bit add circuit units for performing independent N-bit additions using respective N-bit portions of the partial products represented in the redundant representation.

90. The method of any of clauses 88 and 89, wherein the adding of the partial products comprises accumulating the partial products into an accumulator register storing an accumulator value having said redundant representation.

91. The method of any of clauses 88 to 90, wherein the multiplying comprises a plurality of partial product accumulating operations, each partial product accumulating operation corresponding to a different pair of portions selected as said selected X-bit portion and said selected Y-bit portion, and comprising:
  multiplying the selected X-bit portion and the selected Y-bit portion to generate one of said plurality of partial products;
  converting said one of said plurality of partial products to the redundant representation in dependence on the significance indicating information; and
  adding said one of said plurality of partial products in said redundant representation to an accumulator value having said redundant representation to generate an updated accumulator value;
  wherein the updated accumulator value for one partial product accumulating operation is used as the accumulator value for a next partial product accumulating operation.

92. The method of any of clauses 88 to 91, comprising performing an overlap propagation operation on a result of adding the plurality of partial products in the redundant representation, the overlap propagation operation comprising propagating the overlap bits of one or more N-bit portions of the result to one or more subsequent N-bit portions of the result.

93. The method of clause 91, wherein the partial product accumulating operations are performed in ascending order of significance of the partial products generated in each partial product accumulating operation;
  the method comprises performing a plurality of overlap propagation additions, each overlap propagation addition comprising adding the overlap bits of a given N-bit portion of the accumulator value to non-overlap bits of a following N-bit portion of the accumulator value; and
  at least one of said plurality of overlap propagation additions is performed in parallel with the adding step of at least one of said partial product accumulating operations.

94. The method of any of clauses 88 to 93, wherein the significance indicating information is dependent on a relative position of said selected X-bit portion within said first operand and said selected Y-bit portion within said second operand.

95. The method of any of clauses 88 to 94, wherein the significance indicating information is dependent on a significance indicating parameter associated with at least one of said selected X-bit portion and said selected Y-bit portion.

96. The method of any of clauses 88 to 95, wherein the significance indicating information is dependent on a parameter specified by an instruction for controlling processing circuitry to generate at least one of said partial products.

97. The method of any of clauses 88 to 96, wherein the significance indicating information is dependent on a parameter of the instruction identifying which X-bit portion of the first operand is said selected X-bit portion.

98. The method of any of clauses 88 to 97, wherein the first operand and the second operand comprise integers.

99. The method of any of clauses 88 to 98, wherein $X \le 53$ and $Y \le 53$.

100. The method of clause 99, wherein each partial product is generated using a floating-point multiplying circuitry for multiplying significands of two floating-point values.

101. The method of any of clauses 88 to 100, comprising a step of mapping the first operand to a corresponding vector of floating-point values, each floating-point value having a significand mapped from a respective X-bit portion of the first operand and an exponent dependent on a significance of that X-bit portion within the first operand;
  wherein the significance indicating information for a given partial product is dependent on the exponent of the floating-point value corresponding to the selected X-bit portion used to generate said given partial product.

102. The method of any of clauses 88 to 101, wherein $X=Y$.

103. The method of any of clauses 88 to 102, wherein X is different to Y.

104. A data processing apparatus comprising processing circuitry configured to perform the method of any of clauses 88 to 103.

105. A data processing apparatus comprising:
  multiply circuitry to multiply a selected X-bit portion of a first operand comprising a plurality of X-bit portions and a selected Y-bit portion of a second operand comprising at least one Y-bit portion to generate a partial product;
  conversion circuitry to convert the partial product to a converted partial product having a redundant representation in dependence on significance indicating information indicative of a significance of the partial product, wherein in said redundant representation the partial product is represented using a plurality of N-bit portions, where in a group of at least two adjacent N-bit portions of the redundant representation, a plurality of overlap bits of a lower N-bit portion of the group have a same significance as a plurality of least significant bits of at least one upper N-bit portion of the group; and
  adding circuitry to add the converted partial product to an accumulator value having said redundant representation.

106. The data processing apparatus according to clause 105, wherein said adding circuitry comprises a plurality of N-bit add circuit units to perform independent N-bit additions using corresponding N-bit portions of the converted partial product and the accumulator value.

107. The data processing apparatus according to any of clauses 105 and 106, comprising control circuitry responsive to at least one multiply instruction to control the multiply circuitry and the conversion circuitry to generate a plurality of converted partial products in the redundant representation corresponding to different combinations of portions selected as said selected X-bit portion and said selected Y-bit portion, and the adding circuitry to add each of said plurality of partial products to the accumulator value.

108. A data processing apparatus comprising:
  means for multiplying a selected X-bit portion of a first operand comprising a plurality of X-bit portions and a selected Y-bit portion of a second operand comprising at least one Y-bit portion to generate a partial product;
  means for converting the partial product to a converted partial product having a redundant representation in dependence on significance indicating information indicative of a significance of the partial product, wherein in said redundant representation the partial product is represented using a plurality of N-bit portions, where in a group of at least two adjacent N-bit portions of the redundant representation, a plurality of overlap bits of a lower N-bit portion of the group have a same significance as a plurality of least significant bits of at least one upper N-bit portion of the group; and
  means for adding the converted partial product to an accumulator value having said redundant representation.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX A—REDUNDANT HPA, WORKED EXAMPLES (in this appendix m.s.b. refers to "most significant bit" and l.s.b. refers to "least significant bit")

The high precision (HPA) format for accumulation may require cross-lane addition implying very long adds/subtracts and onerous sign computation across upper lanes as the accumulated value changes sign. Also, HPA violates the very concept of SIMD vector processing (which preferably allows each element of a vector to be processed independently). Therefore, we propose the Redundant HPA ("RHPA") in which lanes include a number of "overlap" bits that can accommodate carries within lanes, rather than having to propagate carries across lanes. This allows HPA long-wordlength addition to be executed as a number of smaller SIMD 2's-complement additions.

Suppose a vector Zw[3:0] contains the weights of the least significant bit of four 64-bit lanes as 64-bit signed elements. In an RHPA value, these values will not differ between lanes by the lane width (64) but by 64-ovlp, where ovlp is a parameter used to specify how many bits of overlap there are between adjacent lanes. In the examples in Appendix A, ovlp=4. Thus, if an HPA's m.s.b. is set to a significance of +140 (a few bits more than the maximum exponent of a single-precision IEEE floating-point number, implying that the final result will need to be converted to double-precision), the values of Zw[n] for the four lanes with ovlp=4 will be {+77, +17, −43, −103}. This yields an effective HPA wordlength of 244 bits, rather than the 256 bits obtainable with a non-redundantly-represented 4×64-bit lane HPA.

Conversion from FP into RHPA

The incoming FP number is broadcast to each lane. Logic in each lane compares the FP's exponent with its local Zw value: if the exponent is smaller than Zw[n], no bits are set in that lane; if the exponent is larger than or equal to Zw[n], the lane left-shifts the FP number by an amount calculated from the Zw value, the FP exponent and the FP precision; if the left shift value is above a certain threshold, no bits are set in that lane either.

Summary of Conversion Algorithm:
1. Broadcast FP[31:0] to vector lanes Za[n]
2. Left-shift significand in each lane by the amount calculated (or set all bits to zero)
3. If the input FP number was negative, take the 2's-complement of every lane independently and sign-extend so as to populate the ovlp bits with all sign bits.

Example 1: Convert Positive Single Precision FP Number to HPA

Input 32-b FP number=+1.fffffe×2$^{39}$
Exponent(FP)—Zw[n] for the four lanes (Zw values taken from introduction above, with ovlp=4):
  Lane 3: 39−77=−38; negative, therefore all zeroes
  Lane 2: 39−17=+22; positive, therefore shift left by 22+1 places
  Lane 1: 39−−43=+82; positive, therefore shift left by 82+1 places
  Lane 0: 39−−103=+142; positive, 142+1=143 60+24, therefore all zeroes
(Note: if the left shift distance in a lane≥64-ovlp+significand wordlength, the lane is set to 64'b0 because the significand will be completely shifted out of that lane's non-overlapping range.)

Figure 31:
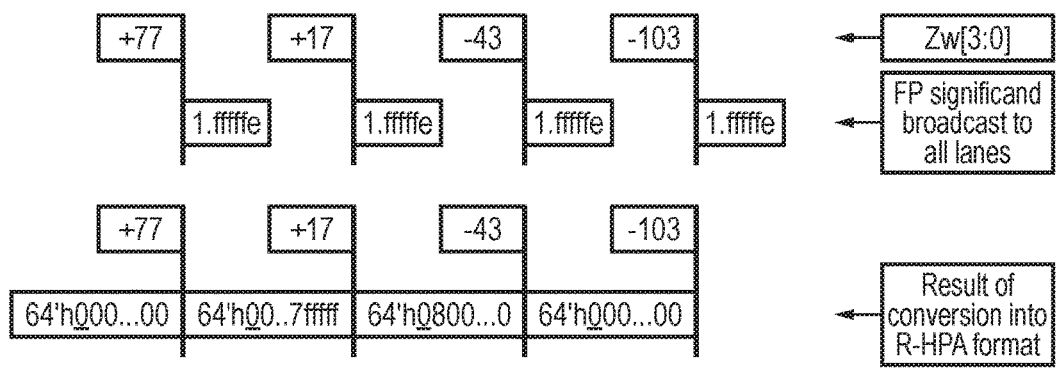
FIGS. 31 and 32 show numeric examples of converting positive and negative floating-point values respectively to RHPA format.

FIG. 31 shows the final result, where underlined hex digits are ovlp bits.

The numeric values of the four lanes are as follows (written as 2's complement numbers multiplied by Zw[n]):
Lane 3: 0
Lane 2: 64'h0000_0000_007fffff×$2^{17}$=+7f_ffff×$2^{17}$
Lane 1: 64'h0800_0000_0000_0000×$2^{-43}$=+1×$2^{16}$
Lane 0: 0
To check that the conversion has been successful, the sum of the lanes is:
Σlanes=0+ff_fffe×$2^{16}$+1×$2^{16}$+0=ff_ffff_×$2^{16}$=1.fffffe×$2^{39}$, the input FP number.

Example 2: Convert Negative Single Precision FP Number to HPA

Figure 32:
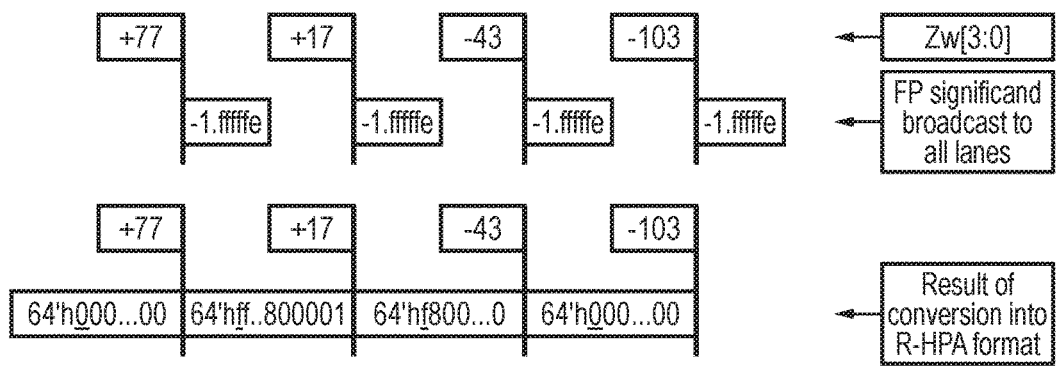

Here is the conversion procedure applied to the same FP number, but now negated.
Input 32-b FP number=−1.fffffe×$2^{39}$
Exponent(FP)−Zw[n] for the four lanes are the same as before:
Lane 3: 39−77=−38; negative, therefore all zeroes
Lane 2: 39−17=+22; positive, therefore shift left by 22+1 places
Lane 1: 39−−43=+82; positive, therefore shift left by 82+1 places
Lane 0: 39−−103=+142; positive, 142+1=143 60+24, therefore all zeroes
FIG. 32 shows the final result, where underlined hex digits are ovlp bits.
The numeric values of the four lanes are as follows (written as 2's complement numbers multiplied by Zw[n]):
Lane 3: 0 (Note: taking the 2's complement of 0 returns 0!)
Lane 2: 64'hffff_ffff_ff80_0001×$2^{17}$=−7f_ffff×$2^{17}$
Lane 1: 64'hf800_0000_0000_0000×$2^{-43}$=−0800_0000_0000_0000×$2^{-43}$=−1×$2^{16}$
Lane 0: 0
Σlanes=0+−ff_fife×$2^{16}$+−1×$2^{16}$+0=−ff_ffff×$2^{16}$=1.fffffe×$2^{39}$
Addition in RHPA Two RHPA numbers are added by performing a regular 2's complement addition in each lane independently. Assuming that one of the RHPA numbers being added has all its ovlp bits set low (e.g. because it is the result of an FP→RHPA conversion as described above), $2^{ovlP-1}$−1 such additions can be performed in sequence with no danger of any of the lanes of overflowing. Herein lies the compelling advantage afforded by using a redundant number representation.

Example 3: RHPA Addition (Causing "Lane Overflow")

Figure 33:
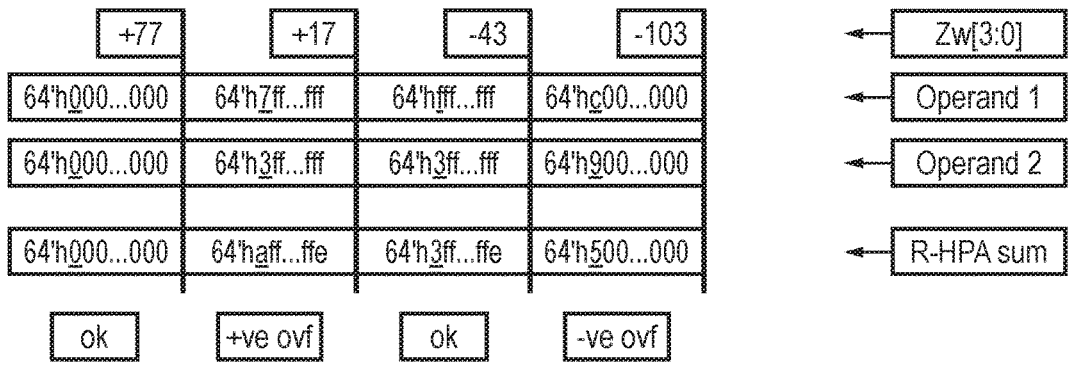
FIG. 33 shows an example of lane overflow during an addition of two RHPA operands.

In the example of FIG. 33, all unspecified hex digits are either all '0' or all T. Lane 2 has overflowed due to two large positive numbers being added and returning a sum that is too positive to be represented as a 64-b 2's-complement number. Similarly, Lane 0 has overflowed due to two large negative numbers being added and returning a sum that is too negative to be represented as a 64-b 2's-complement number. In the first case, the correct result would be represented as a 65-b 2's-complement number whose m.s.b. is '0'; similarly, in the second case, the correct result would be represented as a 65-b 2's-complement number whose m.s.b. is '1'.
Standard 2's-complement overflow logic can be used to detect if overflow has occurred in any lane due to an RHPA addition (i.e. check whether the carry in and the carry out at the m.s.b are the same). If a "lane overflow" has occurred in any lane (except the most significant), the ovlp bits are shifted from the m.s.b.'s of the overflowing lane to the l.s.b.'s of next highest lane, sign extended to the full width of the lane, and added to the value residing there. Also, the ovlp bits in the lane that overflowed are reset to 0.

However, correcting only those lanes that have overflowed could cause overflow elsewhere due to carries propagating along a lane. Therefore, a better technique for responding to an overflow condition in one or more lanes is to shift the ovlp bits in all lanes up a lane and add them to the existing values. This procedure has the advantage of being simpler (by virtue of not having to treat one pair of lanes differently to the other lanes) but is no slower because all the lanes can be updated simultaneously Example 4: Removing Lane Overflow from an RHPA Number In the example of FIG. 34, the overflowing sum from Example 3 is converted to a non-overflowing (restricted-redundant) representation by parallel addition of the ovlp bits.
Conversion from RHPA into FP Starting with the highest lane, combine the 2's-complement number in the lane with Zw so as to form an FP number in the destination format, including Guard and Sticky bits. If the highest lane's value is negative, this will entail performing a 2's-complement operation on the value in the lane to return a sign-magnitude result, as required by IEEE standard FP format. Next, this initial FP result is combined with the 64-b value in the next lane down and the next lower value of Zw as described in our original HPA patent description. The procedure is repeated across all lanes to arrive at the final converted result.

Alternatively, if the number of non-overlap bits in a lane is smaller or equal to the number of significand bits in the FP format, then each lane can be mapped in parallel to respective floating-point values, which can then be added together to form the final converted result.
Accumulator Overflow in RHPA Introducing redundancy into the HPA format allows for very wide additions without the need to propagate carries across the whole of the vector; this constitutes a significant performance benefit because HPA additions can be completed (comfortably) in one cycle. However, in common with all redundant number systems, it becomes difficult to detect correctly if the full-width RHPA has overflowed the vector. That is, if only the top lane is assessed for the occurrence of overflow, two misleading cases arise:
  (i) Overflow may be flagged as occurring because the top lane has overflowed, but the lower lanes may contain oppositely-signed values that bring the HPA back into range
  (ii) Overflow may go undetected because although the top lane has not overflowed, the lower lanes may contain same-signed values that propel the HPA out of range.
To reliably detect accumulator overflow, the RHPA can be converted to a non-redundant format. The algorithm for performing such a conversion is straightforward: starting at the bottom lane, move the ovlp bits into the next highest lane (with sign extension) and add to the value contained there, resetting the ovlp bits in the bottom lane to 0. Repeat this procedure one lane at a time until the ovlp bits in the next-but-one highest lane have been added to the top lane. The RHPA value is now represented as a non-redundant 2's-complement number because the ovlp bits in all the lanes are 0. This method is a serialized version of the "lane overlap" removal described earlier, and is analogous to ripple-carry binary addition.

Example 5: Converting an RHPA Number to Non-Redundant Format

Figure 35:
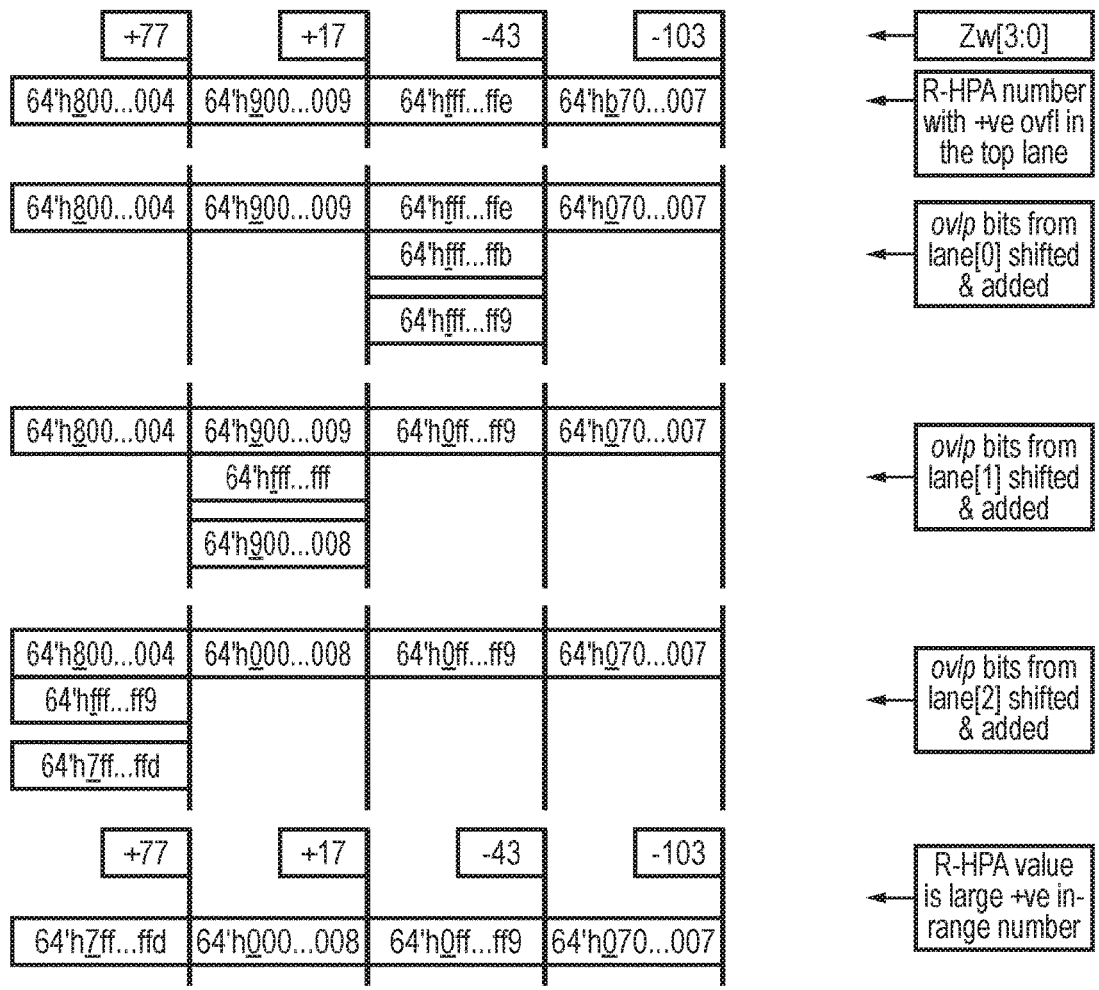
FIG. 35 shows an example of converting an RHPA value to a non-redundant form.

In the example of FIG. 35, an RHPA number's top lane has overflowed; converting the RHPA value to non-redundant format reveals that the RHPA number is in range.

The question remains as to how inaccurate accumulator overflow detection is if based on the top lane alone. i.e. how many false alarms would be raised? We believe this will be "not many" due to the width of the lanes. Also, "true" overlap conditions can be detected in parallel with e.g. an ongoing accumulation of multiple FP numbers rather than between additions, to improve performance. In a non-redundant RHPA, accumulator overflow detection is trivial of course.

Summary

We have introduced the Redundant High-Precision Accumulator ("RHPA"). RHPA is a vector whose lanes include a number of m.s.b. "overlap" bits that have the same significance as the l.s.b.'s of the next higher 64-b lane. This permits the very long wordlength additions needed for HPA to be implemented as SIMD 64-b 2's-complement integer additions.

We have also demonstrated how to transform an RHPA number into its non-redundant "canonical" format whereby all ovlp bits are set to zero. (In a similar manner, we also showed how an RHPA with lane overflow can be converted quickly to "nearly-canonical" form.) Non-redundant RHPA representation provides a reliable way of detecting accumulator overflow accurately.

APPENDIX B—CONVERTING RESTRICTED-REDUNDANT RHPA TO NON-REDUNDANT RHPA WITH CARRY LOOKAHEAD SCHEME

We can speed up the process of converting to non-redundant format by first converting to a restricted-redundant format. It involves doing a carry-lookahead that examines both overlap and non-overlap bits for propagated or generated +1 and −1 values.

After a "convert to restricted-redundant form" operation the non-overlap bits form a 2's-complement number split across the lanes with 64-ovlp bits per lane. In addition, at the lsb of each lane, there is the overlap bit from the next lowest lane whose value is restricted to {−1, 0, +1}. We want to derive generate and propagate bits for a carry-lookahead network across all the lanes to complete quickly the conversion from restricted-redundant to non-redundant form.

Given that the non-redundant RHPA representation is a high-radix 2's-complement number, we should start by converting the vector of ovlp binary signed digits to a second high-radix 2's-complement number. Then we can look at extracting carry-lookahead information from the two numbers (non-ovlp & ovlp) to accelerate their addition in a parallel SIMD fashion.

Let's start with some examples of converting the ovlp bits to 2's complement using the 4-b non-ovlp+4-b ovlp format (N=8, V=4 as used above):

Example A: −1 Ovlp at Lane 0/1 Combines with +1 Non-Ovlp in Lane 2; +1 Ovlp at Lane 2/3

```
    1101_1110        0001_0100         0000_0000    1111_0100
Correct non-redundant form is:
    1101_1111        0000_0011         0000_1111    0000_0100
Original restricted-redundant value with different representation/layout:
    1101_1110   0100      0000             0100
       +1         0        −1
Convert ovlp's to a radix-16 2's-complement number:
        0       +1111     +1111
Add the ovlp & non-ovlp bits, with carry propagation across lanes:
    1101_1110   0100      0000             0100   +
         0     +1111     +1111             0000   =
    1101_1111   0011      1111             0100
Correct!
```

Example B: +1 Ovlp at Lane 0/1 Combines with −1 Ovlp at Lane 2/3

```
    1101_1110        1111_1111         0000_1111    0001_0100
Correct non-redundant form is:
    1101_1110        0000_0000         0000_0000    0000_0100
Original restricted-redundant value with different representation/layout:
    1101_1110   1111      1111             0100
       −1         0        +1
Convert ovlp's to a radix-16 2's-complement number & add to non-ovlp
bits, with carry propagation across lanes:
    1101_1110   1111      1111             0100   +
    1111 1111     0        +1                     =
    1101_1110   0000      0000             0100
Correct!
```

Example C: −1 Ovlp at Lane 1/2 Combines with +1 Ovlp at Lane 0/1 but not +1 Ovlp at Lane 2/3

```
    1101_1110        0001_0000         1111_1111    0001_0100
Correct non-redundant form is:
    1101_1111        0001_0000         1111_0000    0001_0100
Original restricted-redundant value with different representation/layout:
    1101_1110   0000      1111             0100
       +1        −1        +1
Convert ovlp's to a radix-16 2's-complement number & add to non-ovlp
bits, with carry propagation across lanes:
    1101_1110   0000      1111             0100   +
         0    +1111        +1                     =
    1101_1111   0000      0000             0100   +
Correct!
```

Example D: +1 Ovlp at Lane 2/3 Combines with −1 Ovlps at Lanes 1/2 and 0/1

```
    1101_1110        0001_0000         1111_1111    1111_0100
Correct non-redundant form is:
    1101_1110        0000_1111         0000_1110    0000_0100
Original restricted-redundant value with different representation/layout:
    1101_1110   0000      1111             0100
       +1        −1        −1
Convert ovlp's to a radix-16 2's-complement number & add to non-ovlp
bits, with carry propagation across lanes:
    1101_1110   0000      1111             0100   +
         0     1110      1111                     =
```

-continued

```
1101_1110    1111    1110    0100  +
  Correct!
```

Example E: −1 Ovlp at all Lanes

```
1101_1110          1111_0000       1111_0010   1111_0100
Correct non-redundant form is:
1101_1100          0000_1111       0000_0001   0000_0100
Original restricted-redundant value with different representation/layout:
1101_1110    0000    0010    0100
              −1      −1      −1
Convert ovlp's to a radix-16 2's-complement number & add to non-ovlp
bits, with carry propagation across lanes:
1101_1110    0000    0010    0100
1111_1110    1110    1111          =
1101_1100    1111    0001    0100  +
  Correct!
```

From these examples we can see that the ovlp bits convert to a number whose digits are restricted to $\{0, 1, 2^4-1, 2^4-2\}$ in all but the top lane, where the +ve digits $\{2^4-1, 2^4-2\}$ are replaced simply by $\{-1, -2\}$.

Therefore, in order to convert the ovlp bits to a radix $-2^{64-ovlp}$ number, we need only a 2-b/lane carry-propagate adder, because there are only four possible result digits in the converted ovlp vector.

Example A

```
       +1     0    −1   = +1 × 4² + 0 × 4 + −1 = +15
becomes
       01    00    00   −
       00    00    01   =
       00    11    11   = 0 × 4² + 3 × 4 + 3 = +15 in 2's-comple-
                          ment
i.e.    k     p     p   k => "carry kill"; p => "carry propagate"
The most significant bit of the result (underlined) is always negatively-
weighted because it's now a 2's-complement number instead of a
signed-digit number.
Or, (example A again) taking the 2's-complement of the −1 ovlp's
       01    00    00   +
       11    11    10   +
       00    00    01   =
       00    11    11
gives the same result.
```

Example B

```
       −1     0    +1   = −1 × 4² + 0 × 4 + +1 = −15
becomes (in 2's complement)
       00    00    01   +
       10    11    11   +
       00    00    01   =
       11    00    01   = 1 × 4² + 0 × 4 + +1 = −15 in 2's-comple-
                          ment
i.e.    p     k     g   g => "carry generate"
```

Example C

```
       +1    −1    +1   = +1 × 4² + −1 × 4 + 1 = +13
becomes (in 2's complement)
       01    00    01   +
       11    10    11   +
       00    00    01   =
       00    11    01   = 0 × 4² + 3 × 4 + +1 = +13 in 2's-comple-
                          ment
i.e.    k     p     g
```

Example D

```
       +1    −1    −1   = +1 × 4² + −1 × 4 + −1 = +11
becomes (in 2's complement)
       01    00    00   +
       11    10    10   +
       00    00    01   =
       00    10    11   = −0 × 4² + 2 × 4 + 3 = +11 in 2's-comple-
                          ment
i.e.    k     d     p
('d' for double)
```

Example E

```
       −1    −1    −1   = −1 × 4² + −1 × 4 + −1 = −21
becomes (in 2's complement)
       00    00    00   +
       10    10    10   +
       00    00    01   =
       10    10    11   = 2 × 4² + 2 × 4 + 3 = −21 in 2's-comple-
                          ment
i.e.    d     d     p
```

The 2-b digits are sign extended to full lane width for the final addition. We now wish to derive carry-lookahead terms for the final addition to prevent carries crossing lanes.

Given the four possible ovlp digits, we have four complementary conditions of interest in the non-ovlp bits: all 1's (p), all 0's (k), 1 (g), and all-but-the-lsb 1's (d) plus one extra condition, which is the logical NOR of the other four conditions, denoted 'u' for uninteresting. We combine these as shown in the table below to derive lane-level p, g and k conditions.

|  | non-ovlp | | | | |
| --- | --- | --- | --- | --- | --- |
| ovlp | p | g | k | d | u |
| p (all 's) | g | g | p | g | g |
| g (lsb = 1) | g | k | k | p | k |
| k (all 0's) | p | k | k | k | k |
| d ~(lsb = 1) | g | p | k | g | g |

Then the g bits for each lane are derived using classical prefix theory $G[0]=g[0]$ ←carry in to lane 1
$G[1:0]=g[1]|p[1]\&g[0]$
$G[2:0]=g[2]|p[2]\&g[1]|p[2]\&p[1]\&g[0]$
Etc Let's check this on examples A . . . E

Example A: +Ve & −Ve Carry Bits with Borrow Across Lanes

```
1101_1110       0001_0100       0000_0000  1111_0100
Correct answer should be:
1101_1111       0000_0011       0000_1111  0000_0100
Original restricted-redundant value with different representation:
1101_1110       0100       0000       0100
                 +1         0         −1
Convert ovlp and non-ovlp digits as discussed above:
                  u          k          u
                  k          p          p         (k)
Obtain lane-level lookahead terms by bit-wise combination of ovlp and
non-ovlp terms:
                             g          p          k
Derive carry lookahead bits
                  1          0          0          −
Perform SIMD addition, ignoring carries between lanes:
1101_1110       0100       0000       0100  +
0000_0000       1111       1111       0000  +   <− k p p k in radix
                                                      2ⁿ − 1 form
                  1          0          0          0  =
1101_1111       0011       1111       0100
Correct!
```

Example B: +1 Ovlp at Lane 0/1 Combines with −1 Ovlp at Lane 2/3

```
1101_1110       1111_1111       0000_1111  0001_0100
Correct non-redundant form is:
1101_1110       0000_0000       0000_0000  0000_0100
Original restricted-redundant value with different representation:
1101_1110       1111       1111       0100
                 −1         0         +1
Convert ovlp and non-ovlp digits as discussed above:
                  p          p          u
                  p          k          g         (k)
Obtain lane-level lookahead terms by bit-wise combination of ovlp
and non-ovlp terms:
                             p          p'         k
Derive carry lookahead bits
                  0          0          0          −
Perform SIMD addition, ignoring carries between lanes:
1101_1110       1111       1111       0100  +
1111_1111       0000       0001       0000  +   <− p k g k
                                                      in radix
                                                      2ⁿ − 1 form
                  0          0          0          0  =
1101_1110       0000       0000       0100
Correct!
```

Example C: −1 Ovlp at Lane 1/2 Combines with +1 Ovlp at Lane 0/1 but not +1 Ovlp at Lane 2/3

```
1101_1110       0001_0000       1111_1111  0001_0100
Correct non-redundant form is:
1101_1111       0001_0000       1111_0000  0001_0100
Original restricted-redundant value with different representation:
1101_1110       0000       1111       0100
                 +1         −1         +1
Convert ovlp and non-ovlp digits as discussed above:
                  k          p          u
                  k          p          g         (k)
Obtain lane-level lookahead terms by bit-wise combination of ovlp and
non-ovlp terms:
                             p          g          k
Derive carry lookahead bits
                  1          1          0          −
Perform SIMD addition, ignoring carries between lanes:
1101_1110       0000       1111       0100  +
0000_0000       1111       0001       0000  +   <− k p g k
                                                      in radix
                                                      2ⁿ − 1 form
                  1          1          0          0  =
1101_1111       0000       0000       0100  +
Correct!
```

Example D: +1 Ovlp at Lane 2/3 Combines with −1 Ovlps at Lanes 1/2 and 0/1

```
1101_1110       0001_0000       1111_1111  1111_0100
Correct non-redundant form is:
1101_1110       0000_1111       0000_1110  0000_0100
Original restricted-redundant value with different representation:
1101_1110       0000       1111       0100
                 +1         −1         −1
Convert ovlp and non-ovlp digits as discussed above:
                  k          p          u
                  k          d          p         (k)
Obtain lane-level lookahead terms by bit-wise combination of ovlp and
non-ovlp terms:
                             k          g          k
Derive carry lookahead bits
                  0          1          0          −
Perform SIMD addition, ignoring carries between lanes:
1101_1110       0000       1111       0100
0000_0000       1110       1111       0000  +   <− k d p k
                                                      in radix
                                                      2ⁿ − 1 form
                  0          1          0          0  =
1101_1110       1111       1110       0100  +
Correct!
```

Example E: −1 Ovlp at all Lanes

```
1101_1110       1111_0000       1111_0010  1111_0100
Correct non-redundant form is:
1101_1110       0000_1111       0000_0001  0000_0100
Original restricted-redundant value with different representation:
1101_1110       0000       0010       0100
                 −1         −1         −1
Convert ovlp and non-ovlp digits as discussed above:
                  k          u          u
                  d          d          p         (k)
Obtain lane-level lookahead terms by bit-wise combination of ovlp and
non-ovlp terms:
                             k          g          k
Derive carry lookahead bits
                  0          1          0          −
Perform SIMD addition, ignoring carries between lanes:
1101_1110       0000       0010       0100  +
1111_1110       1110       1111       0000  +   <− d d p k
                                                      in radix
                                                      2ⁿ − 1 form
                  0          1          0          0  =
1101_1100       1111       0001       0100  +
Correct!
```

Summary of Method
1. Derive lane-wise p, g, k, d and u terms for the ovlp & non-ovlp parts of the input restricted-redundant number, separately and in parallel
    The ovlp terms can be obtained from a 2l-bit adder, where l is the number of lanes
    The non-ovlp terms are readily implemented as logic trees with similar depth to the 2l-bit adder 2. Convert the two sets of p, g, k, d (and u) terms to p, g and k terms only using the Table on page 3
3. Derive lane carry inputs from the p, g, k bits obtained in step 2 using prefix equations and sign-extend the ovlp p, g, k, d and u terms from 2 bits to 64 bits
4. Add the non-ovlp bits, the sign-extended ovlp bits and the carry bits in SIMD fashion to obtain the final result. This will require a 64-b adder with carry-in per lane.

Logic equations for the Table on page 3 could be as follows:

|  | non-ovlp, $x_n$ | | | | |
|---|---|---|---|---|---|
| ovlp, $x_v$ | k | g | p | d | u |
| k | k | k | p | k | k |
| g | k | k | g | p | k |
| p | p | g | g | g | g |
| d | k | p | g | g | g |

$p = p_v\&k_n|d_v\&g_n|k_v\&p_n|g_v\&d_n$
$g = p_v\&\sim k_n|\sim k_v\&p_n|d_v\&(\sim k_n|\sim g_n)$

We claim:

1. An apparatus comprising:
processing circuitry to perform a plurality of lanes of processing on respective data elements of at least one operand vector to generate corresponding result data elements of a result vector;
wherein the processing circuitry is configured to identify lane position information for each lane of processing, the lane position information for a given lane comprising a lane position indicator stored in a control register for identifying a relative position of the corresponding result data element to be generated by the given lane within a corresponding result data value spanning one or more result data elements of the result vector, wherein the control register comprises a plurality of fields, each field for storing a lane position indicator of a respective lane; and
the processing circuitry is configured to perform each lane of processing in dependence on the lane position information identified for that lane.

2. The apparatus according to claim 1, wherein the lane position information for the given lane identifies whether the corresponding result data element is a most significant data element of the corresponding result data value.

3. The apparatus according to claim 2, wherein in response to an overflow condition detected for one of the lanes of processing, the processing circuitry is configured to select one of a plurality of overflow handling responses in dependence on whether the lane position information for said one of the lanes of processing indicates that the corresponding result data element is the most significant data element of the corresponding result data value.

4. The apparatus according to claim 1, wherein the lane position information for the given lane identifies whether the corresponding result data element is a least significant data element of the corresponding result data value.

5. The apparatus according to claim 1, wherein the lane position information for the given lane identifies the corresponding result data element as one of:
a least significant data element of the corresponding result data value;
a most significant data element of the corresponding result data value; and
an intermediate data element of the corresponding result data value.

6. The apparatus according to claim 5, wherein the lane position information comprises a 2-bit indicator.

7. The apparatus according to claim 5, wherein when the lane position information for a most or least significant lane of processing identifies the corresponding result data element as an intermediate data element of the corresponding result data value, the processing circuitry is configured to generate the result vector representing a partial portion of a result data value with a greater number of bits than the result vector.

8. The apparatus according to claim 5, wherein when the lane position information for an intermediate lane of processing other than a most or least significant lane of processing identifies the corresponding result data element as the least significant data element or the most significant data element of the corresponding result data value, the processing circuitry is configured to generate the result vector comprising two or more independent result data values.

9. The apparatus according to claim 1, wherein in response to a predetermined type of instruction identifying an input vector comprising a plurality of input data elements when the lane position information identifies that the result vector comprises at least two independent result data values, the processing circuitry is configured to perform at least:
a first subset of lanes of processing on a first subset of data elements of said at least one operand vector mapped from a first subset of input data elements of the input vector to generate a first of said independent result data values; and
a second subset of lanes of processing on a second subset of data elements of said at least one operand vector mapped from a second subset of input data elements of the input vector to generate a second of said independent result data values.

10. The apparatus according to claim 9, wherein the processing circuitry is configured to select which input data elements are in the first subset of input data elements or the second subset of input data elements in dependence on programmable input map information.

11. The apparatus according to claim 1, wherein the processing circuitry comprises a plurality of processing circuit units to perform the plurality of lanes of processing in parallel.

12. The apparatus according to claim 1, wherein the lane position information is programmable.

13. The apparatus according to claim 1, wherein the processing circuitry is configured to identify a significance of bits of each data element of the at least one operand vector or the result vector based on an anchor value.

14. The apparatus according to claim 13, wherein the lane position information and the anchor value are specified in the same control register.

15. The apparatus according to claim 1, wherein result data elements other than a most significant result data element of the corresponding result value include a plurality of overlap bits having the same significance as a plurality of least significant bits of a subsequent result data element.

16. The apparatus according to claim 15, wherein the lane position information and an overlap value identifying the number of overlap bits are specified in a same control register.

17. A data processing method comprising:
identifying lane position information using a processing circuit for each of a plurality of lanes of processing to be performed on respective data elements of at least one operand vector to generate corresponding result data elements of a result vector, the lane position information for a given lane comprising a lane position indicator stored in a control register for identifying a relative position of the corresponding result data element to be generated by the given lane within a corresponding result data value spanning one or more result data elements of the result vector, wherein the control register comprises a plurality of fields, each field for storing a lane position indicator of a respective lane; and performing each lane of processing using the processing circuit in dependence on the lane position information identified for that lane.

18. An apparatus comprising:

means for performing a plurality of lanes of processing on respective data elements of at least one operand vector to generate corresponding result data elements of a result vector;

wherein the means for performing is configured to identify lane position information for each lane of processing, the lane position information for a given lane comprising a lane position indicator stored in a control register for identifying a relative position of the corresponding result data element to be generated by the given lane within a corresponding result data value spanning one or more result data elements of the result vector, wherein the control register comprises a plurality of fields, each field for storing a lane position indicator of a respective lane; and the means for performing is configured to perform each lane of processing in dependence on the lane position information identified for that lane.

* * * * *